United States Patent
Robinson et al.

(10) Patent No.: US 11,449,928 B1
(45) Date of Patent: *Sep. 20, 2022

(54) COMPUTER ARCHITECTURE AND PROCESS FOR REVISIONS TO TARGETS FOR AUCTIONING OF BASIC GENERATION SERVICES

(71) Applicants: PUBLIC SERVICE ELECTRIC & GAS COMPANY, Newark, NJ (US); ATLANTIC CITY ELECTRIC COMPANY, Wilmington, DE (US); JERSEY CENTRAL POWER & LIGHT COMPANY, Akron, OH (US); ROCKLAND ELECTRIC COMPANY, New York, NY (US)

(72) Inventors: Anthony R. Robinson, Hillsborough, NJ (US); Frederick W. Lark, Bernardsville, NJ (US); Eugene Meehan, Washington, DC (US); Chantale Lacasse, New York, NY (US); David Salant, Sausalito, CA (US); Colin J. Loxley, Laurence Harbor, NJ (US); Gerald W. Schirra, Randolph, NJ (US); Robert Taylor, Chester Borough, NJ (US)

(73) Assignees: Public Service Electric & Gas Company, Newark, NJ (US); Atlantic City Electric Company, Wilmington, DE (US); Jersey Central Power & Light Company, Akron, OH (US); Rockland Electric Company, New York, NY (US)

(*) Notice: Subject to any disclaimer, the term of this patent is extended or adjusted under 35 U.S.C. 154(b) by 49 days.

This patent is subject to a terminal disclaimer.

(21) Appl. No.: 15/803,641

(22) Filed: Nov. 3, 2017

Related U.S. Application Data

(60) Continuation of application No. 13/545,367, filed on Jul. 10, 2012, now Pat. No. 9,811,855, which is a
(Continued)

(51) Int. Cl.
*G06Q 30/06* (2012.01)
*G06Q 30/08* (2012.01)

(52) U.S. Cl.
CPC ............ *G06Q 30/08* (2013.01); *G06Q 30/06* (2013.01); *G06Q 30/0601* (2013.01)

(58) Field of Classification Search
CPC . G06Q 30/08; G06Q 30/0613; G06Q 30/0601
(Continued)

(56) References Cited

U.S. PATENT DOCUMENTS

| | | |
|---|---|---|
| 4,789,928 A | 12/1988 | Fujisaki et al. |
| 4,903,201 A | 2/1990 | Wagner |

(Continued)

FOREIGN PATENT DOCUMENTS

| | | |
|---|---|---|
| JP | 2002049858 A | 2/2002 |
| WO | WO-9834187 | 8/1998 |
| WO | WO-02097582 | 12/2002 |

OTHER PUBLICATIONS

Cox, J.C. et al., "Theory and Behavior of Multiple Unit Discriminative Auctions," Journal of Finance, vol. 39, No. 4 (Sep. 1984).
(Continued)

*Primary Examiner* — Yogesh C Garg
(74) *Attorney, Agent, or Firm* — Manatt, Phelps & Phillips, LLP

(57) ABSTRACT

A system for conducting a computer-based, simultaneous, multiple round, descending clock auction for basic generation services includes a web server for receiving bid data for one or more users for basic generation service products, an
(Continued)

application server host application software, which processes the one or more bids according to at least one auction rule, tracks the auction, monitors the auction, and/or determines when to end the auction, and a database server, which stores auction data. A method of conducting a computer-based, simultaneous, multiple round, descending clock auction for basic generation services includes the repeating steps of receiving bids indicating desired tranche units of basic generation service products, calculating next round prices for each product, and sending round results to bidders. The subsequent round price for each of the products and a notice of the number of tranches bid during the immediately previous round of bidding for each of the products and/or the amount of excess supply offered. When the number of tranches bid for the round of bidding are equal to or less than the certain threshold for each of the products such that no further bidding can take place under the auction rules, the auction ends after the round of bidding and awarding winning bidders an ending price for each of the at least one of the plurality of products won by the winning bidders.

17 Claims, 22 Drawing Sheets

Related U.S. Application Data continuation of application No. 12/180,888, filed on Jul. 28, 2008, now Pat. No. 8,219,459, which is a division of application No. 10/680,407, filed on Oct. 8, 2003, now Pat. No. 7,409,360.

(60) Provisional application No. 60/416,570, filed on Oct. 8, 2002.

(58) Field of Classification Search
USPC .................................. 705/26.3, 26.1, 26.41
See application file for complete search history.

(56) References Cited

U.S. PATENT DOCUMENTS

| | | |
|---|---|---|
| 4,980,826 A | 12/1990 | Wagner |
| 5,003,473 A | 3/1991 | Richards et al. |
| 5,077,665 A | 12/1991 | Silverman et al. |
| 5,101,353 A | 3/1992 | Lupien et al. |
| 5,227,967 A | 7/1993 | Bailey |
| 5,230,048 A | 7/1993 | Moy |
| 5,231,571 A | 7/1993 | D'Agostino |
| 5,270,922 A | 12/1993 | Higgins |
| 5,375,055 A | 12/1994 | Togher et al. |
| 5,497,317 A | 3/1996 | Hawkins et al. |
| 5,640,569 A | 6/1997 | Miller et al. |
| 5,774,880 A | 6/1998 | Ginsberg |
| 5,794,207 A | 8/1998 | Walker et al. |
| 5,794,219 A | 8/1998 | Brown |
| 5,797,127 A | 8/1998 | Walker et al. |
| 5,802,501 A | 9/1998 | Graff |
| 5,803,500 A | 9/1998 | Mossberq |
| 5,809,483 A | 9/1998 | Broka et al. |
| 5,835,896 A | 11/1998 | Fisher et al. |
| 5,845,265 A | 12/1998 | Woolston |
| 5,845,266 A | 12/1998 | Lupien et al. |
| 5,857,176 A | 1/1999 | Ginsberg |
| 5,890,138 A | 3/1999 | Godin et al. |
| 5,905,974 A | 5/1999 | Fraser et al. |
| 5,905,975 A | 5/1999 | Ausubel |
| 5,915,209 A | 6/1999 | Lawrence |
| 6,012,045 A | 1/2000 | Barzilai et al. |
| 6,021,398 A | 2/2000 | Ausubel |
| 6,023,685 A | 2/2000 | Brett et al. |
| 6,026,383 A | 2/2000 | Ausubel |
| 6,029,146 A | 2/2000 | Hawkins et al. |
| 6,047,274 A | 4/2000 | Johnson et al. |
| 6,085,176 A | 7/2000 | Woolston |
| 6,161,099 A | 12/2000 | Harrington et al. |
| 6,192,347 B1 | 2/2001 | Graff |
| 6,199,050 B1 | 3/2001 | Alaia et al. |
| 6,202,051 B1 | 3/2001 | Woolston |
| 6,243,691 B1 | 6/2001 | Fisher et al. |
| 6,366,891 B1 | 4/2002 | Feinberg |
| 6,415,270 B1 | 7/2002 | Rackson et al. |
| 6,449,601 B1 | 9/2002 | Friedland et al. |
| 6,510,418 B1 | 1/2003 | Case et al. |
| 6,598,029 B1 | 7/2003 | Johnson et al. |
| 6,718,312 B1 | 4/2004 | McAfee et al. |
| 6,976,005 B1 * | 12/2005 | Bansal ............... G06Q 30/0617 |
| | | 705/26.3 |
| 7,062,461 B1 | 6/2006 | Ausubel |
| 7,085,739 B1 * | 8/2006 | Winter .................... G06Q 20/40 |
| | | 705/37 |
| 7,165,046 B2 | 1/2007 | Ausubel |
| 7,409,360 B1 | 8/2008 | Lark et al. |
| 7,472,076 B2 * | 12/2008 | Garg ...................... G06Q 30/02 |
| | | 705/26.3 |
| 7,593,885 B2 | 9/2009 | Du Preez et al. |
| 8,195,523 B1 | 6/2012 | Lark et al. |
| 8,219,458 B1 | 7/2012 | Lark et al. |
| 8,219,459 B1 | 7/2012 | Lark et al. |
| 8,285,601 B1 | 10/2012 | Lark et al. |
| 9,792,647 B1 | 10/2017 | Lark et al. |
| 9,811,855 B1 | 11/2017 | Robinson et al. |
| 9,886,719 B1 | 2/2018 | Robinson et al. |
| 9,940,666 B1 | 4/2018 | Lark et al. |
| 2002/0004775 A1 | 1/2002 | Kossovsky et al. |
| 2002/0052828 A1 | 5/2002 | Ausubel |
| 2002/0065717 A1 | 5/2002 | Miller et al. |
| 2002/0165817 A1 | 11/2002 | Rackson et al. |
| 2004/0054551 A1 | 3/2004 | Ausubel et al. |
| 2005/0102215 A1 | 5/2005 | Ausubel et al. |
| 2005/0187859 A1 | 8/2005 | Growney et al. |
| 2011/0131111 A1 * | 6/2011 | Walker ................... G06Q 30/08 |
| | | 705/26.3 |

OTHER PUBLICATIONS

Cramton et al., "Auction Design for Standard Office Service" Charles River Associates and Market Design Inc., pp. 1-24. (Sep. 26, 1997).
Cramton et al., "Rules for Standard Offer Service Auction" Charles River Associates and Market Design Inc., pp. 1-8. (Aug. 11, 1997).
Cramton, Peter C.: "Money Out of Thin Air: The Nationwide Narrowband PCS Auction," Journal of Economics & Management Technology, vol. 4, No. 2, Summer 1995, 267-343.
David, A.K. et al., "Competitive bidding in electrcity supply," IEE Proceedings-C. vol. 140, No. 5, Sep. 1993, pp. 421-426.
David, A.K. et al., "Strategic Bidding in Competitive Electricity Markets: a Literature Survey," IEEE 2000, pp. 2168-2173.
Demange, G. et al., "Multi-Item Auctions," Journal of Political Economy vol. 94, No. 4 pp. 863-871 (1986).
DeMartini, C. et al., "A New and Improved Design for Multi-Object Iterative Auctions," Mar. 15, 1999.
Dyer, D. et al., "A Comparison of Naive and Experienced Bidders in Common Value Offer Auctions: A Laboratory Analysis," The Economic Journal, 99 (Mar. 1989). 108-115.
Engelbrecht-Wiggans, Richard et al. "An example of multi-object auction game." Management Science, vol. 25, No. 12, pp. 1272-1277. (Dec. 1979).
Engelbrecht-Wiggans, Richard et al. "Competitive bidding and proprietary information." Journal of Mathematical Economics, vol. 11, pp. 161-169. (1983f.
Engelbrecht-Wiggans, Richard. "Revenue equivalence in multi-object auctions." Economic Letters, vol. 26, pp. 15-19. (1988).
Erratum to "An Example of a Multi-Object Auction Game," Richard Engelbrecht-Wiggans and Robert J. Weber, Management Science, vol. 21, No. 4, Apr. 1981, pp. 970.

(56) References Cited

OTHER PUBLICATIONS

Ethier, R. et al.: "Auction Design for Competitive Electricity Markets," presented at the HICSS Conference, Jan. 7-10, 1997, Maui, HI.

Exelby, M.J. et al., "Competition in the UK market for electricity generating capacity—A game theory analysis," Energy Policy, Apr. 1993, pp. 348-354.

Federal Register, vol. 62, No. 64, Thursday, Apr. 3, 1997, Rules and Regulations, 15989.

Federal Register, vol. 63, No. 25, Friday, Feb. 6, 1998, Rules and Regulations, 6079.

Franklin, Matthew K. et al. "The Design and Implementation of a Secure Auction Service." IEEE, pp. 2-14. (1995).

Gale, Ian. "A multiple-object auction with superadditive values." Economic Letters, vol. 34, pp. 323-328. (May 1990).

Green, R.J. et al., "Competition in the British Electricity Spot Market," Journal of Political Economy, 1992, vol. 100, No. 5, pp. 929-953.

Gribik, P.: "27 Learning from California's QF Auction," Fortnightly vol. 133, No. 8, Apr. 15, 1995.

Gross, G. et al., "Optimal Bidding Strategies in Competitive Electricity Markets," 12th Power Systems Computation Conference, Dresden, Aug. 19-23, 1996, pp. 815-823.

Hall, P., "On Representatives of Subsets," J. London Math Soc., pp. 26-30 (1935).

Hausch, D. B. "A Model of Sequential Auctions," Economics Letters 26 (1988) 227-233.

Hausch, Donald B. "Multi-object auctions: sequential vs. simultaneous sales." Management Science, vol. 32, No. 12, pp. 1599-1610. (Dec. 1986).

In The Matter of Implementation of Section 309U) of the Communications Act—Competitive Bidding, pp. Docket No. 93-253, Federal Communications Commission, Release-No. FCC 94-61, Apr. 20, 1994 Released, Adopted Mar. 8, 1994; As Corrected May 12, 1994.

Kagel, J.H. et al., "Information Impact and Allocation Rules in Auctions with Affiliated Private Values: A Laboratory Study," Econometrica, vol. 55, No. 6 (Nov. 1987), pp. 1275-1304.

Kagel, John H. et al. "Behavior in multi-unit demand auctions: experiments with uniform price and dynamic vickrey auctions." Econometrica, vol. 69, No. 2, pp. 413-454 (Mar. 2001).

Katz, Jonathan. "Use of Electronic Media by Broker-Dealers, Transfer Agents, and Investment Advisers for Delivery of Information; Additional Examples under the Securities Act of 1933, Securities Exchange Act of 1934, and Investment Company Act of1940." Securities and Exchange Commission—http://www.sec/gov/rules/concept/33-7288.txt, pp. 1-31. (May 9, 1996).

Krishna, V. et al., "Efficient Mechanism Design," Apr. 14, 1998, pp. 1-24.

Laffont, J. et al.:"Structural economic analysis of descending auctions," European Economic Review 37, 1993, p. 329-341, North Holland.

Ledyard, John 0. et al. "Experiments testing multiobject allocation mechanisms." Journal of Economics & Management Strategy, vol. 6, No. 3, pp. 639-675. (Fall 1997).

Lee, H.G., "Electronic Brokerage and Electronic Auction: The Impact of IT on Market Strutures," Proceedings of the 29th Annual Hawaii International Conference on System Sciences, pp. 397-406 (1996).

Leonard, H.B., "Elicitation of Honest Preferences for the Assignment of Individuals to Positons," Journal of Political Economy, vol. 91, No. 3 (1983).

Low, S. et al., "An Algorithm for Optimal Service Provisioning using Resource Pricing," ATT Bell Labs, pp. 368-373 (1994).

Lucking-Reiley, David. "Auctions on the internet: what's being auctioned, and how?" Department of Economics, Vanderbilt University, pp. 1-54. (Aug. 14, 1999).

Maskin, Eric et al. "Optimal Multi-unit Auctions." The economics of missing markets, information, and games. pp. 312-333 (1989).

Mayer, R. H. et al, "Some Multi-Contract Decision Theoretic Competitive Bidding Models," Operations Res, vol. 19, pp. 469-483, (1971 ).

McAfee, R.P. et al., "The Declining Price Anomaly," Journal of Economic Theory 60, 191-212 (1993).

McAfee, R.P. et al.: "Analyzing the Airwave Auction," Journal of Economoic Perspectives, vol. 10, No. 1, Winter 1996, pp. 159-175.

McAfee, R.P., "Efficient Allocation with Continuous Quantities," Journal of Economic Theory, vol. 53, pp. 51-74 (1991).

McAffe, R.P. et al., "Bidding Rings," The American Economic Review, Jun. 1992, 579-599.

McAffee, R.P., "Auctions and Bidding," Journal of Economic Literature, vol. 25, pp. 699-738 (Jun. 1987).

McCabe, K.A. et al., "Auction Institutional Design: Theory and Behavior of Simultaneous Multiple-Unit Generalizations of the Dutch and English Auctions," The American Economic Association, Dec. 1990, vol. 80, No. 5, pp. 1278-1283.

McCabe, K.A. et al., "Testing Vickrey's and Other Simultaneous Multiple Unit Versions of the English Auction," Research in Experimental Economics, vol. 4, pp. 45-79 (1991).

McMillan, J.: "Selling Spectrum Rights," Journal of Economic Perspectives, vol. 8, No. 3, Summer 1994; pp. 145-162.

Milgrom, R "Combination Bidding in Spectrum Auctions," Competition, Regulation, and Convergence: Current Trends in Telecommunications Policy Research, 1999, pp. 19-26.

Milgrom, P.R., "Auction Theory," Advances in Economic Theory (1985).

Milgrom, Paul et al. "Auctions and Bidding: A primer." Journal of Economic Perspectives, vol. 3, No. 3, pp. 3-22. (Summer 1989).

Milgrom, Paul et al. "The value of information in a sealed-bid auction." Journal of Mathematical Economics, vol. 10, pp. 105-114. (1982).

"An Experimental Comparison of the Simultaneous Multi-Round Auction and the CRA Combinatorial Auction," Submitted to the Federal Communications Commission by Cybernomics, Inc., Contract No. C-9854019, Mar. 15, 2000.

"Auctioning off relics of the computer age." Businessweek Online. (Apr. 11, 1994 ).

"Fundamentals of Municipal Bonds." Public Securities Association, Fourth Edition, pp. 53-69, 180-186. (1990).

"Onsale Brings Thrill of Auctions and Bargain Hunting Online; Unique Internet Retail Service Debuts with Week-Long Charity Auction for the Computer Museum in Boston." Dialog (R)File 610: Business Wire. (May 24, 1995).

"Report 1 B: Package Bidding for Spectrum Licenses," Submitted to Federal Commincations Commission, Submitted by Charles River Associates Incorporated and Market Design, Inc., Oct. 1997.

"The 1998 Review of Electronic Transaction Systems in the U.S. Fixed Income Securities Markets." The Bond Market Association, pp. 1-23. (Nov. 1998).

"USAWeb.com to audiocast auctioneer bid calling contest live on the internet." USAWeb.com, http://www.usaweb.com/press/pr-050799.html. (May 7, 1999).

Affidavit of Paul R. Milgram and Robert B. Wilson, Nov. 8, 1993, Before the Federal Communications Commission, Washington, D.C. 20554, In the Matter of Implementation of Section 309U) of the Communications Act Competitive Bidding, pp. Docket No. 93-253.

Ausubel, L. et al.: "An Efficient Dynamic Auction for Heterogeneous Commodities," Univ. of Maryland, Dept. of Economics, Sep. 8, 2000.

Ausubel, L. et al.: "Ascending Auctions with Package Bidding," Frontiers of Theoretical Economics, vol. 1, Issue 1, 2002.

Ausubel, L. et al.: "Auctioning Securities" Univ. of Maryland, Dept. of Economics, Mar. 1998.

Ausubel, L. et al.: "Demand Reduction and Inefficiency in Multi-Unit Auctions," Univ. of Maryland, Dept. of Economics, Jul. 12, 2002.

Ausubel, L. et al.: "Demand Reduction and Inefficiency in Multi-Unit Auctions," Univ. of Maryland, Dept. of Economics, Mar. 20, 1998.

(56) References Cited

OTHER PUBLICATIONS

Ausubel, L. et al.: "Synergies in Wireless Telephony: Evidence from the Broadband PCS Auctions," Journal of Economics and Management Strategy, 6:3,497-527, 1997.
Ausubel, L. et al.: "The Ascending Auction Paradox," Univ. of Maryland, Dept. of Economics, Jul. 5, 1999.
Ausubel, L. et al.: "The Optimality of Being Efficient," Univ. of Maryland, Dept. of Economics, Jun. 18, 1999.
Ausubel, L. et al.: "Vickery Auctions with Reserve Pricing," Univ. of Maryland, Dept. of Economics, Jan. 28, 1999.
Ausubel, L.: "An Efficiency Ascending-Bid Auction for Multiple Objects," University of Maryland, Dept. of Economics, Working Paper No. 97-08, Jun. 25, 1997.
Ausubel, L.: "An Efficient Ascending-Bid Auction for Dissimiliar Objects," Univ. of Maryland, Dept. of Economics, Jan. 4, 1996.
Ausubel, L.: "An Efficient Ascending-Bid Auction for Multiple Objects," University of Maryland, Dept. of Economics, Aug. 7, 2002.
Ausubel, L.: "An Efficient Dynamic Auction for Heterogeneous Commodities," Univ. of Maryland, Dept. of Economics, Jul. 17, 2002.
Ausubel, L.: "Generalized Vickery Auction," Univ. of Maryland, Dept. of Economics, Sep. 1999.
Ausubel, L.: "Insider Trading in a Rational Expectations Economy," The American Economic Review, Dec. 1990; pp. 1022-1041.
Ausubel, L.: "On Generalizing the English Auction," Univ. of Maryland, Dept. of Economics, Dec. 31, 1997.
Ausubel, L.: "Put corruption under the hammer," Financial Times, Dec. 20, 2002.
Ausubel, L.M. et. al.: "Implications Auction Theory for New Issues Market," Brookings-Wharton Papers on Financial Services: 2002.
Ausubel, Lawrence M. "An efficient ascending-bid auction for dissimiliar objects." Deparment of Economics, University of Maryland, pp. 1-22. (Jan. 4, 1996).
Ausubel, Lawrence M. "An Efficient Ascending-Bid Auction for Multiple Objects." Department of Economics, University of Maryland, pp. 1-25. (Aug. 7, 2002).
Ausubel, Lawrence M. "An efficient ascending-bid auction for multiple objects." Department of Economics, University of Maryland, Working Paper No. 97-06, pp. 1-40. (Jun. 25, 1997).
Ausubel, Lawrence M. "An efficient dynamic auction for heterogeneous commodities." Department of Economics, University of Maryland, pp. 1-30. (Jul. 17, 2002).
Ausubel, Lawrence M. "Implications of Auction Theory for New Issues Markets." Brookings—Wharton Papers on Financial Services, pp. 313-343. (2002).
Ausubel, Lawrence M. et al. "Ascending auctions with package bidding." Frontiers of Theroretical Economics, vol. 1, Issue 1, Article 1, pp. 1-42. (2002).
Ausubel, Lawrence M. et al. "Demand Reduction and Inefficiency in Multi-Unit Auctions." Department of Economics, University of Maryland, pp. 1-30. (Jul. 12, 2002).
Ausubel, Lawrence M. et al. "Demand Reduction and Inefficiency in Multi-Unit Auctions." Department of Economics, University of Maryland, pp. 1-42. (Mar. 20, 1998).
Ausubel, Lawrence M. et al. "The ascending auction paradox." Department of Economics, University of Maryland, pp. 1-23. (Jul. 5, 1999).
Ausubel, Lawrence M., "An efficient dynamic auction of heterogeneous commodities." Department of Economics, University of Maryland, pp. 1-19. (Sep. 8, 2000).
Banks, Jeffrey S. et al. "Allocating uncertain and unresponsive resources: an experimental approach." Rand Journal of Economics, vol. 20, No. 1, pp. 1-25. (Spring 1989).
Bartolini, Leonardo et al. "Designing Effective Auctions for Treasury Securities" Federal Reserve Bank of New York: Current Issues in Economic and Finance, vol. 3, No. 9, pp. 1-6. (Jul. 1997).
Before the Federal Communications Commission, Washington, D.C. 20554, In the Matter of Implementation of Section 309U) of the Communications Act Competitive Bidding, pp. Docket No. 93-253, Nov. 10, 1993.
Bernard, J.C.: "Alternative Auctions Institutions for Purchasing Electric Power: An Experiment Examination," Bulk Power System Dynamics and Control IV—Restructuring, Aug. 24-28, Santorini, Greece.
Bernard, John C. et al. "Alternative Auction Institutions for Purchasing Electric Power: An Experimental Examination." Bulk Power Systrems Dynamics and Control IV—Restructuring: Symposium proceedings, Santorini, Greece, pp. 1-8. (Aug. 24-28, 1998).
Bykowsky, M.M. et al., "Mutually Destructive Bidding: The FCC Auction Design Problem," Journal of Regulatory Economics, 17:3, pp. 1-36 (2000).
Capen, C.E. et al., "Competitive Bidding in High Risk Situations," Journal of Petroleum Technology, vol. 23, pp. 641-653 (1971).
Gassing, J. et al., "Implications of the Auction Mechanism in Baseball's Free Agent Draft," pp. 110-121. This is an undated University Paper.
Chakravarti, B., "Auctioning the Airwaves: The Contest for Broadband PCS Spectrum," Journal of Economics and Management Strategy, vol. 4, No. 2, pp. 345-373 (Summer 1995).
Che, Yeon-Koo et al., "Auctions with Financially-Constrained Bidders," Social Systems Research Institute, Dec. 22, 1994.
Che, Yeon-Koo et al., "Sales to Budget-Constrained Buyers: Single-Payer Versus Multiple-Payer," Social Systems Research Institute, Apr. 1994.
Clontz, Bryan. "Bancassurance in the United States: Effects on Consumers." Journal of the American Society of CLU & ChFC, pp. 68. (May 1997).
Copeland, Duncan G. et al. "Sabre: The Development of Information-Based Competence and Execution of Information-Based Competition." IEEE Annals of the History of Computing, vol. 17, No. 3, pp. 30-56. (1995).
Cox, J.C. et al., "Auction Market Theory of Heterogeneous Bidders," Economic Letters 9, pp. 319-325 (1982).
Milgrom, Paul R. "A Convergence Theorem for Competitive Bidding with Differential Information." Econometrica, vol. 47, No. 3, pp. 679-688. (May 1979).
Milgrom, Paul R. "The economics of competitive bidding: a selective survey." Social Goals and Social Organization Essays in Memory of Elisha Pazner, pp. 261-289. (1985).
Milgrom, Paul R. et al. "A Theory of Auctions and Competitive Bidding, II." http://www.milgrom.net/articlesmain.htm, Article No. 13. (1999).
Milgrom, Paul R. et al. "A theory of auctions and competitive bidding." Econometrica, vol. 50, No. 5, pp. 1089-1122. (Sep. 1982).
Milgram, Paul. "Procuring Universal Telephone Service" Reprinted from: 1997 Industry Economics Conference Proceedings, pp. 1-9. (Aug. 1997).
Milgram, Paul. "Putting auction theory to work: the simultaneous ascending auction." Journal of Political Economy, vol. 108, No. 2, pp. 245-272. (2000).
Milgram, Paul. "Rational expectations, information acquisition, and competitive bidding." Econometrica, vol. 49, No. 4, pp. 921-943. (Jul. 1981 ).
Myerson, R.B., "Optimal Auction Design," Mathematics of Operations Research, vol. 6 No. 1, pp. 58-73 (1981).
Nalebuff, B.J. et. al., "Designing the PCS Auction," Yale University, undated University Paper.
Noussair, C. "Equilibria in a multi-object uniform price sealed bid auction with multi-unit demands," Econ, Theory 5, 337-351 (1995).
Paffrey, T.R. "Multiple-Object, Discriminatory Auctions with Bidding Constraints: A Game-Theoretic Analysis," Management Science, vol. 26, No. 9, Sep. 1980, pp. 935-946.
Palfrey, T.R., "Bundling Decisions by a Multiproduct Monopolist With Incomplete Information," Econometrica, vol. 51, No. 2 (Mar. 1983).
Press release "Aug. 27, 2001—Statewide Auction of NJ Basic Generation Service (BGS) Load—Notice of Three Upcoming Bidder InformationSessions" extracted from www.bgs-auction.com web site.

(56) References Cited

OTHER PUBLICATIONS

Press release "New Jersey Utilities Set to Launch Major 18000-MW Power Solicitation"; McGraw-Hill's Power Markets Week; New York; Jul. 16, 2001, extracted from Proquest electronic database proquest.umi.com on Aug. 2, 2007.

Press release, "Meetings Set for 18,000-MW N.J. RFP", McGraw-Hill's Power Markets Week; New York; Sep. 3, 2001 extracted from Proquest electronic database proquest.umi.com on Aug. 2, 2007.

Reinhart, Vincent. "An analysis of Potential Treasury Auction Techniques." Federal Reserve Bulletin, pp. 403-413. (Jun. 1992).

Reiter, Michael K. "Distributing Trust with the Rampart Toolkit." Communications of the ACM, vol. 39, No. 4, pp. 71-74 (Apr. 1996).

Reynolds, Kate. "Auctions." http://www.agories.com/library/auctions.html. (1996).

ROckoff, Todd E. et al. "Design of an Internet-based system for remote Dutch auctions." Internet Research: Electronic Networking Applications and Policy, vol. 5, No. 4, pp. 10-16. (1995).

Rothkopf, M. H., "A Model of Rational Competitive Bidding," Management Science, vol. 15, pp. 362-373 (1969).

Rothkopf, M.H. "Bidding in Simultaneous Auctions with a Constraint on Exposure," Operations Research, vol. 25, No. 4, Jul.-Aug. 1977, 620-629.

Rothkopf, M.H. "On Multiplicative Bidding Stategies," Operations Research, vol. 28, No. 3, Part I, May-Jun. 1980, 570-575.

Rothkopf, M.H. et al., "Comment on 'Multi-Object Auctions: Sequential vs. Simultaneous Sales,'" Management Science, vol. 32, No. 12, Dec. 1986, 1611-1612.

Rothkopf, M.H. et al., "Modeling Competitive Bidding: A Critical Essay," Management ScienceNol. 40, No. 3, Mar. 1994, pp. 364-384.

Sakk, E. et al., "Power System Bidding Tournaments for a Deregulated Environment," IEEE 1997,681-686.

Shapley, L.S. et al., "The Assignment Game 1: The Core," International Journal of Game Theory, vol. 1, Issue 2, pp. 111-130 (1972).

Shubik, M. "On Different Methods for Allocating Resources," Kykos, vol. 23, Issue 2, May 5, 2007, pp. 333-337.

Singh, H. et al., "Power Auctions and Network Constraints," System Sciences, 1997, 608-614.

Stark, R. M., "Unbalanced Highway Contracting Tendering," Operational Research Quarterly, vol. 25, No. 3, pp. 373-388.

Stark, R.M. et al., "Competitive Bidding: A Comprehensive Bibliography," Operations Research, vol. 27, No. 2, Mar.-Apr. 1979, 364-390.

Stark, R.M. et al., "Some Multi-Contract Decision-Theoretic Competitive Bidding Models," University of Delaware, Newark, Delaware, Received Feb. 14, 1969, 469-483.

Statewide Auction of New Jersey Basic Generation Service (BGS) Load Bidder Information Sessions manual.

Stein, Lincoln D. "How to set up and maintain a world wide web site: The Guide for Information Providers." pp. 135-136. (Aug. 1995).

Sutton, Marty et al. "Auctions." http://www.csee.umbc.edu/.about.jklabrou/courses/fall1999.sub.-691 f/week- 13/weeks.sub.-weeks.sub.--site/Auctions.html.

Underwood, Chris. "A multiple round ascending auction process suitable for the disposal of radio spectrum in New Zealand." Radio Spectrum Policy, pp. 1-6. (Jan. 17, 1996).

Web pages from website www.bgs-auction.com dated Oct. 10, 2001, Dec. 10, 2001, Feb. 5, 2002, Feb. 15, 2002 and Jun. 1, 2002.

Web pages of from web site www.bgs-auction.com , dated Sep. 9, and 28, 2001; captured via the WayBackMachine.

Weber, R.J. "Multiple-Object Auctions," Auctions, Bidding, and Contracting: Uses and Theory, 1983, pp. 165-191.

Weber, Robert J., "Making More from Less: Strategic Demand Reduction in the FCC Spectrum Auctions," PCS Spectrum Auction, May 6, 1996, pp. 1-15.

Wilson, R. "Activity Rules for the Power Exchange," Report to the California Trust for Power Industry Restructuring, Mar. 14, 1997, pp. 1-11.

Wilson, R. "Activity Rules for the Power Exchange," Report to the California Trust for Power Industry Restructurinq, Mar. 3, 1997, pp. 1-10.

Wilson, R. "Strategic Analysis of Auctions," Handbook of Game Theory, vol. I, 1992, pp. 228-279.

Wolfram, C. D.: "Strategic Binding in a Multi-Unit Auction: An Emprical Analysis of Bids to Supply Electricity in England and Wales," NBER Working Paper Series, Working Paper 6269, National Bureau of Economic Research, Nov. 1997.

Wurman, P.R. et al., "The Michigan Internet Auction Bot: A Configurable Auction Server for Human and Software Agents," In Proceedings of the Second International Conference on Autonomous Agents (Agents-98), pp. 301-308, Minneapolis, MN, USA, May 1998.

Zimmerman, Ray D. et al. "An Internet-based platform for testing generation scheduling auctions." IEEE—Proceedings of the Thirty-First Hawaii International Conference on System Sciences, vol. 3, pp. 138-146. (1998).

Zimmerman, Ray D. et al. "Energy Auctions and Market Power: An Experimental Examination." IEEE, Proceedings of the Hawaii International Conference on System Sciences, pp. 1-9. (Jan. 5-8, 1999).

A Users Guide to the Pool Rules, Issue 2.00, The Electricity Pool, prepared by the Chief Executive's Office for the Executive Committee of the Pooling and Settlement System in England and Wales; University of Technology, Sydney: Jan. 12, 1998.

Pool Settlement Agreement, Pool Rules: Issue 3, Revision 6. May 15, 2000.

Post, D. L. et al. "Application of Auctions as Pricing Mechanism for the Interchange of Electric Power," IEEE Transactions on Power Systems, vol. 10, No. 3. Aug. 1995.

Hurwicz, L. et al. "The Economics of Competitive Bidding, A Selective Survey," Social Goals and Social Organization, pp. 261-289. 1985.

Kaufman. G. G. "Improved Bidding Constraints on Municipal Bonds Sold Competitively by NIC." Governmental Finance, pp. 40-42. Feb. 1975.

Klemperer, P. "Auctions: Theory and Practice, The Toulouse Lectures in Economics," pp. 181-183. 2004.

Moore, J. H. "A Bidding Model for Allocating Time-Sharing Services in an Organization," Proceedings of the Eighth Hawaii International Conference on System Sciences, pp. 30-32. 1975.

Ortega-Reichert, A. "A Competitive Bidding Model of the Treasury Bill Auction Market," Models for Competitive Bidding Under Uncertainty, A Dissertation Submitted to the Department of Industrial Engineering and the Committee on the Graduate Division of Stanford University. Dec. 1967.

Press release "Aug. 27, 2001—Statewide Auction of NJ Basic Generation Service (BGS) Load—Notice of Three Upcoming Bidder Information Sessions" extracted from www.bgs-auction.com web site, the web pages of this web site dated Sep. 9 and 27, 2001; captured via the WayBackMachine (archieve.org) and Press releases "New Jersey Utilities Se . . . "

A Users Guide to the Pool Rules, Issue 2.00, The Electricity Pool, prepared by the Chief Executive's Office for the Executive Committee of the Pooling and Settlement System in England and Wales, 1993.

Gassing, J. et al., "Implications of the Auction Mechanism in Baseball's Free Agent Draft," pp. 110-121. This is an undated University Paper, Jul. 1980.

Nalebuff, B.J. et al., "Designing the PCS Auction," Yale University, undated University Paper, 1993.

Stark, R.M., "Unbalanced Highway Contracting Tendering," Operational Research Quarterly, vol. 25, No. 3, pp. 373-388, Sep. 1974.

Statewide Auction of New Jersey Basic Generation Service (BGS) Load Bidder Information Sessions manual, Aug. 27, 2001.

\* cited by examiner

SAMPLE RESULTS

| | ABC - 10 SLICES AVAILABLE |
|---|---|
| | XYZ - 10 SLICES AVAILABLE |

| ROUND 1 | PRICES | BIDS |
|---|---|---|
| | 6.55 | 25 |
| | 6.55 | 15 |

| ROUND 2 | PRICES | BIDS |
|---|---|---|
| | 6.39 | 25 |
| | 6.45 | 15 |

| ROUND 3 | PRICES | BIDS |
|---|---|---|
| | 6.23 | 22 |
| | 6.35 | 18 |

| ROUND 4 | PRICES | BIDS |
|---|---|---|
| | 6.07 | 18 |
| | 6.22 | 18 |

| ROUND 5 | PRICES | BIDS |
|---|---|---|
| | 5.95 | 16 |
| | 6.10 | 20 |

FIG. 14

SAMPLE ROUND REPORT WITH MINIMUM INFORMATION

ROUND REPORT: ROUND 4

TOTAL SLICES SUBSCRIBED: 35-40

ROUND 5

| EDC | PRICE /kWh |
|---|---|
| ABC | 5.95¢ |
| XYZ | 6.10¢ |

FIG. 15

AUCTION MANAGER'S ROUND REPORT

ROUND 4

| BIDDER | BIDS | |
|---|---|---|
| | ABC | XYZ |
| A | 3 | 1 |
| B | 2 | 2 |
| C | 5 | 5 |
| D | 0 | 2 |
| E | 2 | 0 |
| F | 4 | 2 |
| G | 1 | 4 |
| H | 1 | 2 |
| TOTAL | 18 | 18 |

| TOTAL ELIGIBILITY | |
|---|---|
| FOR ROUND 4: | 36 |
| INITIAL ELIGIBILITY: | 40 |

FIG. 16

COMPUTER ARCHITECTURE AND PROCESS FOR REVISIONS TO TARGETS FOR AUCTIONING OF BASIC GENERATION SERVICES

CROSS REFERENCE TO RELATED APPLICATIONS

This application is a continuation of U.S. patent application Ser. No. 13/545,367, filed on Jul. 10, 2012, issuing as U.S. Pat. No. 9,811,855, which is a continuation of U.S. patent application Ser. No. 12/180,888, filed on Jul. 28, 2008, now U.S. Pat. No. 8,219,459, which is a divisional of U.S. patent application Ser. No. 10/680,407, filed on Oct. 8, 2003, now U.S. Pat. No. 7,409,360, which is related to and claims the priority of U.S. Provisional Application Ser. No. 60/416,570, filed on Oct. 8, 2002, each of which are incorporated herein by reference.

Additional related applications, each of which are incorporated herein by reference, include U.S. patent application Ser. No. 12/180,881, filed on Jul. 28, 2008, now U.S. Pat. No. 8,195,523; U.S. patent application Ser. No. 12/180,886, filed on Jul. 28, 2008, now U.S. Pat. No. 8,219,458; U.S. patent application Ser. No. 12/180,892, filed on Jul. 28, 2008, now U.S. Pat. No. 8,285,601; U.S. patent application Ser. No. 13/545,172, filed on Jul. 10, 2012, now U.S. Pat. No. 9,792,647; U.S. patent application Ser. No. 13/487,471, filed on Jun. 4, 2012; U.S. patent application Ser. No. 15/730,642, filed on Oct. 11, 2017; and U.S. patent application Ser. No. 13/616,541, filed on Sep. 14, 2012.

FIELD OF THE INVENTION

The present invention is directed to computer-related and/or assisted systems, methods, and computer program devices for conducting auctions. More particularly, it relates to methods and systems, for example, for conducting a simultaneous, multiple round, descending clock auction.

BACKGROUND OF THE RELATED ART

Various methods of computer-based auctioning have been suggested, the prior art status of which is not being admitted herein. U.S. Pat. No. 6,026,383 (Ausubel), incorporated herein by reference, discloses an automated system for conducting an auction comprising a plurality of bid entry terminal and a bidding information processor communicatively coupled to the bid entry terminals. Bidders at the bid entry terminals observe displayed information and enter bids accordingly. The bidding information processor and the bid entry terminals communicate and process information in order to conduct an auction. The method involves conducting an auction in which the price paid by bidders is independent of their own bids, in which participants are provided with information concerning their competitors' bids as the auction progresses, and in which the confidentiality of high values is maintained.

According to Ausubel, an auction proceeds as follows: First, the auctioneer determines a starting price and announces it to the bidders. Each bidder responds with a bid indicating how many objects each wishes to purchase at the current price. Typically, the total number of objects desired by all the bidders is greater than the number of objects which are available. In this case, the auctioneer determines whether any of the objects should be assigned to any bidders in this round. This is done by determining for each bidder, sequentially, whether the sum of the bids of all the other bidders is less than the number of objects available. In other words, is there is at least one object which is desired by only one bidder? Those objects are then assigned to that bidder, obligating that bidder to purchase them at the price standing at that time. If any objects remain available, the auctioneer announces a new price and the auction continues.

In FIG. 1a, process 100 starts with step 102, in which memory locations in a data partition of memory of a bid information processor ("BIP") are initialized. In step 102, the appropriate memory locations are initialized with information such as the number of objects available and the initial price for the auction. In step 104, information regarding the bidding process is transmitted from the BIP to bid entry terminals ("BETs"). The BETs receive the information and display it to the bidders. The transmitted information may include the current lot number, the current round number, the current price for the current round, the bidder number of the bidder at each respective bid entry terminal, the bid history prior to the current round, auction announcements and messages for the current round, constraints on the bid which the bidder may submit in the current round and passwords or other security information.

The bid history is information relating to the bids submitted by bidders in prior rounds. For example: 1) the disaggregated quantities demanded by each bidder in prior rounds, where each bidder is identified by name or by a confidential bidder identification number; 2) the aggregate quantity demanded by all bidders in prior rounds; 3) the number of objects remaining to be sold; and 4) the bidder's own obligations which have been determined thus far.

The auction announcements and messages include other information which is provided to bidders, for example: 1) whether the auction is still open or whether it has concluded; 2) the deadline by which the next bid must be submitted by bid entry terminals; 3) the schedule for upcoming rounds of the auction; 4) information concerning the required substance of bids, for example, whether the quantity each bidder demands is required to be no greater than the quantity the same bidder demanded in the previous round; and 5) other ad hoc announcements or messages which the BID would like to convey to the BETs.

In step 106, the BETs receive bids from the participating bidders and transmit them to the BIP. The transmitted information may include the current lot number, the current round number, the current price for the current round, the bidder number of the bidder at each respective BET, the quantity which the bidder demands in the current round, and any passwords or other security information. In step 108, the BIP receives the information transmitted from the BETs and send a confirmation message. In step 110, if the auction rules allow, the BETs may receive corrections to the bids or withdrawals of bids from the bidders and transmit these corrections or withdrawals to the BIP.

In step 112, the BIP closes the bidding for the current round and processes the bids received from each of the BETs. In step 114, the BIP determines whether any available objects remain. If so, the process goes to step 116, in which the BIP increments the current price information and generates the bidding history and generates the bidding history and any auction announcements and messages. The process then loops to step 104. If no available objects remain, the process ends.

FIG. 1b is a flow diagram of a subprocess of step 112. It begins with step 112-1, in which the BIP sums the associated quantities demanded by all the BETs. In step 112-2, the BIP determines whether the sum is more than the current number of available objects. If the sum is more than the current number of available objects, the process continues with step 112-3, in which the BIP considers each bidder in turn and assigns objects to any winning bidders. If the sum is not more than the current number of available objects, the BIP proceeds to step 112-4, in which, if the sum of the quantities demanded by all bidders exactly equals the current number of available objects, then each bidder is assigned the demanded quantity at the current price, and the auction ends. If the sum of the quantities demanded by all bidders is less than the current number of available objects, then each bidder is assigned the demanded quantity at the current price, and the residual quantity is assigned to bidders according to their demands in the previous period and the auction ends.

PCT Application No. WO 02/097582 A2 (Ausubel et al.), incorporated herein by reference, discloses a system and method for a computer-implemented auction in which multiple types of items are auctioned together without imposing a particular division of supply or demand amount the individual items. The method of Ausubel et al. can be used for reverse auctions, which typically involved descending prices. Bids may consist of the quantity of each respective type of item that the bidder wishes to transact at a current price vector.

The clock auction of FIG. 2 starts with step 202, in which memory locations of a computer are initialized with information such as the types of items in the auction and the available quantity of each type of item. In step 204, a computer establishes the initial prices. In step 206, a computer outputs auction information, including the current price vector. The bidder terminals then receive the auction information through their network interfaces and display the information to bidders through their user interfaces. In step 208, a computer receives bids from bidders. The bidding information processor then receives the bids through its network interface. In step 210, a computer applies constraints, if any, to the received bids, and enters only those bids that satisfy said constraints. In step 212, a computer process the received bids and determines whether the auction should continue. If the auction should continue, the process goes to step 214, in which a computer establishes an updated price vector. Then, at step 216, a computer updates other auction information, if any.

If the auction should not continue, the process goes to step 218, in which a computer outputs a final message, including the allocation of items among bidders and payments of the bidders. The bidding information processor takes the allocations of items among bidders to be their final bids and takes the payment of each bidder to be the dot product of the final price vector and the bidder's final quantity vector.

Previous computer-based auction methods have also been suggested particularly for energy supply auctions. U.S. Pat. No. 6,047,274 (274), incorporated herein by reference, and U.S. Pat. No. 6,598,029 (029), also incorporated herein by reference, are both to Johnson et al. and have substantially similar disclosures.

The '274 and '029 patents disclose an auction service for energy supply in which a bidding moderator ("Moderator") receives bids from competing suppliers of the rate each is willing to charge to particular end users for estimated quantities of electric power (or gas) supply. Each supplier receives competing bids from the Moderator and has the opportunity to adjust its own bids down or up, depending on whether it wants to encourage or discourage additional energy delivery commitments in a particular geographic area or to a particular customer group. Each supplier's bids can also be changed to reflect each supplier's capacity utilization.

FIG. 3a illustrates an auction process in which a Moderator 301 administers the collection and dissemination of bidding information. The Moderator 301 includes a computer with a processor and memory, together with input and output devices to communicate with the Providers' energy management computers 302, which are the source of the bidding information. By means of these systems, the Providers bid to become the selected Provider of electric power or natural gas for an end user or group of end users. The Providers transmit their bids from their energy management computers 302 over data links 303, which may be either analog (using modems) or digital. Each Provider has an energy management administrator who enters energy management instructions into each energy management computer 302 through an input port 304 by means, for example, of a keyboard or a data link from a remote site or local computer.

The Moderator 301 receives the bids, processes them in its bidding processor 305 to produce provider selection data, and enters both into a database in its memory by means of the data buses and registers internal to a computer. The bids are sorted according to delivery destination within the respective service areas of the end user's local energy distribution companies ("DISCOs") for subscribing end users. The Moderator 301 processes the bids to prioritize them for each delivery destination, producing derivative data, including provider selection data. This data reflects designation of a selected Provider and alternate Providers, based on the Providers' bids to supply the power requirements of each end user or group of end users. The Moderator also designates a default Provider in the event the Provider selected by the bidding process has no additional capacity available. The Moderator 301 transmits the derivative data over a data link 307 to a control computer 308 associated with the end user or set of end users for which the submitted bids are applicable.

The control computer 308 applies decision rules, formulated and inputted by the control computer's administrator (e.g., the energy manager for a very large end user), to the derivative data received from the Moderator 301 in order to select a Provider. A control computer may be operated by the end user, the end user's DISCO, or the Moderator (on behalf of the end users associated with that control computer). The Moderator also performs all the functions that the control computer would otherwise perform, including the selection of a Provider offering the lowest rate (or best economic incentive) at that time to each such end user.

Each of the Providers transmits to the Moderator the rate it is willing to charge (or other economic incentive it is willing to offer) for electric power to be provided to an end user or group of end users, over some particular period of time. The Provider may change its bids as often as it likes as market place demands for energy change or in response to competitors' bidding activities. The Moderator collects this bid information from all the Providers, sorts it according to the rules of the auction, and further processes this bid information to select Providers for particular end users. This provider selection information includes a prioritization of the Provider selection in accordance with Providers' bids or the designation of a selected Provider or default Provider. The Moderator gives each Provider bid information from other Providers for at least a portion of the end users in regard to which any Provider has submitted a bid.

From the list of all Providers providing bid information to the Moderator, each control computer (or the Moderator) selects those Providers from whom participating end users will be provided electric power. After each new bid is submitted by a Provider and is processed by the Moderator, the rate and/or provider selection data is transmitted to the relevant control computers and rate information is distributed to the Providers in order to implement the auction. All Providers have the opportunity thereafter to submit a lower or higher bid for any end user or group of end users to whom they wish to supply electric power.

As illustrated in FIG. 3a, once the control computer 308 selects a Provider for an end user or set of end users, it transmits a notification of that selection to the Moderator via data link 307, or perhaps via data bus if the control computer is being operated by the Moderator 301. The Moderator 301 then transmits via data link 303 a selection notification to the selected Provider 302 and a specification of the estimated energy requirements of the end user or set of end users to be served. The Moderator also transmits via data link 309 a copy of such selection notification to the DISCO 310 serving the end user or applicable set of end users. Applying the actual energy usage data received from each end user's meter and the rate offered at the time by the winning bidder, the Moderator prepares and transmits a billing statement for each end user to the respective Provider and end user.

FIG. 3b illustrates a method in which Providers formulate bids and transmit these bids 328 to the Moderator. Upon receiving such bids 329, the Moderator processes the bids to determine which bids apply to which set of end users associated with each control computer 330, prioritizes the bids by listing the lowest bid first (and then the next lowest and so on) and generates provider selection data 331. The Moderator then transmits 332 rate information and/or provider selection data to each applicable control computer. After some initial processing of the bids received, the Moderator also transmits 333 at least a portion of the received bid information to competing Providers.

The control computer receives from the Moderator the rate information and/or provider selection data, applies decision rules that the control computer administrator has inputted, and selects 334 a Provider for each set of end users this control computer serves. The control computer transmits 335 to the Moderator a notification identifying the Provider that has been selected, together with a specification of the estimated energy requirements for the set of end users this Provider will supply. The Moderator, in turn, will transmit 336 this information to a computer 337 associated with the selected Provider's energy network management computer and/or billing computer 338 of the DISCO that serves as the local energy distribution company for the set of end users to be supplied by the selected Provider.

As detailed in the description above, there are several, significant differences between the systems and methods disclosed in the Johnson et al. references and the system and method of auctioning basic generation services of present invention. For example, the Johnson et al. references disclose the transmission (or receipt) of "economic incentive data." According to the specifications of the Johnson et al. references, this limitation clearly requires the transmission (or receipt) of energy rates (i.e., the monetary charge for supplying a unit of energy), prices or credits for purposes of determining a winning bid. Moreover, the Johnson et al. references also disclose "prioritizing" of the bids received from the energy providers. Bids are sorted according to bid amount.

The Johnson et al. references also disclose the generation and utilization of "derivative data." According to the specification of the Johnson et al. references, "derivative data" is produced by processing or, in other words prioritizing, the economic incentive data. The derivative data is produced via the manipulation or transformation of raw bid data (i.e., economic incentive data) received from the providers. The Johnson et al. references also disclose "first end user set data." According to the Johnson et al. references, the "first end user set data" consists of "economic incentive data" and "derivative data." The Johnson et al. references additionally disclose that the provider is selected by processing first end user set data.

The Johnson et al. references also disclose the sharing of economic incentive data submitted by one energy provider (or data derived therefrom) with other energy providers to incent other providers to adjust their own bids. An energy provider may change its bid according to the bids or other providers as often as it likes.

Regarding the end of the auction process, the Johnson et al. references disclose that an energy provider is selected according to the lowest bid amount, the bid amount being the derived from the economic incentive data submitted by the energy provider as a bid.

Furthermore, the Johnson et al. references disclose such features as transmitting a selection notification to an energy provider and transmitting a copy of the selection notification to a local energy distribution company. The Johnson et al. references also disclose transmission of a specification of energy requirements a provider should be expected to provide to an energy provider, providing the energy providers with the amount of energy the provider will be expected to provide upon winning the auction before the auction begins. The Johnson et al. references also disclose periodic usage reports for reporting energy usage to be transmitted from a local energy company to an energy provider. The periodic usage reports are created from actual usage data from end users' meters.

Additional, the Johnson et al. references disclose facilitating forward delivery transactions, in which a buyer and seller agree to the terms of a transaction but schedule the delivery for a future time. In order to facilitate the forward delivery transactions, the buyer (i.e., end users or resellers acting as buyers) transmit supply requests to the Moderator with sufficient information to process the request, before the beginning of the auction.

Neither the Ausubel, the Ausubel et al., nor the Johnson et al. references disclose a system and method for computer-based auctioning in, for example, simultaneous, multiple round, descending clock auction format that both ensure a single end price for all portions of a similar product that reflects market trends while still allowing bidders to exit the auction before the end of the auction. These prior art references also fail to show or suggest other features of the present invention.

SUMMARY OF THE INVENTION

It is one feature and advantage of the present invention to provide a method and system for auctioning of basic generation services that ensures that prices for the basic generation services reflect market signals.

It is another optional feature and advantage of the present invention to provide a method and system for auctioning of basic generation services that ensures that all portions of a product sell for a uniform price.

It is another optional feature and advantage of the present invention to provide a method and system for auctioning of basic generation services that lowers the cost of bidder participation and lowers the cost for an Auction Manager.

It is another optional feature and advantage of the present invention to provide a method and system for auctioning of basic generation services that reduces the possibility of strategic participation in one auction but not another that could lead to higher procurement costs.

It is another optional feature and advantage of the present invention to provide a method and system for auctioning of basic generation services that improves the match of supplier and product.

These and other features and advantages of the present invention are achieved in a system for conducting a computer-based, simultaneous, multiple round, descending clock auction for basic generation services. The system includes a web server for receiving bid data from one or more users. The bid data comprises one or more bids one or more products, the bid data indicating a number of desired tranches for each product. A product is the basic generation service load of an electric distribution company for a given period or time or term. A single tranche represents an equal portion of the electric distribution company's basic generation service load. The system also includes an application server. The application server host application software, which processes the one or more bids according to at least one auction rule, tracks the auction, monitors the auction, and/or determines when to end the auction. The system further includes a database server, which stores auction data.

In another embodiment of the invention, the system also includes one or more client browsers, which enable users to submit the bid data to the web server.

In another embodiment of the invention, the system further includes a wide-area network, which enables communication between the client browsers and the web server.

In another embodiment of the invention, the web server and the application server are integrated into a single server.

In another embodiment of the invention, the web server and the application server are maintained on separate servers.

In another embodiment of the invention, the auction data stored by the database server includes user data obtained through an auction application and a qualification process and information regarding the products. The information includes a target auction volume for the auction, a tranche target for each product, and/or a load cap that may be specified for each of the products or for all products together.

In another embodiment of the invention, the Auction Manager can revise the target auction volume that is stored in the database server.

In another embodiment of the invention, the system further includes a system login computer, which logs all hits to the web server and/or the application server.

In another embodiment of the invention, the system also includes a back-up server, which provides back-up support and maintenance for the web server, the application server, and/or the database server.

In another embodiment, a system conducts a computer-based, simultaneous, multiple round, descending clock auction for basic generation services. The system includes a web server for receiving bid data from one or more users. The bid data comprises one or more bids for one or more products during multiple rounds of bidding, the bid data indicating a number of desired tranches for each product. A product is the basic generation service load of an electric distribution company for a given period or time or term. A single tranche represents an equal portion of the electric distribution company's basic generation service load.

The system also includes an application server. The application server host application software calculates a second round price for each of products for a second round of bidding based on the specified starting price and a number of tranches bid for each of the products during a first round of bidding. The second round price is lower than the specified starting price for any of the products that received a number of tranches bid greater than a tranche target for that product during the first round of bidding. The second round price is equal to the specified starting price for any of the products that received a number of tranches bid one of equal to and less than the tranche target for that product during the first round of bidding. The application software also sends a first round result of the first round of bidding to qualified bidders. The first round result includes the second round price for each of the products and a notice of the number of tranches bid during the first round for each product and/or another measure of bidding activity such as excess supply.

The application software repeats the steps of calculating round prices and sending round results for one or more subsequent rounds of bidding following the second round. A subsequent round price for each of the products for the one or more subsequent rounds of bidding is based on a previous round price of an immediately previous round of bidding and a number of tranches bid for each of the at least one of the plurality of products during the immediately previous round of bidding. The subsequent round price is lower than the previous round price for any of the products that received a number of tranches bid greater than a tranche target for that product during the immediately previous round of bidding. The subsequent round price is equal to the previous round price for any of the products that received a number of tranches bid one of equal to and less than the tranche target for that product during the immediately previous round of bidding. The round results include the subsequent round price for each of the products and a notice of the number of tranches bid during the immediately previous round of bidding for each of the products. The round results also optionally include another measure of bidding activity such as the amount of excess supply offered.

The application software also determines when the number of tranches bid during a round of bidding are one of equal to and less than the tranche target for each of the products, and, when the number of tranches bid for the round of bidding are one of equal to and less than a certain threshold for each of the at least one of the plurality of products such that no further bidding can take place under the auction rules, ends the auction after the round of bidding and awarding winning bidders an ending price for each of the products won by the winning bidders.

The system further includes a database server, which stores auction data. A maximum number of tranches bid which is capable of being made by a single one of the qualified bidders for a particular product is equal to or less than a load cap for that particular product.

During one of the second round and subsequent rounds of bidding, receiving bids further includes receiving, from at least one of the qualified bidders, at least one of a withdrawal request and a switch request. The withdrawal request indicates a desire of the qualified bidder making the withdrawal request to remove a first indicated number of tranches from one or more particular products and to reduce a maximum number bids that the qualified bidder is capable of making in future rounds of the auction. A switch request indicates a desire of the qualified bidders making the switch request to switch a second indicated number of tranches from one of the products to one or more different products. The ending price for each of the products is a final price from a final round of bidding, a named exit price, a price at which retained withdrawn bids were last freely bid, or a price at which denied switched bids were last freely bid, depending on the bids needed to just fill the tranche target.

In another embodiment, a method conducts a computer-based, simultaneous, multiple round, descending clock auction for basic generation services. The method includes the sequential, non-sequential, and sequence-independent steps of receiving electronic bids from bidders for one or more products, the electronic bids indicating a number of desired tranches for each product. Each of the products is a basic generation service load of an electric distribution company. A tranche represents an equal portion of the electric distribution company's basic generation service load. The method also includes processing the electronic bids according to at least one auction rule using auction software and sending an auction result to the bidders. The auction result includes current prices of the products, a current number of tranches bid for each of the products, and/or winning bidders for each of the products.

In another embodiment of the invention, the method further includes storing, before and/or during, bidder data obtained from the bidders through an auction application and qualification process and information regarding the products. The information includes at least one of a tranche target and a load cap for each of the at least one of the plurality of products.

In another embodiment of the invention, the method also includes retrieving, during the auction, the bidder data and the information regarding the at least one of the plurality of products.

In another embodiment of the invention, the method further includes submitting the electronic bids, over a wide-area network from the bidders, each of the bidders using a client browser.

In another embodiment of the invention, the step of submitting the electronic bids further includes sending a webpage to the client browser, which is used by the each of the a bidders to format and submit the electronic bids.

In another embodiment of the invention, since the auction proceeds in multiple rounds, the step of processing the electronic bids further comprising calculating the current prices of the at least one tranche of the at least one of the plurality of products for each of the multiple rounds.

In another embodiment, a method conducts a computer-based, simultaneous, multiple round, descending clock auction for basic generation services. The method includes the sequential, non-sequential, and sequence-independent steps of receiving electronic bids from qualified bidders indicating one or more desired tranches of one or more products at a specified starting price set by an Auction Manager for each of the at least one of the plurality of products during a first round of bidding. Each of the products comprises a basic generation service load of an electric distribution company. The one or more tranches represents an equal portion of the electric distribution company's basic generation service load.

The method also optionally includes calculating a second round price for each of the products for a second round of bidding based on the specified starting price and a number of tranches bid for each of the at least one of the plurality of products during the first round. The second round price is lower than the specified starting price for any of the at least one of the plurality of products that received a number of tranches bid greater than a tranche target for that product during the first round of bidding. The second round price is equal to the specified starting price for any of the at least one of the plurality of products that received a number of tranches bid one of equal to and less than the tranche target for that product during the first round of bidding.

The method further optionally includes sending a first round result of the first round of bidding to the qualified bidders. The first round result includes the second round price for each of the products and a notice of the number of tranches bid during the first round for each of the products and/or another measure of bidding activity such as excess supply. The method also includes receiving bids for one or more tranches of the products from the qualified bidders at the second round price during the second round of bidding.

The method further optionally includes repeating the steps of receiving bids, calculating next round prices and sending round results for one or more subsequent rounds of bidding following the second round. A subsequent round price for each of the products for the subsequent rounds of bidding is based on a previous round price of an immediately previous round of bidding and a number of tranches bid for each of the products during the immediately previous round of bidding. The subsequent round price is lower than the previous round price for any of the products that received a number of tranches bid greater than a tranche target for that product during the immediately previous round of bidding. The subsequent round price is equal to the previous round price for any of the at least one of the plurality of products that received a number of tranches bid one of equal to and less than the tranche target for that product during the immediately previous round of bidding. The round results include the subsequent round price for each of the products and a notice of the number of tranches bid during the immediately previous round of bidding for each of the products. The round results also optionally include another measure of bidding activity such as the amount of excess supply offered.

The method also optionally includes determining when the number of tranches bid during a round of bidding are equal to or less than the tranche target for each of the at least one of the plurality of products and, when the number of tranches bid for the round of bidding are equal to or less than the certain threshold for each of the products such that no further bidding can take place under the auction rules, ending the auction after the round of bidding and awarding winning bidders an ending price for each of the at least one of the plurality of products won by the winning bidders.

In another embodiment of the invention, the bidders are qualified during a pre-auction qualification process.

In another embodiment of the invention, the specified starting price is within a range of a maximum starting price and a minimum starting price for each of the products, which are announced before the start of the auction. In another embodiment, the specified starting price for the products are different from the specified starting price of the other products.

In another embodiment of the invention, the one or more tranches that are submitted by the bidders are from a single product. In another embodiment, the one or more tranches are from different products.

In another embodiment of the invention, a maximum number of tranches bid which is capable of being made by a single one of the qualified bidders is equal to or less than a bidding eligibility of the qualified bidder. In another embodiment, the bidding eligibility for the first round of bidding is equal to an initial number of tranches for which the qualified bidder applied before the auction started. In an alternate embodiment of the invention, the bidding eligibility for subsequent rounds of bidding is equal to a total number of tranches bid placed by the qualified bidder during the immediately previous round of bidding.

In another embodiment of the invention, a maximum number of tranches bid which is capable of being made by a single qualified bidder for a particular product is equal to or less than a load cap for that particular product.

In another embodiment of the invention, a duration of the round of bidding is extended when a qualified bidder submits an extension request before a bidding phase of the round of bidding has ended or is automatically granted an extension. During the extension, all of the qualified bidders are capable of submitting new bids, and a number of extensions remaining for the qualified bidders who submitted requests is decremented.

In another embodiment of the invention, the notice of the number of tranches bid and/or of the excess supply bid on the various products, which is reported in a round result, is a total number of tranches available in the auction or a range of numbers, the range having between five and ten integers. An exact number of tranches bid submitted during an immediately previous round falls within the range of numbers, and the largest integer of the range of numbers is divisible by five.

In another embodiment of the invention, during one of the second round and subsequent rounds of bidding, the step of receiving bids further includes receiving, from one or more of the qualified bidders, a withdrawal requests and/or a switch request. The withdrawal request indicates a desire of the qualified bidders making the withdrawal request to remove a first indicated number of tranches from one or more particular product and to reduce a maximum number bids that the qualified bidder making the withdrawal request is capable of making in future rounds of the auction. A switch request indicates a desire of the qualified bidder making the switch request to switch a second indicated number of tranches from one or more of the products to one or more different products.

In another embodiment of the invention, the one or more qualified bidder names an exit price for the first indicated number of tranches in the withdrawal request or abstains from naming an exit price for the first indicated number of tranches in the withdrawal request. In another embodiment, when the exit price is named, the same exit price is named for all bids that are request for withdrawal from a given product.

In another embodiment of the invention, the withdrawal request is at least partially refused for a refused number of tranches when accepting the withdrawal request in full would cause the number of tranches bid for the particular product from which the bid would be withdrawn to fall below the tranche target for that product. One or more of the refused number of tranches is retained on the product on which the refused number of tranches was bid. The refused number of tranches is reported to the qualified bidder.

In another embodiment of the invention, when the qualified bidder names an exit price, the refused number of tranches for which withdrawal is refused is retained on the at least one of the plurality of products on which the refused number of tranches was bid at a price equal to the named exit price.

In another embodiment of the invention, when the bidder abstains from naming an exit price, the refused number of tranches for which withdrawal is refused is retained on the at least one of the plurality of products on which the refused number of tranches was bid at a price equal to a price of a last round during which the refused number of tranches was freely bid before the withdrawal request was made.

In another embodiment of the invention, a bidder eligibility of the qualified bidder making the withdrawal request is lowered by the first indicated number of tranches even when the withdrawal request is refused.

In another embodiment of the invention, when, if at least two qualified bidders make withdrawal requests and named an exit price and the withdrawal requests are refused, bids of a bidder having a lower named exit price is retained first. In an alternate embodiment, when the at least two qualified bidders name an identical exit price, earlier confirmed bids in the round of bidding are retained or a decision on which tranches to retain are made on a random, tranche by tranche basis.

In another embodiment of the invention, the refused number of tranches retained on the product are released and allowed to be withdrawn during a first subsequent round during which a sufficient number of new bids are entered for the product such that a total number of tranches bid for that product for the first subsequent round is equal to or greater than the tranche target for that product. The release of the retained bids is reported to the qualified bidder making the withdrawal request.

In another embodiment of the invention, the switch request is at least partially refused for a refused number of tranches when accepting the switch request in full would cause the number of tranches bid for the product from which the bid would be switched to fall below the tranche target for that product. The refused number of tranches is retained on the at least one of the plurality of products on which the refused number of tranches was bid. The number of refused bids is reported to the qualified bidder making the switch request.

In another embodiment of the invention, the refused number of tranches or which switching is refused is retained on the product on which the refused number of tranches was bid at a price equal to a price of a last round during which the refused number of tranches was freely bid before the switching request was made.

In another embodiment of the invention, the refused number of tranches retained on the product is released and allowed to be switched during a first subsequent round during which a sufficient number of new bids are entered for the product such that a total number of tranches bid for that product for the first subsequent round is equal to or greater than the tranche target for that product. The release of the retained bids is reported to the qualified bidder making the switch request.

In another embodiment of the invention, the released bids from the switch request are deemed to be bid for the products from which they were released at a bidding price for the product for the first subsequent round of bidding after the bids are released.

In another embodiment of the invention, if the switching request is made to switch the second indicated number of tranches into at least two different ones of the at least one of the plurality of products, the at least one bidder specifies a switching priority. The switching priority indicates a preference among the at least two different ones of the at least one of the plurality of products into which the at least one bidder desires to switch.

In another embodiment of the invention, when both a withdrawal request and a switching request are made for a particular product, and the withdrawal request and the switching request are both at least partially refused for a refused number of withdrawn bids and a refused number of switched bids because accepting the withdrawal request and the switching request would cause a total number of tranches bid for the particular product to fall below the tranche target for that particular product, the refused number of withdrawn bids is retained first. The refused number of switched bids is retained when retaining the refused number of withdrawn bids still fails to raise the total number of tranches bid to at least equal the tranche target.

In another embodiment of the invention, the ending price for each of the products is a final price from a final round of bidding, a named exit price, a price at which retained withdrawn bids were last freely bid, or a price at which denied switched bids were last freely bid, depending on the bids needed to just fill the tranche target.

In another embodiment of the invention, a target auction volume comprises a total number tranches that a total number of electric distribution companies will purchase through the computer-based auction.

In another embodiment of the invention, the Auction Manager is capable of revising the target auction volume.

In another embodiment of the invention, the Auction Manager pauses the computer-based auction in order to revise the target auction volume at a time that is one of during and after a bidding phase of a round.

In another embodiment, a method conducts a computer-based, simultaneous, multiple round, descending clock auction for basic generation services. The method includes the sequential, non-sequential, and sequence-independent steps of receiving electronic bids from qualified bidders indicating two or more desired tranches of one or more products at a specified starting price set by an Auction Manager for each one or more products during a first round of bidding. Each product comprises a basic generation service load of an electric distribution company. A tranche represents an equal portion of the electric distribution company's basic generation service load.

The method also optionally includes calculating a second round price for each of the products for a second round of bidding based on the specified starting price and a number of tranches bid for each of the products during the first round of bidding. The second round price is lower than the specified starting price for any of the at least one of the plurality of products that received a number of tranches bid greater than a tranche target for that product during the first round of bidding. The second round price is equal to the specified starting price for any of the at least one of the plurality of products that received a number of tranches bid one of equal to and less than the tranche target for that product during the first round of bidding.

The method further optionally includes sending a first round result of the first round of bidding to the qualified bidders. The first round result includes the second round price for each of the products and a notice of the number of tranches bid during the first round for each of the products and/or another measure of bidding activity such as excess supply. The method also includes receiving bids for two or more tranches of the products from qualified bidders at the second round price during the second round of bidding.

The method further optionally includes repeating the steps of receiving bids, calculating next round prices and sending round results for at one or more subsequent rounds of bidding following the second round. A subsequent round price for each of the products for the subsequent rounds of bidding is based on a previous round price of an immediately previous round of bidding and a number of tranches bid for each of products during the immediately previous round of bidding. The subsequent round price is lower than the previous round price for any of the products that received a number of tranches bid greater than a tranche target for that product during the immediately previous round of bidding. The subsequent round price is equal to the previous round price for any of the products that received a number of tranches bid equal to or less than the tranche target for that product during the immediately previous round of bidding. The round result includes the subsequent round price for each of the products and a notice of the number of tranches bid during the immediately previous round of bidding for each of the products. The round results also optionally include another measure of bidding activity such as the amount of excess supply offered.

The method also optionally includes determining when the number of tranches bid during a round of bidding is equal to or less than the tranche target for each of the products, and, when the number of tranches bid for the round of bidding is equal to or less than the certain threshold for each of the products such that no further bidding can take place under the auction rules, ending the auction after the round of bidding and awarding winning bidders an ending price for each of the products won by the winning bidders. A maximum number of tranches bid which is capable of being made by a single qualified bidder is equal to or less than a bidding eligibility of that qualified bidders.

During the second round or subsequent rounds of bidding, the step of receiving bids further optionally includes receiving, from one or more of the qualified bidders, a withdrawal request and/or a switch request. The withdrawal request indicates a desire of the qualified bidder making the withdrawal request to remove a first indicated number of tranches from at one or more particular products and to reduce a maximum number bids that that qualified bidder is capable of making in future rounds of the auction. A switch request indicates a desire of the qualified bidder making the switch request to switch a second indicated number of tranches from one of the products to one or more different products. The ending price for each of products is a final price from a final round of bidding, a named exit price, a price at which retained withdrawn bids were last freely bid, or a price at which denied switched bids were last freely bid, depending on the bids needed to just fill the tranche target.

In another embodiment, a method conducts an auction in simultaneous, multiple round, descending clock auction format for basic generation services. The method includes the sequential, non-sequential, and sequence-independent steps of receiving bids from qualified bidders indicating one or more desired tranches of one or more products at a specified starting price set by an Auction Manager for each one or more products during a first round of bidding. Each product comprises a basic generation service load of an electric distribution company. A tranche represents an equal portion of the electric distribution company's basic generation service load.

The method also optionally includes calculating a second round price for each of the products for a second round of bidding based on the specified starting price and a number of tranches bid for each of the products during the first round of bidding. The second round price is lower than the specified starting price for any of the at least one of the plurality of products that received a number of tranches bid greater than a tranche target for that product during the first round of bidding. The second round price is equal to the specified starting price for any of the at least one of the plurality of products that received a number of tranches bid one of equal to and less than the tranche target for that product during the first round of bidding.

The method further optionally includes sending a first round result of the first round of bidding to the qualified bidders. The first round result includes the second round price for each of the products and a notice of the number of tranches bid during the first round for each of the products and/or another measure of bidding activity such as excess supply. The method also includes receiving bids for two or more tranches of the products from qualified bidders at the second round price during the second round of bidding.

The method further optionally includes repeating the steps of receiving bids, calculating next round prices and sending round results for at one or more subsequent rounds of bidding following the second round. A subsequent round price for each of the products for the subsequent rounds of bidding is based on a previous round price of an immediately previous round of bidding and a number of tranches bid for each of products during the immediately previous round of bidding. The subsequent round price is lower than the previous round price for any of the products that received a number of tranches bid greater than a tranche target for that product during the immediately previous round of bidding. The subsequent round price is equal to the previous round price for any of the products that received a number of tranches bid equal to or less than the tranche target for that product during the immediately previous round of bidding. The round result includes the subsequent round price for each of the products and a notice of the number of tranches bid during the immediately previous round of bidding for each of the products. The round results also optionally include another measure of bidding activity such as the amount of excess supply offered.

The method also optionally includes determining when the number of tranches bid during a round of bidding is equal to or less than the tranche target for each of the products, and, when the number of tranches bid for the round of bidding is equal to or less than the certain threshold for each of the products such that no further bidding can take place under the auction rules, ending the auction after the round of bidding and awarding winning bidders an ending price for each of the products won by the winning bidders. A maximum number of tranches bid which is capable of being made by a single qualified bidder is equal to or less than a bidding eligibility of that qualified bidders.

During the second round or subsequent rounds of bidding, the step of receiving bids further optionally includes receiving, from one or more of the qualified bidders, a withdrawal request and/or a switch request. The withdrawal request indicates a desire of the qualified bidder making the withdrawal request to remove a first indicated number of tranches from at one or more particular products and to reduce a maximum number bids that that qualified bidder is capable of making in future rounds of the auction. A switch request indicates a desire of the qualified bidder making the switch request to switch a second indicated number of tranches from one of the products to one or more different products. The ending price for each of products is a final price from a final round of bidding, a named exit price, a price at which retained withdrawn bids were last freely bid, or a price at which denied switched bids were last freely bid, depending on the bids needed to just fill the tranche target.

In another embodiment of the invention, the step of receiving bids manually from qualified bidders includes receiving bids orally using telephonic means, receiving bids through postal mail, hand delivery, and/or receiving bids by facsimile.

In another embodiment of the invention, the step of submitting a round result is performed manually by means including sending the round result orally using telephonic means, sending the round result through postal mail, hand delivery, and/or sending the round result by facsimile.

In another embodiment of the invention, the Auction Manager processes the bids using a computer program and/or a spreadsheet.

There has thus been outlined, rather broadly, the more important features of the invention and several, but not all, embodiments in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These, together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

FIG. 14 illustrates sample results of an auction for basic generation services;

FIG. 15 illustrates a sample round report;

FIG. 16 illustrates an Auction Manager's round report;

DESCRIPTION OF THE PREFERRED EMBODIMENTS

Figure 1A:
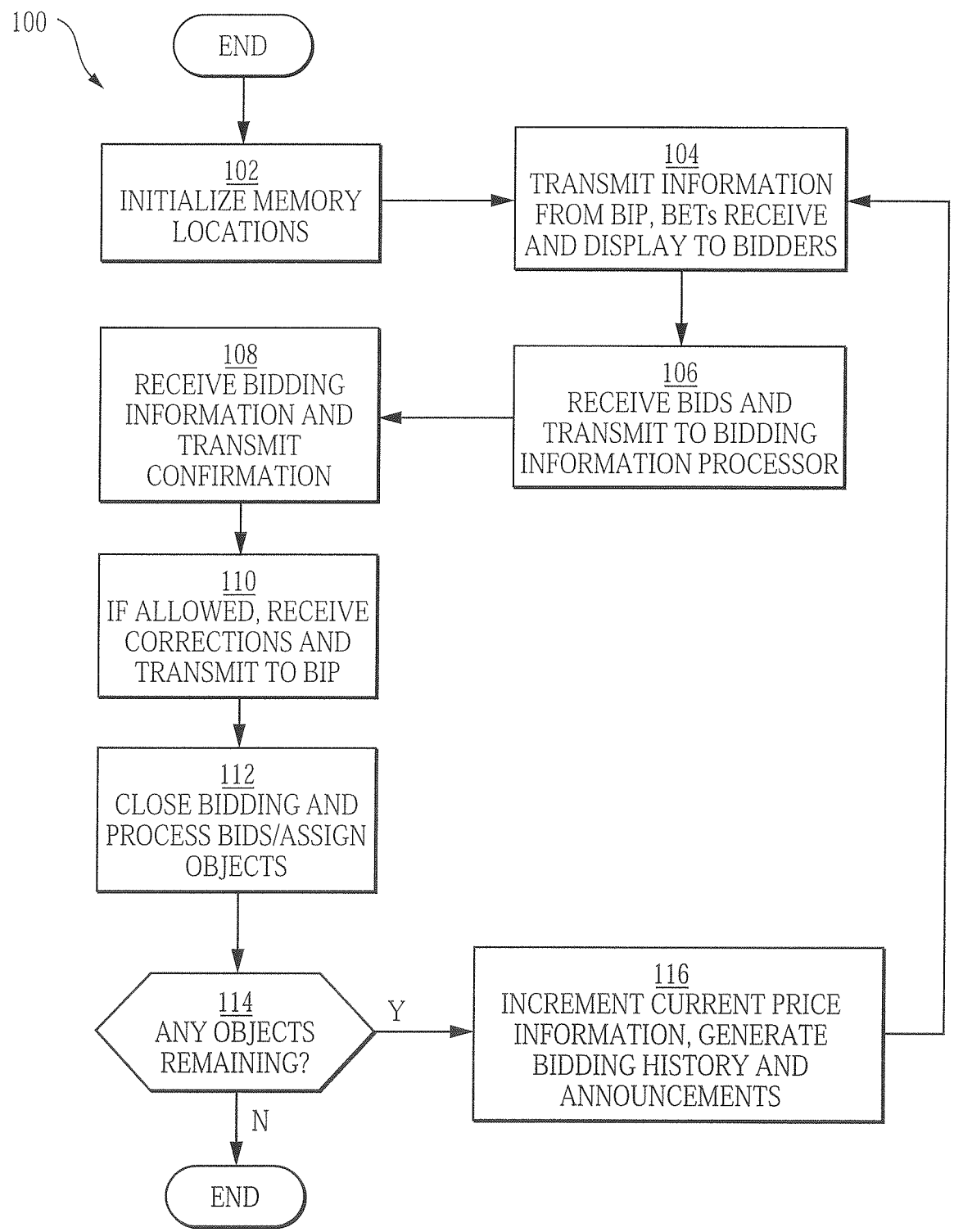
FIGS. 1A and 1B are flowcharts of a prior art method of computer-based auctioning.
Figure 1B:
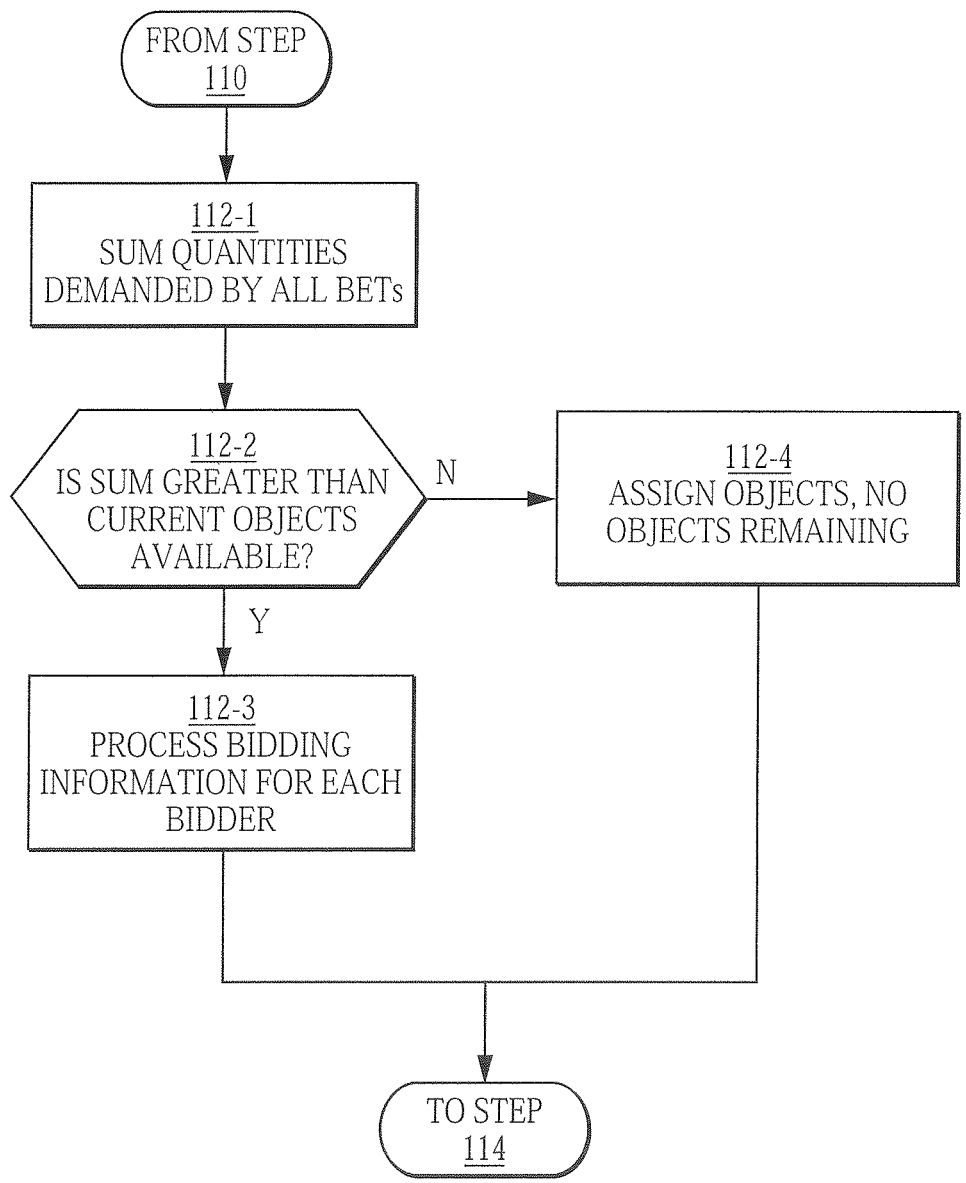
Figure 2:
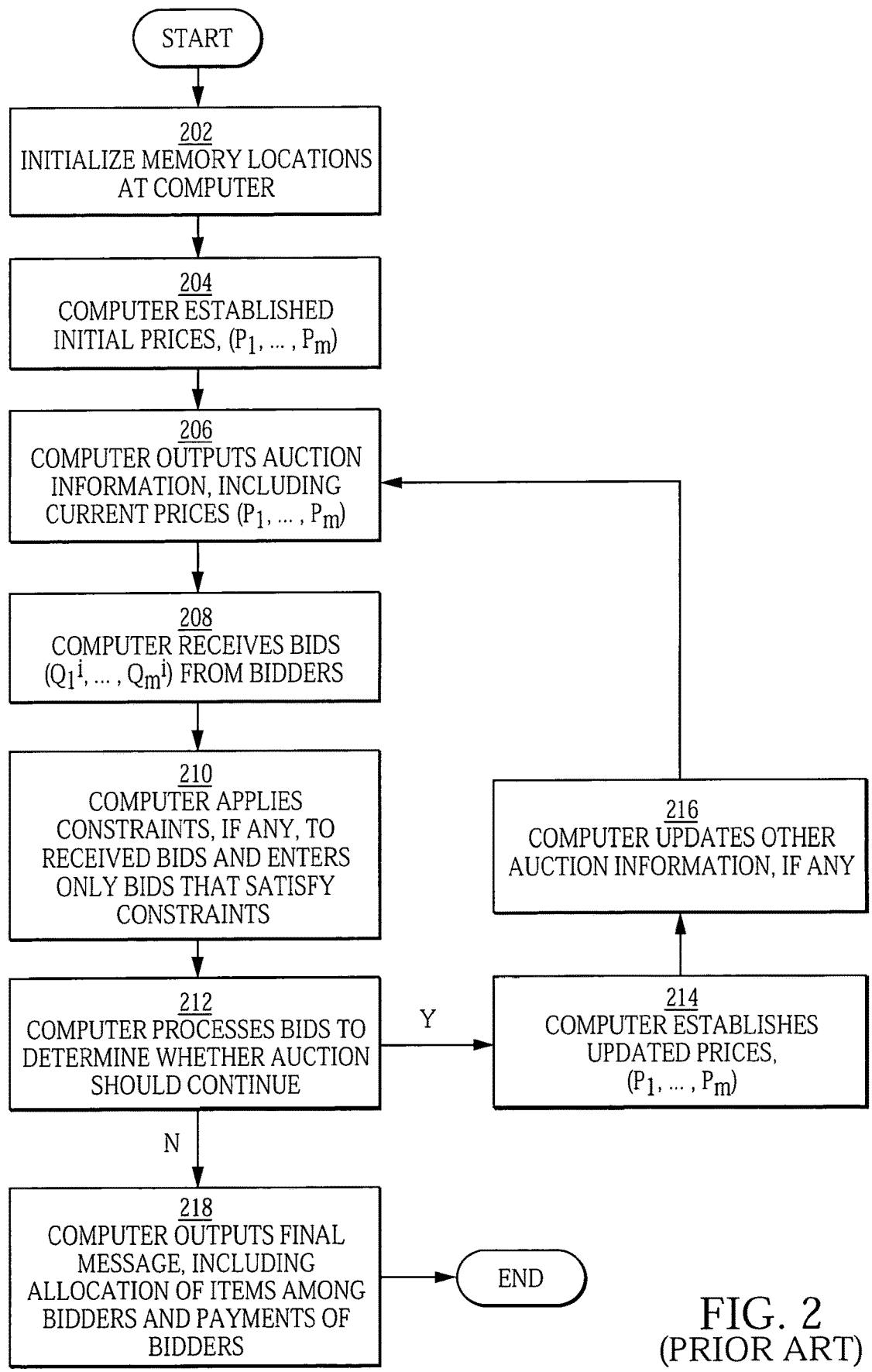
FIG. 2 is flowchart of a prior art method of computer-based auctioning.
Figure 3A:
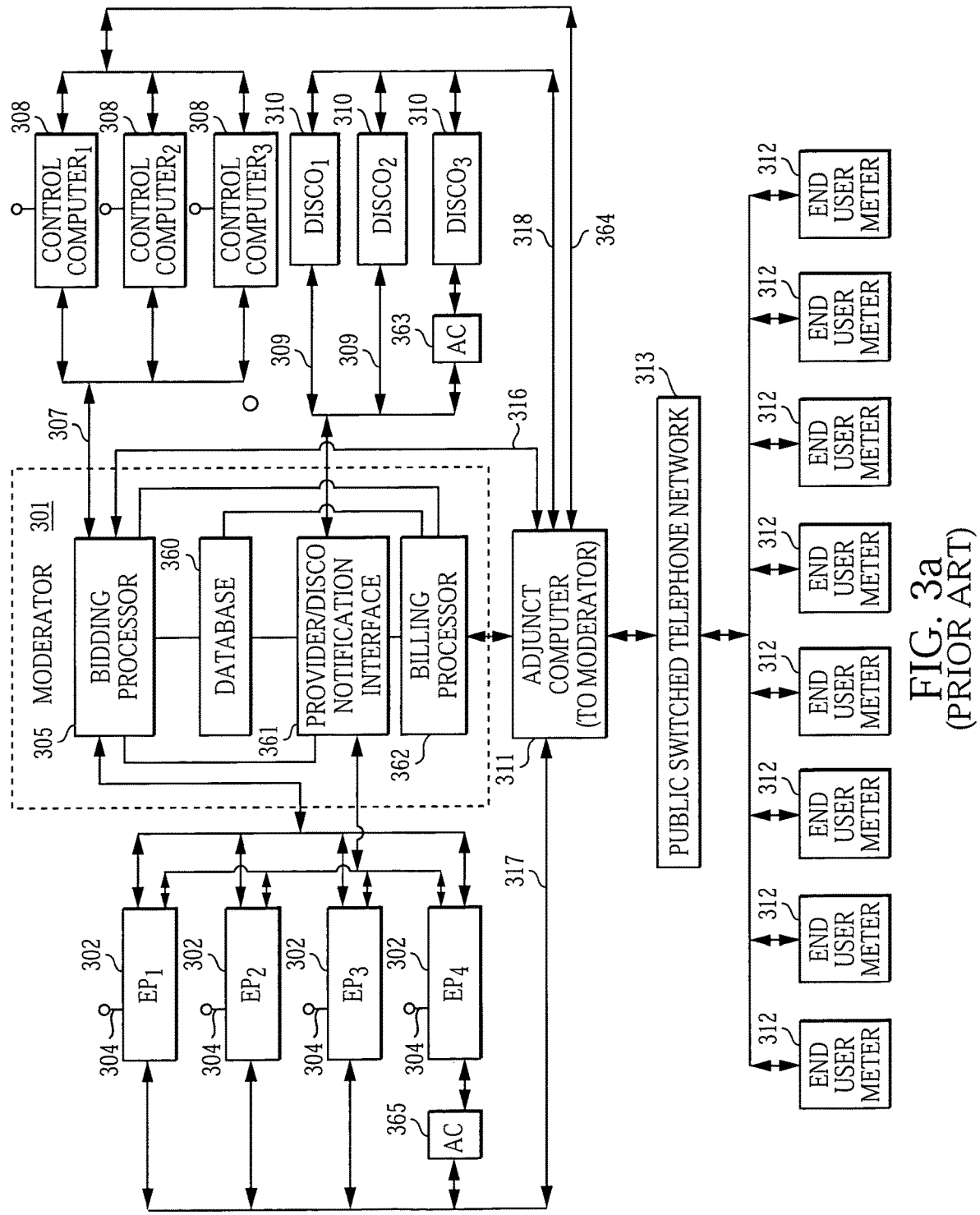
FIG. 3A is a block diagram of a prior art system for computer-based auctioning.
Figure 3B:
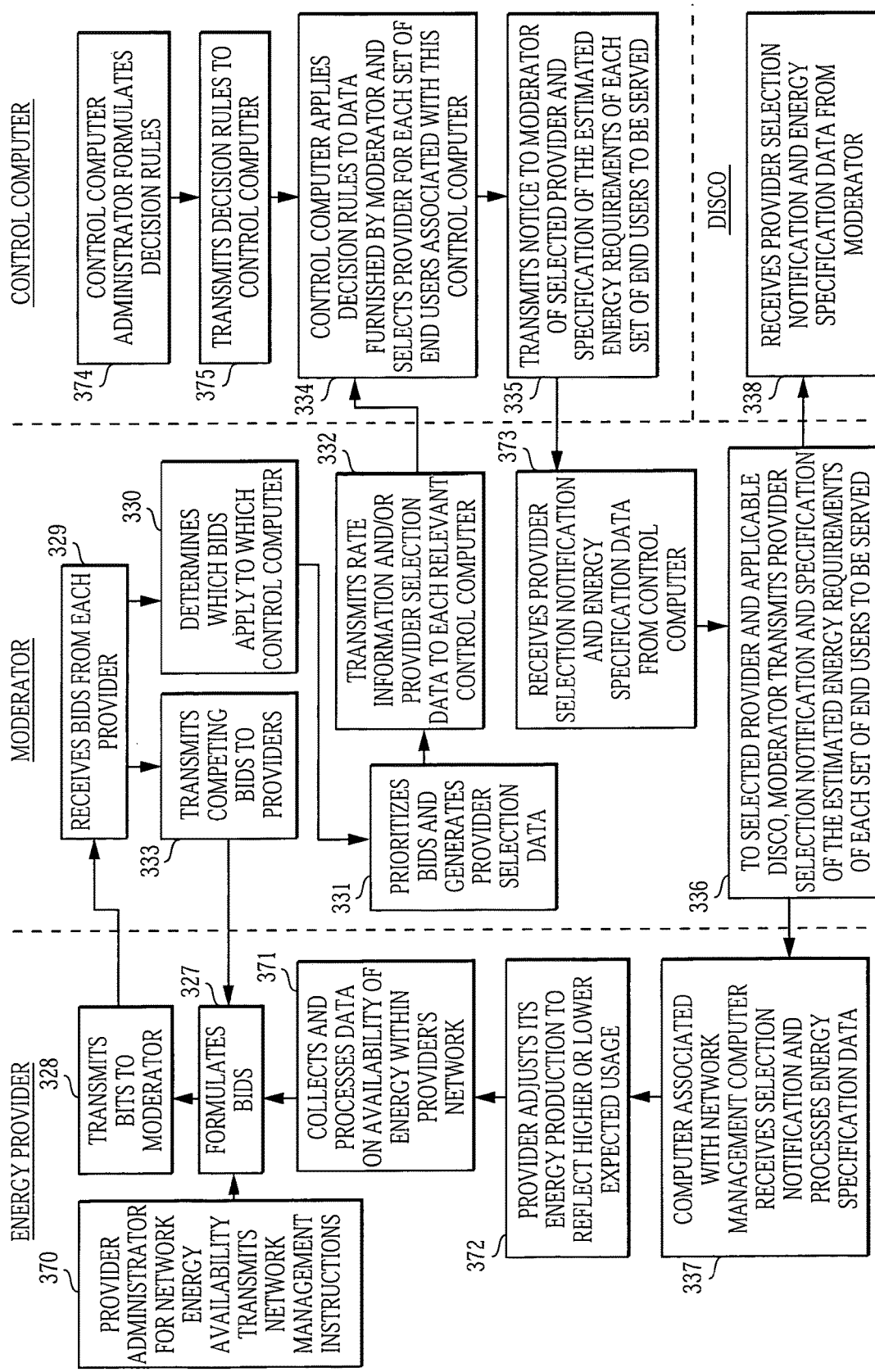
FIG. 3B is a flowchart of a prior art method of computer-based auctioning.

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

Overview

The auctioning method and system of the current invention arose from activities that took place within the New Jersey energy market. New Jersey implemented retail choice in August of 1998, at which time the state adopted a four-year transition period. During the first three years of the transition period, New Jersey's electric distribution companies supplied electricity to customers who did not switch to a competitive retailer. In the fourth year, however, the restructuring legislation called for competitive suppliers to provide basic generation services.

New Jersey held a statewide auction in 2002 in response to this legislative imperative. The goal of the auction was to provide basic generation services to customers at a cost consistent with market conditions and to move forward the transition in New Jersey to retail provision of these services. The New Jersey auction allowed the electric distribution companies to procure full-requirements service, which consists of the necessary energy, capacity, network transmission, and ancillary services to serve basic generation demand.

The present invention is directed to a computer-based system for conducting a simultaneous, multiple round, descending clock ("SDCA") auction. The embodiment described below pertains particularly to auctioning of basic generation services ("BGS"), although the auction format can be applied to auctions for other types of goods, products, or services. BGS serves as a backstop for those customers who either do not switch to a competitive supplier, or who are dropped by their competitive supplier.

The "product" for a BGS auction is the amount of supply, or load, required by a particular electric distribution company ("EDC"). The BGS load for an EDC is the load associated with retail electricity customers and is obtained by subtracting the load of third party suppliers from retail load in an EDC zone.

A biddable portion of a particular product is called a tranche. A tranche is a fixed percentage of an EDC's BGS load that represents, for example, approximately 100 MW (megawatts) of peak demand. Each EDC estimates its BGS peak load share in order to determine the number of tranches to be purchased through the auction.

A winning bidder, or supplier, will provide full requirements service for the percentage of the EDC's BGS load that corresponds to the number of tranches won. Full requirements service means that the provider is responsible for fulfilling all of the requirements of a Load Serving Entity ("LSE"), including capacity, energy, ancillary services, and transmission. A supplier may win two or more tranches for one or more EDCs. In exchange for assuming this responsibility, a winning supplier receives the final auction price, or ending price, for the load it serves. The load served by a winning supplier is equal to its share of the EDC's BGS load (the number of tranches won times the size of the tranche) times the EDC's BGS load for the period. The final auction price is a price in cents per kWh (0/kWh), and it may be different for each product.

For example, a supplier wins 7 tranches, or 13.72% of the total load, for the EDC Alpha Power at a price of 6.10/kWh. If, in a month, the Alpha Power load were 2,100,000 MWh, then the supplier would be paid $17.575 million (13.72% of 2,100,000 MWh at 6.10/kWh).

The SDCA auction is simultaneous in that all relevant products, e.g., tranches for all of the EDCs, can be sold at once, thus lowering the cost of bidder participation and the cost for an Auction Manager of holding the auction.

In a multiple round format, after bidders have finished a round, they can get information regarding the current state of bidding and can make an informed and strategic decisions for bidding in the next round. The multiple round format is advantageous in that it induces bidders to move from one product to another whenever there are unwarranted price differentials among products.

In a round, the Auction Manager announces a price for each EDC. Bidders bid by providing the number of tranches that they are willing to serve for each EDC at the prices announced by the Auction Manager. If the supply bid is greater than the load to be procured for an EDC, the price for that EDC is reduced for the next round. In the next round, bidders are given an opportunity to bid again.

Finally, in the descending clock format, prices for each product decrease incrementally from the specified starting price until supply is just sufficient to meet the product demand, which is the load to be procured for each EDC. Bidders that hold the final bids when the auction closes are the winners. All products are set at a fixed and/or uniform price (hereinafter referred to as "fixed price") a particular round. Therefore, the bidders are bidding, not on price, but rather on the amount of service they are willing to supply for a particular product. There are several benefits of fixed prices for products. One is that fixed prices give bidders a transparent way to determine the price of the products on which they are bidding. Such transparency reduces the risk to bidders and encourages maximum participation. Furthermore, fixed ensures that portions of a particular product all sell for the same price.

Auction System

In one embodiment of the present invention, bids are accepted electronically through web-based auction software. One of more embodiments of the auction software is based on the SimulCommerce™ auction software owned by Optimal Auctions, Inc (d/b/a/Alkera, Inc.), located at 2000 Powell Street, Suite 510 Emeryville, Calif. 94608. (See Appendix A.) The basic and standard SimulCommerce™ software is designed for ascending, multiple round auctions, and is incorporated herein by reference. In order to accommodate the SDCA auction, the SimulCommerce™ software was modified to perform the functionality described herein. (See Appendix B.) Other standard auction software packages may optionally be used.

Figure 4:
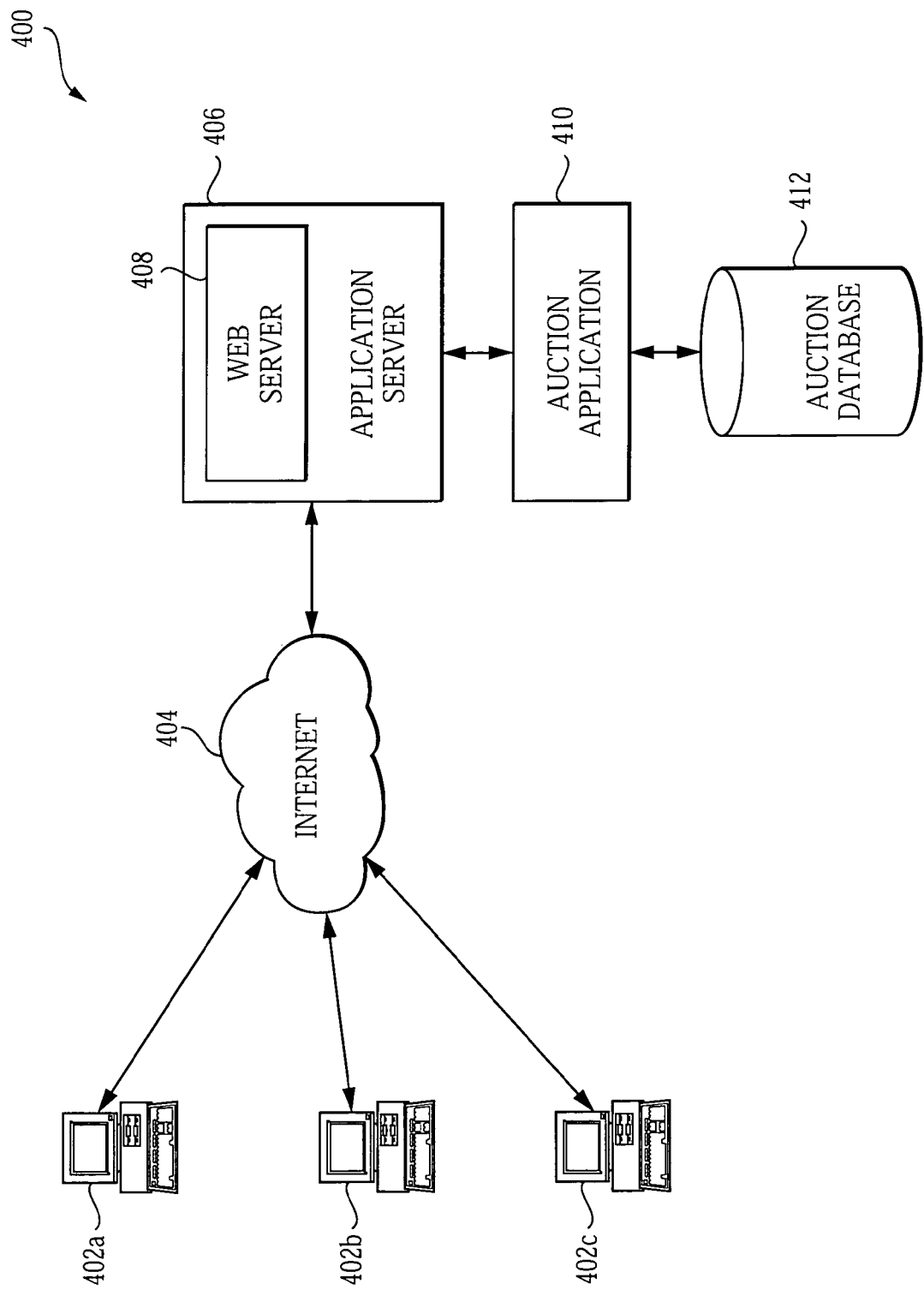
FIG. 4 is a network diagram of a system for computer-based auctioning of basic generation services according to the present invention.

FIG. 4 is a network diagram of a system for computer-based auctioning of BGS according to the present invention. Auction system 400 comprises, for example: client browsers 402; wide-area network 404, e.g., the Internet; application server 406; web server 408; auction application software 410; and auction database server 412.

Figure 5:
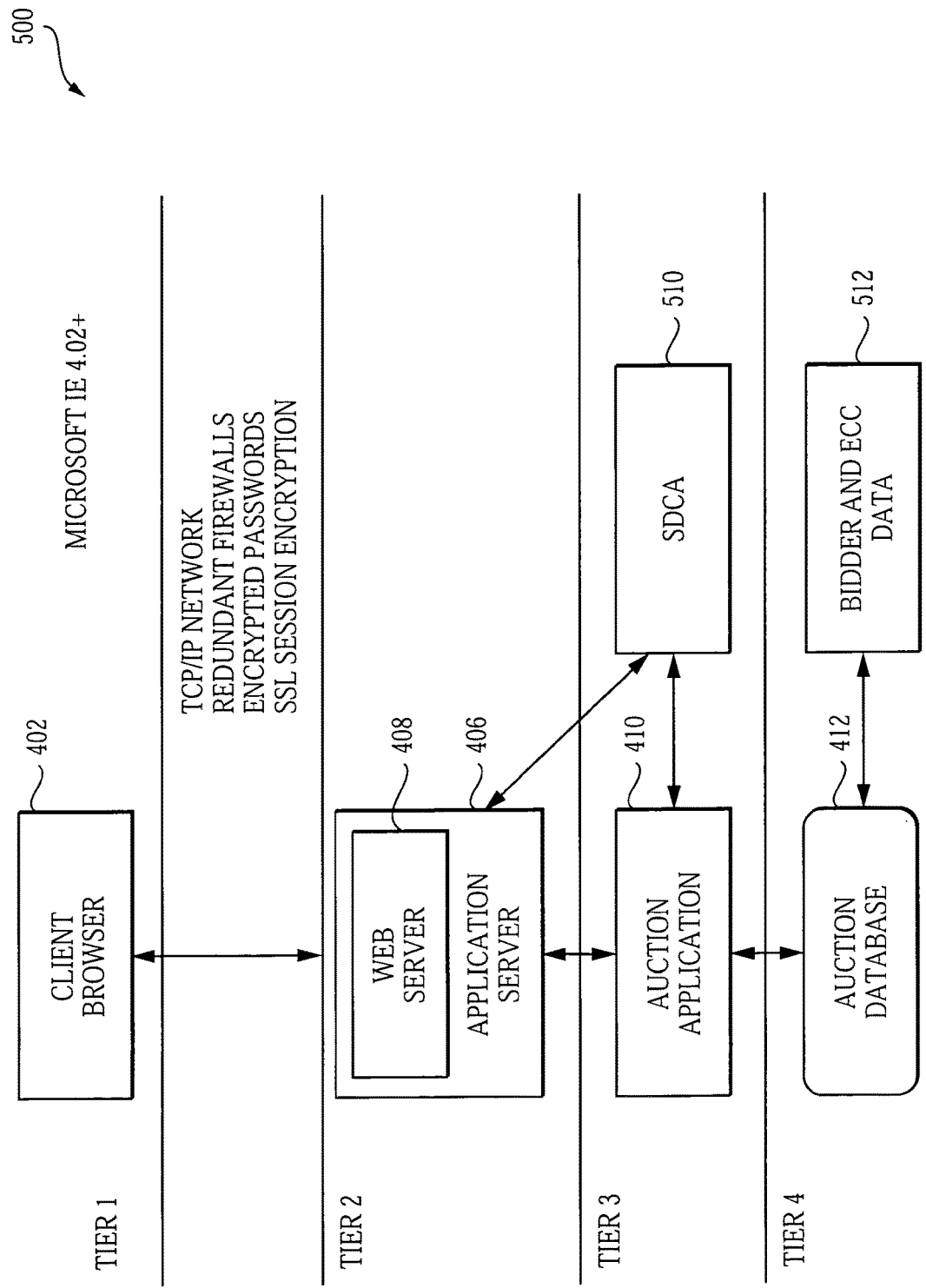
FIG. 5 is a block diagram of a system for computer-based auctioning of basic generation services according to the present invention.

FIG. 5 illustrates the architecture of the software utilized to implement the auction method of the current invention. The auction software accepts bids from the bidder entered from a local workstation over a public communications network, e.g., the Internet, and then processes the bid. The auction software also allows the Auction Manager to monitor the auction from a central location.

Although the Auction Manager may be a person, in one embodiment, the decisions made by the Auction Manager and actions taken by the Auction Manager during the course of the auction are influenced by information provided by the application software. Therefore, in the description below, the actions attributed to the Auction Manager are facilitated, at least in part, by auction application software 410.

The bidder enters a bid on a client browser 402, e.g., a personal computer, over the network, utilizing, for example, a web browser such as Microsoft™ Internet Explorer. The bid is submitted electronically to application server 406 by way of web server 408 in tier 2. Web server 408 and application server 406, also in tier 2, may reside on a single computer located at the Auction Manager's location, or may reside on separate computers. A program hosted by web server 408 sends a web page to the client browser in tier 1, which is used by the bidder to format and submit its bid. The bidder populates the webpage with its bidding information and submits the bid over the network to the web sever 408 and on to application server 406 in tier 2 using secure technology.

Application server 406 uses software, for example, standard Jakarta Tomcat 3.2.2, or other standard software, to handle the bidding transaction. The tier 2 application server 406 also runs auction application software 410 in tier 3. Auction application software 410 controls the auction, in this case, the SDCA auction format 510, and processes submitted bids according to the auction rules. The functions performed by auction application software 410 include tracking, monitoring, and determining when to end the auction. For example, auction application software 410 in tier 3 calculates the prices for each round, determines when the supply bid is sufficient to meet the load to be procured, identifies which bidders are winners of the final bids, and calculates ending prices for each EDC.

The auction database server 412 in tier 4 stores bidder data obtained through the application and qualification process and the information regarding the products being auctioned, e.g., the tranche targets and load caps of the electronic distribution companies ("EDCs"). To process submitted bids, application server 406, running auction application software 410, accesses the auction database server 412 to write bidder and product data to the auction database server 412 and to read the data from the auction database server 412. The auction database server 412 does not perform any calculations associated with the auction. The auction database server 412 may be maintained separately from the web server 406 and application server 406 to maintain the security of the information stored in database and can also be located at the Auction Manager's location.

The Auction Manager also may maintain a back-up server and a system login computer (not shown), which logs all hits to web server 408 and application server 406, in addition to maintaining web server 408, application server 406, and the auction database server 412. This complete complement of servers allows the Auction Manager to retain control over all aspects of the auction process.

In addition to submitting bids electronically using a computer, in one or more embodiments of the present invention, bidders may also submit bids using other, non-computer methods, in view of the advantageous auction rules. Bid may be submitted, for example, orally using a telephone (bidder calls in bid to the Auction Manager), by mail (bidder mails in bid to the Auction Manager), hand delivery (bidder hand delivers bid to the Auction Manager), or by facsimile (bidder faxes in bid to the Auction Manager). Other, non-computer-based methods of submitting bids are also contemplated by the present invention. Bids submitted manually, for example, through mail, hand delivery, or facsimile, may be submitted using a spreadsheet format, denoting the quantity of trenches bid for each EDC.

Auction Process

For the auctioning of BGS, a "product" is an EDC's BGS load. A tranche represents an equal portion of an EDC's BGS load. As described below in greater detail, bidders bid a number of tranches of each product. A "bid" is the number of tranches of each EDC's system to which a bidder wished to subscribe. A tranche of a product is a "full requirements tranche" of the BGS load for an EDC. A full requirements tranche means that the supplier is responsible for fulfilling all the energy requirements, including capacity, energy, ancillary services, transmission, and any other service as may be required. The size of a tranche for an EDC is a given percentage of the BGS load. This percentage is set individually for each EDC so as to represent approximately, for example, 100 MW of BGS Peak Load Share.

Due to weather, migration, load growth, and other factors, the actual obligations of each tranche are subject to uncertainty. BGS suppliers must be ready to meet any changes in these obligations. Data, which may be made available to potential suppliers before the start of the BGS auction includes, for example: BGS peak load allocations and total zonal values for capacity and transmission; the hourly demand of the BGS load; the periods and approximate quantities of all known sources of committed supply which terminate during the period in which suppliers would server or which span this period; and BGS monthly switching history (number of customers and estimated load). Information on how these data are related to a potential BGS supplier's obligation may also be provided. The data may include the associated losses.

The SDCA auction format proceeds in a series of rounds. During the bidding phase of each round, each bidder indicates how many tranches of each EDC the bidder wishes to serve at the prices announced by the Auction Manager. After the bidding phase of a round, the Auction Manager reduces the price for the tranches of an EDC by a decrement if the bidders subscribe to more tranches for that EDC than are available. If the tranches of an EDC are just subscribed or are undersubscribed, the announced price of a tranche for that EDC does not change in the next round. The Auction Manager then announces the new prices for each EDC before bidding in the next round opens.

Each round is formally divided into two phases: a "bidding" phase and a "reporting" phase. In the bidding phase, bidders submit their bids. In the BGS auction, the primary means for bidding is for bidders to log into auction application software 410 through an auction website and submit their bids on-line during the bidding phase. As long as the bidding phase is open, bidders can revise their bids. The last bid that a bidder submits and that was confirmed during the biding phase of the round is the bid that counts.

If a bidder has bid on an EDC and the price of the EDC's tranches does not decrease in a round, the bidder cannot reduce the number of tranches bid for that EDC. The bidder cannot withdraw tranches from that EDC or switch from that EDC to another, as described below in more detail. However, even if a bidder cannot decrease the number of tranches bid for an EDC for many rounds, a bidder may be able to do so later in the auction as other bidders switch into the product whose price has remained higher. Furthermore, bidders cannot increase the total number of tranches they bid during the auction. If a tranche is not offered in the first round, it cannot be offered later in the auction. Once a tranche is withdrawn from the auction, it cannot be bid again.

All bids are considered to be binding offers to supply the stated number of tranches for each EDC at the going prices announced by the Auction Manager. Offers to supply at the going prices cannot be rescinded. If an EDC is fully subscribed once, either the bids on that EDC remain until the end of the auction, or the bids (some or all of them) are replaced by offers to supply the same quantity at a lower price. Thus, as long as each EDC is fully subscribed at some point during the auction, then each EDC will be fully subscribed at the end of the auction.

In the reporting phase of the round, the Auction Manager reviews the results of the previous bidding phase and informs the bidders of these results. All bidders are informed of the going prices for the next bidding phase and are provided with a measure of the total number of tranches bid in the auction or another measure of activity, such as the amount of excess supply. Each bidder privately receives the results of the bidder's own bid from the previous round, but no information as to other bidders' bids, providing each bidder with its obligation at this point in the auction. In one embodiment, round results may be sent to bidders over web server 408 to client browser(s) 402. In one or more alternate embodiments, round results may be reported manually, for example, orally using a telephone, by mail, hand delivery, or by facsimile.

The auction continues and the prices tick down until, for each EDC's system, the total number of tranches subscribed falls to the point where it equals the number of tranches needed. When the auction ends, the bidders holding the tranches at the final auction prices are the auction winners.

Winners for each product are not determined until the auction has closed for all products. It is possible for the price of a particular EDC not to tick down because the number of tranches bid is just equal to the number of tranches desired. However, as the auction progresses and the prices for the other products tick down, some bidders will switch to that EDC, which will cause the price for the EDC's tranches to tick down again. Hence, until bidding stops for all products, the winners cannot be determined for any one product. There is no matching of suppliers to customers during the course of the auction or selection of winner by the Auction Manager. At the end of the auction, suppliers are revealed to be winners by not withdrawing from the auction. All bidders that win tranches for an EDC are given the same price per kWh.

Figure 6:
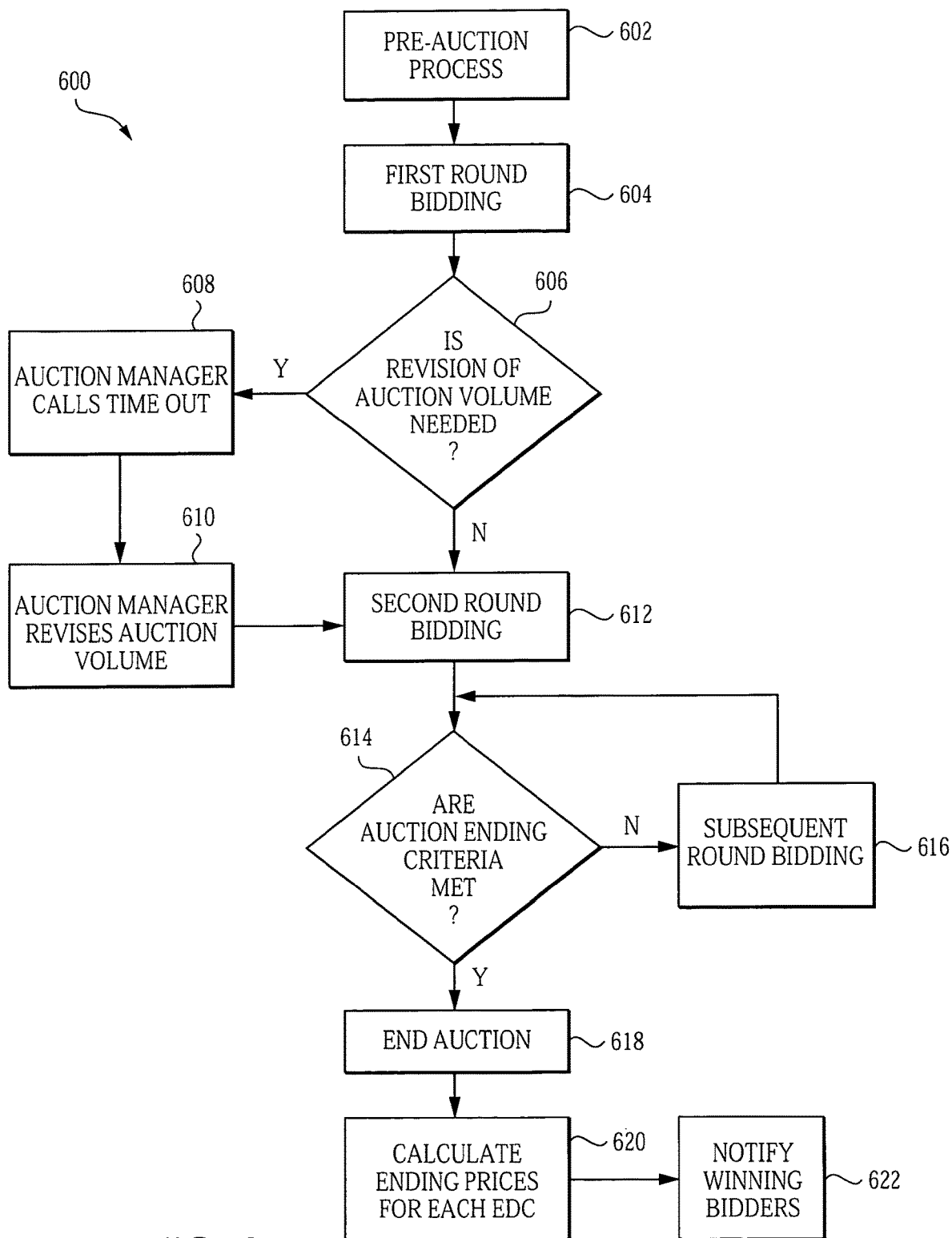
FIG. 6 is a flowchart of a method of conducting a computer-based auction for basic generation services according to the present invention.

FIG. 6 is a flowchart of a method of conducting a computer-based auction for basic generation services according to the present invention. In general, auction process 600 comprises, for example, a pre-auction process (step 602), a first round of bidding (step 604), and second round of bidding (612), any subsequent rounds of bidding (step 616) as are necessary, and an end-of-auction process, that includes calculating ending prices for each EDC (step 620).

During the pre-auction process (step 602), bidders qualify to participate in the auction and the Auction Manager announces the tranche target and load cap for each EDC. The load cap may be specified for the entire auction volume instead. The tranche target is the number of tranches that a particular EDC wants to purchase. The load cap for an EDC is a maximum number of tranches that any one bidder can bid for that EDC. In the case of a load cap for the entire auction, the load cap is a maximum number of tranches that any one bidder can bid in the auction. An EDC can impose a load cap to limit its exposure to any one credit source. The Auction Manager also announces the starting prices for each EDC. The pre-auction process is described below in more detail.

After the pre-auction process is completed, bidders participate in a first round of bidding (step 604). During or after the first round of bidding, the Auction Manager may determine that the target auction volume, i.e., the number of tranches to be procured through the auction, needs to be revised (step 606), to ensure the competitiveness of the auction. The Auction Manager may then call a pause in the auction, or a "time-out (step 608), to revise the target auction volume (step 610). The time-out may be called during or immediately after the bidding phase of the first round. The time-out last for a pre-determined period of time, for example, four hours, after which the reporting phase of the round resumes.

The target auction volume is initially set to be the full BGS load for all EDCs. The full BGS load is the largest portion of BGS load that can be purchased through the auction. If the target auction volume is restricted to less than 100% of the BGS load for all EDCs, each EDC may implement a contingency plan for their remaining tranches. If the full BGS load is purchased through the auction, then no portion of the BGS is purchased through the contingency plan. Under their contingency plans, the EDCs may purchase necessary services including, for example, installed capacity, and ancillary services, etc., through PJM-administered markets. An EDC would implement its contingency plan if its tranches were not fully subscribed or if a winning bidder defaults.

If revision of the target auction volume is necessary, the Auction Manager uses a set of guidelines, which may be pre-approved by an appropriate governing body, to reset the target auction volume. The revised target auction volume is determined as a function of the sum of bids in the first round and a target eligibility ratio (a desired ratio of first round bids to the full BGS load). In addition, factors such as the number of bidders and individual bids could be taken into account in setting the target eligibility ratio and in deciding whether the target auction volume should be the full BGS load for all EDCs.

The target auction volume is reset to the number of tranches bid in the first round divided by a parameter, which represents the ratio of the first round bids to the full BGS load, called initial eligibility ratio. The parameter is chosen by the Auction Manager to be between, for example, 1.25 and 1.6. The precise value of this parameter depends on various factors, such as the number of bidders and the characteristics of individual bids. This adjustment ensures that, to start the auction, there are between 1.25 and 1.6 tranches bid for every tranche to be bought, and therefore, it is a competitive bidding environment. The following example illustrates how it is envisioned that the target eligibility ratio, the first round bids, and a target contingency plan limit would be used to determine whether and by how much the target auction volume should be revised. The target contingency plan limit is a desired bound on the exposure of the EDCs to the contingency plan expressed as a percentage of full BGS load. This bound may be exceeded to ensure a competitive bidding environment. In an alternate embodiment, the auction may not have a contingency plan limit and/or may use different ratios than used in this example.

The first step in determining whether the target auction volume should be revised is for the Auction Manager to determine the parameter, or initial eligibility ratio. If this ratio is, for example, 1.9, it indicates that for each tranche available, bidders stand ready to supply 1.9 tranches at the starting prices. Suppose, for illustrative purposes, that the target eligibility ratio is 1.5. If the calculated initial eligibility ratio is 1.5 or more, then the auction proceeds for the full BGS load of each EDC. If the calculated initial eligibility ratio is lower than 1.5, then the target auction volume will be revised and the remainder of the full BGS load would be procured through the contingency plan, as is explained below.

If the auction cannot proceed for the full BGS load, the second step is for the Auction Manager to determine the percentage of tranches procured through the contingency plan when the target auction volume is revised so as to produce a 1.5 initial eligibility ratio. For example, given first round bids that total 120 tranches, an initial eligibility ratio of 1.5 would mean that the target auction volume would be restricted to 80 tranches (120/80=1.5). The remainder of the tranches (with a full BGS load of, for example, 95 tranches, leaving a remainder of 15 tranches) would be procured through the contingency plan. (Incidentally, in this example, a full BGS load of 95 tranches would have produced an initial eligibility ratio of 1.26, which would prompt the Auction Manager to revise the target auction volume.)

As another example, in the bidding phase of round 1, the target auction volume is 170 tranches, which is the sum of all of the EDCs' tranche targets. Suppose that there is a total of 222 tranches bid in the first round, making the initial eligibility ratio 1.3. Given the number of bidders and the characteristics of the bids, the Auction Manager sets the initial eligibility ratio at 1.5. The target auction volume is then 148 tranches (222/1.5). In round 2, there will be 1.5 tranches bid for every tranche to be purchased through the auction (222/148=1.5). This would leave 22 tranches (170−148=22) to be procured through the contingency plan.

Suppose, for example, that the EDCs set their target contingency plan limit to 20%. If the tranches procured through the contingency plan represent 20% or less of the full BGS load, then the auction will proceed with the revised target auction volume that results in a 1.5 initial eligibility ratio. If, by imposing a 1.5 initial eligibility, the tranches procured through the contingency plan represent more than 20% of the full BGS load, then the third step is to readjust the target auction volume so as to reduce exposure to the contingency plan. The target auction volume is increased until the target limit exposure to the contingency plan is reached. If this target auction volume results in an eligibility ratio of 1.25, for example, no further adjustments are made. Otherwise, the target auction volume is further adjusted until the eligibility ratio of 1.25 is reached.

For instance, if there were 90 tranches bid in the first round, the auction volume for an initial eligibility ratio of 1.5 would be 60 (90/60=1.5). With a full BGS load of 95 tranches, there would be 35 tranches, or 37% left. The Auction Manager would increase the target auction volume to 72 tranches. When the target auction volume is 72 tranches, the initial eligibility ratio is 90/72=1.25 and the exposure to the contingency plan is ((90−72)/95)× 100%)=24%. Even though this is not within the 20% contingency plan limit of the example, the target auction volume is not increased any further so as to maintain the 1.25 initial eligibility ratio.

The Auction Manager also retains the discretion to revise load caps for the EDCs after the target auction volume is revised, based on the revised target auction volume and the sum of the first round bids. An EDC may require that its lad cap, if it is revised, only be revised downward. As early as possible during the time-out, the Auction Manager announces the revised auction volume, as well as a new tranche target for each EDC and any revised load caps. Once the time-out is over (if it was called), the reporting phase of the round resumes.

Based on the bids as the auction progresses, in order to ensure a competitive bidding environment, revision of the target auction volume may occur during the second and subsequent rounds of the auction, as well, at the discretion of the Auction Manager. The target auction volume may be revised once during or after the second round of the auction. This adjustment can occur whether or not there is a volume adjustment in the first round.

After round one ends, including any auction volume revisions, the second round of bidding occurs (step 612). After the second round of bidding ends, the Auction Manager, utilizing auction application software 410, determines whether the criteria for ending the auction have been met (step 614). If the criteria have been met, the auction ends (step 618), otherwise, subsequent bidding rounds continue (step 616).

The auction ends for all EDCs at once. The auction ends when bidding has stopped on all EDCs and no further bidding is possible. At the prices for the round, the number of tranches bid is equal to (or is smaller than) the tranche target for each EDC. The auction can end, for example, only if there are no retained switches that have been outbid and that could subsequently be bid on an EDC, as described below in greater detail. Bidders that win tranches for an EDC are those that bid at the last round price and, if necessary, those that had tranches retained (from a switch or from a withdrawal) to fill the tranche target of that EDC. All bidders that win tranches for an EDC are given the same ending price for their tranches, as calculated by auction application software 410 (step 620). Winning bidders are then notified (step 622), for example, by way of client browsers 402.

A. Pre-Auction Process

Figure 7:
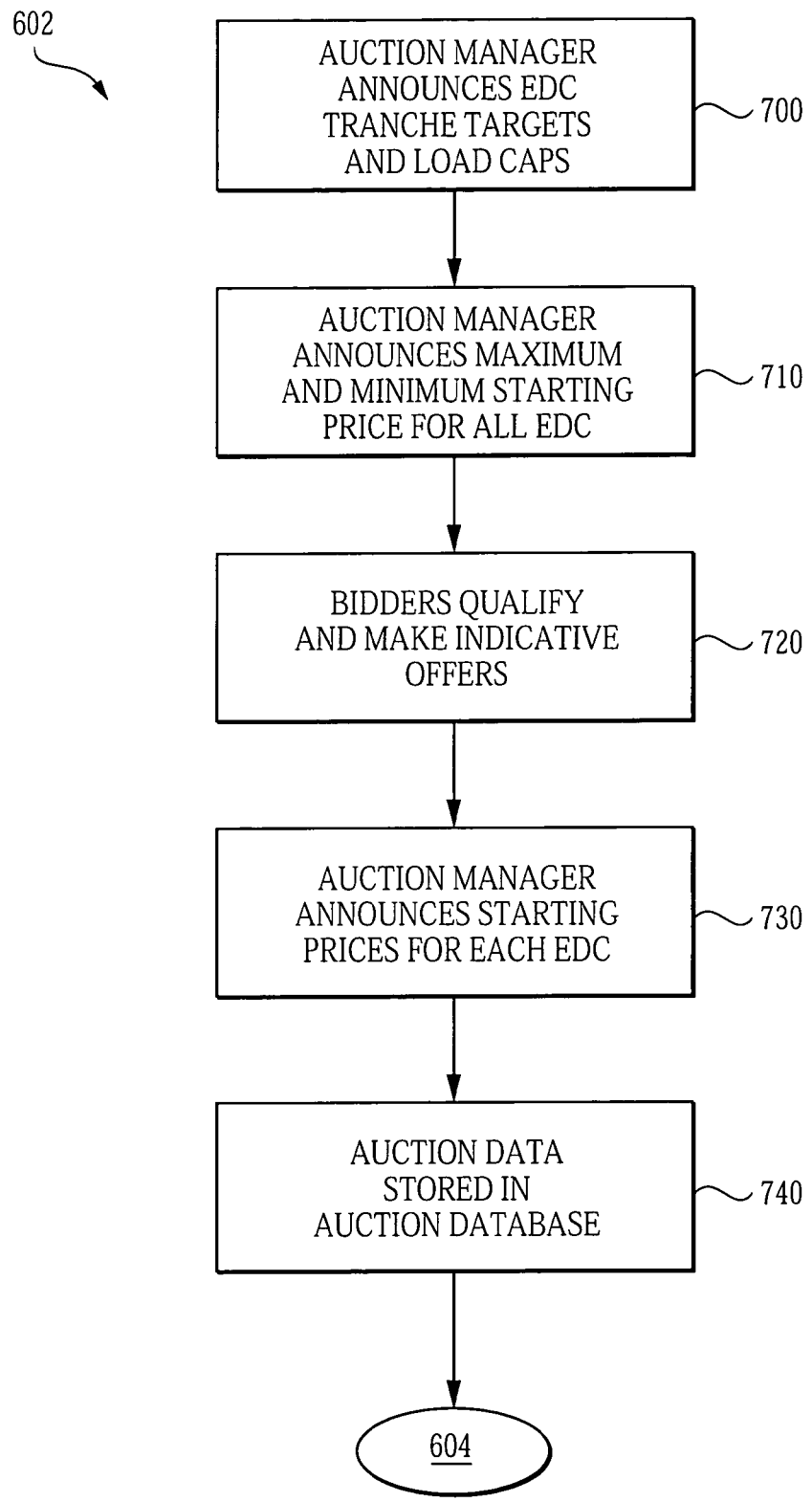
FIG. 7 is a flowchart of a method of a pre-auction process according to the present invention.

FIG. 7 is a flowchart of a method of a pre-auction process according to the present invention. Pre-auction process 602 begins as the Auction Manager announces the tranche targets and load caps for each EDC (step 700). The Auction Manager also announces a single maximum starting price and a single minimum starting price for all EDCs (step 710). Maximum and minimum starting prices may be based on, for example, statewide price limits and/or may be specified by the individual EDC.

The EDCs, in consultation with the Auction Manager, may determine that, due to extraordinary events, the single maximum starting price and the single minimum starting price require revision. In this event, the schedule may also be revised. If the indicative offers have already been received, the Auction Manager would request that the qualified bidders revise their indicative offers on the basis of the revised single maximum starting price and the revised single minimum starting price.

Such a revision to would happen if an extraordinary event occurs between the time at which the single maximum and single minimum starting prices are announced and the day on which the auction starts. All of the EDCs preferably agree on what constitutes an extraordinary event. Such extraordinary events could include, for instance, a significant change in the rules.

If an extraordinary event occurs, the EDCs determine a revised single maximum starting price and a revised single minimum starting price on the basis of methodology approved by the appropriate governing body. The bidders then make new indicative offers, as described below. The determination of new maximum and minimum starting prices, the submission of new indicative offers, and, the announcement of new starting prices is done so as to afford qualified bidders sufficient time to revise their indicative offers.

Potential suppliers then qualify to participate in the auction and make indicative offers (step 720). The qualification process may include, for example satisfying financial qualifications and disclosures of associations with other potential suppliers.

Qualification criteria are agreed upon by all EDCs whose systems are part of the auction. As conditions of qualification, applicant must, for example: meet pre-bidding credit worthiness requirements; agree to comply with all rules of the auction; and agree that, if they become auction winners, they will execute an agreement with a certain time period after certification of the auction results, and that they will demonstrate compliance with the creditworthiness requirements. An example of a qualification form is included in Appendix C. Interested parties are notified at some time before the start of the auction whether they have become qualified bidders and may participate in the auction. After the qualification process, the Auction Manager may send simultaneously to each qualified bidder a list of all qualified bidders.

Certifications as to associations between qualified bidders must also be provided. A qualified bidder is associated with another qualified bidder if the two bidders have ties that could allow them to act in concert or that prevent them from competing actively against each other in the auction. The competitiveness of the auction and the ability of the auction process to deliver competitive prices may be harmed by the coordinated or collusive behavior that such associations facilitate. The Auction Manager, who may rely on, amongst other factors, the number of independent competitors to set the target auction volume, will be using inaccurate information unless such associates are duly disclosed. The target auction volume is a number of tranches that the EDCs will purchase through the auction. Associations may be considered in setting the target auction volume and may be used in the application of load caps.

Sanctions may be imposed on a qualified bidder for failing to disclose information relevant to determining associations or coordinating with another qualified bidder. Such sanctions may include, but are not limited to, loss of all rights to serve any BGS load won in the auction by such a bidder, forfeiture of bid bonds and other fees posted or paid, prosecution under applicable state and federal laws, and other appropriate sanctions. Further information regarding Association and Confidential Information Rules may be found in Appendix D.

After qualifying to participate in the auction, qualified bidders then submit an indicative offer along with a bid bond. A sample form for the submission of bid bonds and indicative offers is included in Appendix E. The bid bond is a certain amount per tranche, for example, $1 million per tranche, of the indicative offer, to be provided in a form acceptable to the EDCs. Pre-auction security in addition to the bid bond may be required based upon the creditworthiness assessment made of the qualified bidder during the qualification process. Pre-auction security is also submitted in a form acceptable to the EDCs.

An indicative offer states a number of tranches that the qualified bidder is willing to serve statewide at the single maximum starting price and a number of tranches that the qualified bidder is willing to serve statewide at the single minimum starting price. The number of tranches at the maximum starting price is the qualified bidder's "initial eligibility." The number of tranches indicated by the qualified bidder cannot exceed the sum of the load caps for all the EDCs. The number of tranches indicated by the qualified bidder at the maximum starting price cannot be fewer than two tranches.

The qualified bidder is also asked to indicate its maximum interest in each EDC at the maximum and at the minimum starting prices. The sum of the qualified bidder's maximum interest in each EDC at a given price can exceed the statewide number of tranches that the qualified bidder is willing to serve at that price. Information that a qualified bidder provides regarding its interest in any particular EDC has no effect on initial eligibility or subsequent bidding in the auction. Indicative offers are considered in determining starting prices. Since the bidder's initial eligibility constrains bidding activity for the duration of the auction, qualified bidders should state in their indicative offers the maximum number of tranches that they wish to serve.

For example, if a qualified bidder indicates that it will serve up to a total number of 20 tranches at the maximum starting price (the initial eligibility), then the qualified bidder could also indicate that it is willing to serve a maximum of 20 tranches for one EDC, 15 for another EDC, 8 for a third EDC, and 2 for a fourth EDC. The sum of the qualified bidder's maximum interest in each EDC (here, 45 tranches) exceeds the statewide number of tranches indicated by the bidder (the initial eligibility, 20). The qualified bidder is declaring itself willing to serve at most 20 tranches in total, and willing to serve all of the tranches from the first EDC. The qualified bidder would also e willing to serve, at most, 15 of those 20 tranches from the second EDC, and, at most, 8 and 2 tranches from the last two EDCs, respectively.

The bid bonds that qualified bidders post are in proportion to their initial eligibility. For example, a qualified bidder with an indicative offer that specifies that, at the maximum starting price, the bidder wishes to serve at most 20 tranches would post a bid bond of $20 million (20 tranches at $1 million each). Bid bonds remain in full force until the auction is concluded and the bidder has won no tranches, or until the auction is concluded and the bidder has won tranches, has signed the post-auction agreement, and has provided security, if appropriate, in a form acceptable to the EDC or EDCs. The EDCs can collect the bid bonds if bidders fail to comply with their obligations.

After a qualified bidder submits its indicative offer and bid bond, and after they are accepted, the qualified bidder becomes a registered bidder. The Auction Manager may send simultaneously to each registered bidder a list of all registered bidders and information regarding the total initial eligibility in the auction, which is the sum of all of the initial eligibilities of the registered bidders.

After all bidders who will be participating in the auction have qualified and registered, the Auction Manager announced the starting prices for the first round of the auction and the target auction volume, which may be later revised, as described above (step 730). The starting price for each EDC is set no higher than the single maximum starting price and no lower than the single minimum starting price. Each EDC sets its own starting price, though the Auction Manager may advice the EDCs and an appropriate government agency may have an opportunity to observe the decision process. The Auction Manager announces the starting prices for all EDC at some time after all bidders are registered but before the start of the auction.

The auction data, which includes, for example, the target auction volume, the EDC tranche targets and load caps, the qualified bidders' initial eligibility, and the starting prices for each EDC is stored in auction database server 412 (step 740). Pre-auction process 700 ends and auction process 600 proceeds to the first round of bidding (step 604).

B. First Round of Bidding

Figure 8A:
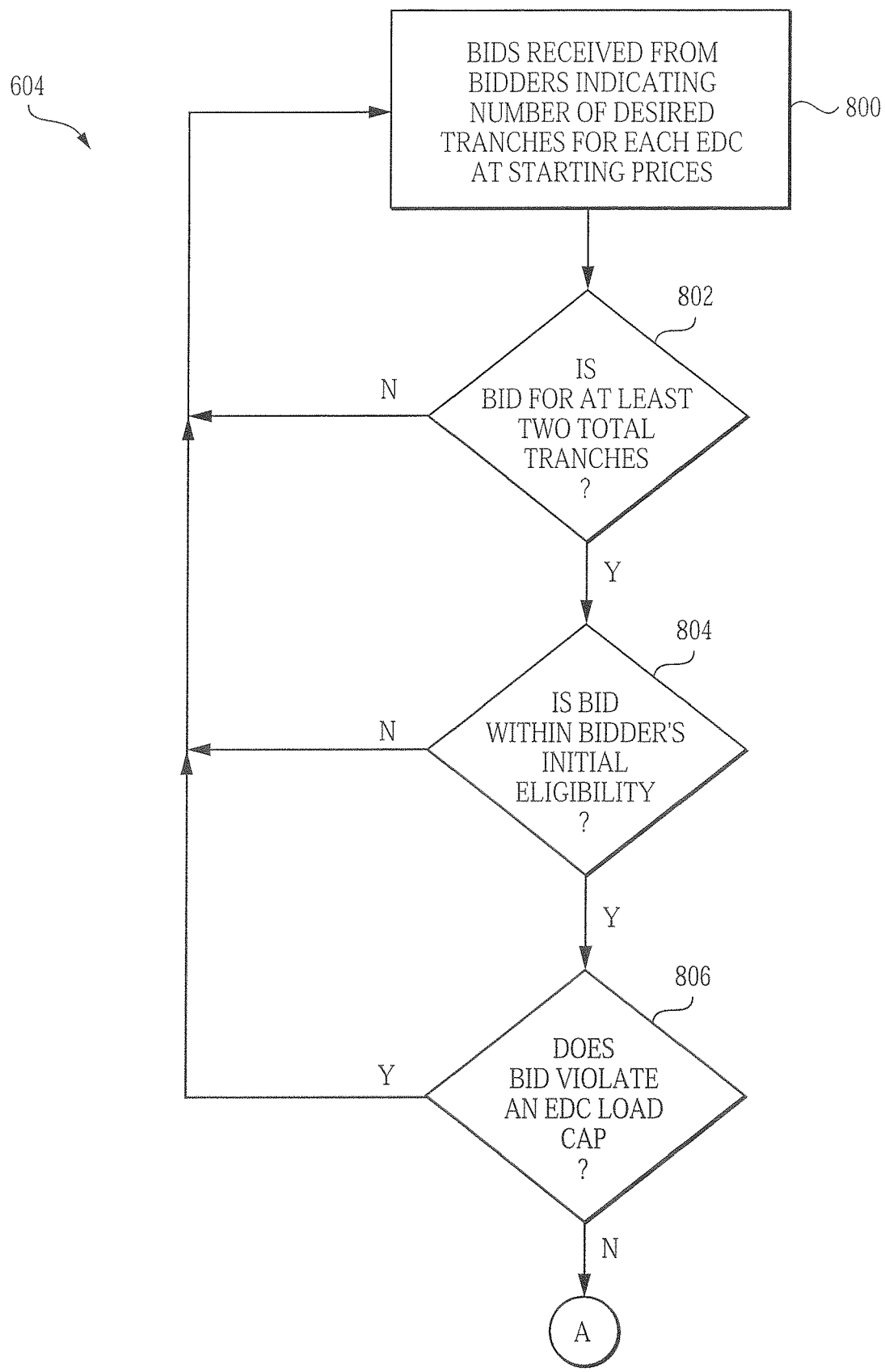
FIGS. 8A and 8B are flowcharts of a method of conducting a first round of bidding for basic generation services according to the present invention.
Figure 8B:
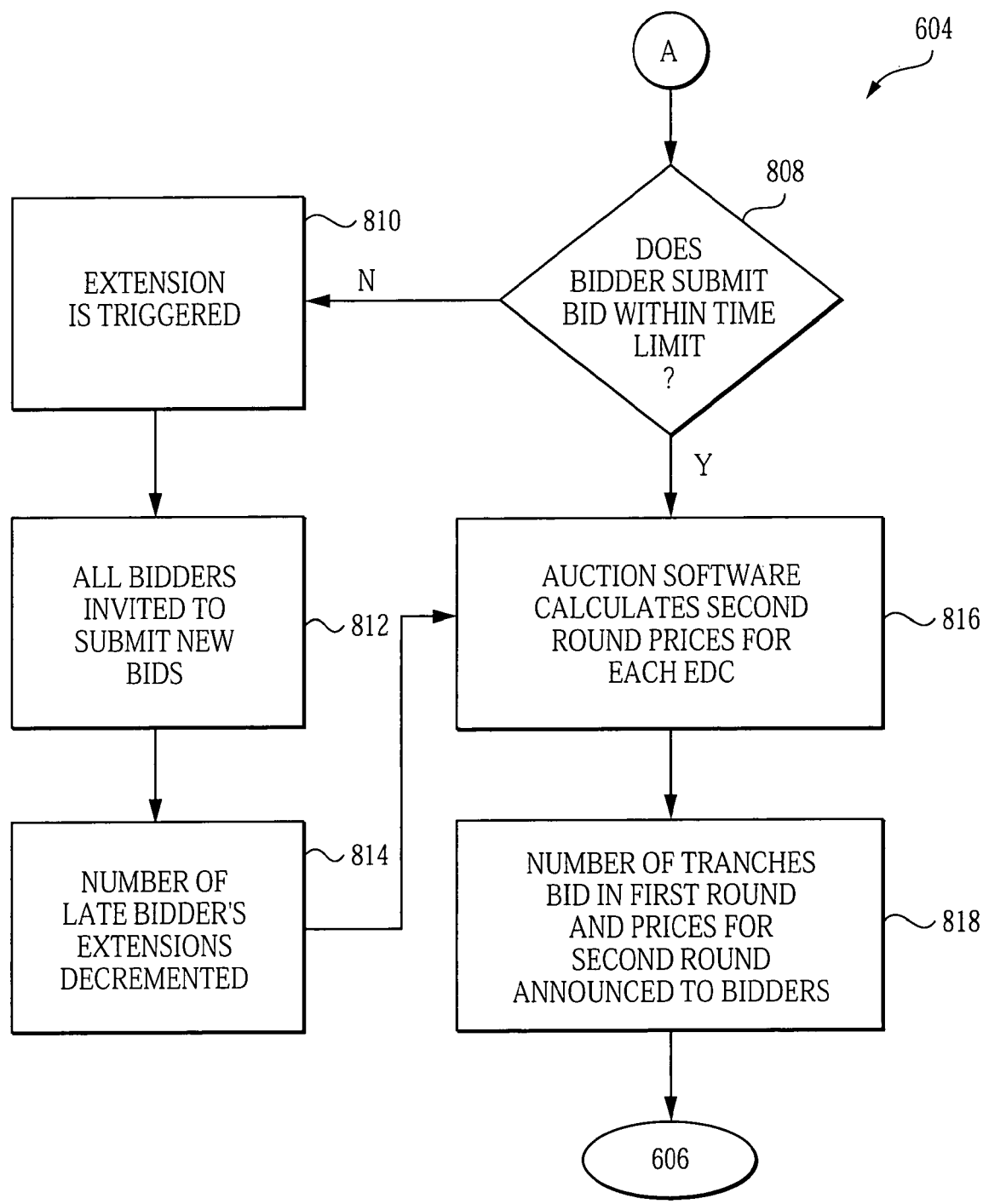

FIGS. 8A and 8B illustrate a method of conducing a first round of bidding according to the present invention. The first round of bidding starts as web server 406 and application server 408 receive bids from qualified bidders using, for example, client browsers 402 (step 800). As stated previously, a bid may also be submitted manually, by, for example, telephone, facsimile, mail, or hand delivery. A bidder selects how many tranches the bidder wants to serve from each EDC at the starting prices. For example, if there are four EDCs participating in the auction, a bid would consist of four numbers, the number of tranches the bidders wants to supply for each of the four EDCs at the starting prices for the EDCs. An example bid could look like the following:

| EDC | EDC I | EDC II | EDC III | EDC IV |
|---|---|---|---|---|
| Starting Price (in ¢/kWh) | 7.000 | 7.222 | 6.739 | 7.325 |
| Bid (in tranches) | 10 | 0 | 4 | 1 |

This bid indicates that the bidder stands ready to supply 10 EDC I tranches, no EDC II tranches, 4 EDC III tranches, and 1 EDC IV tranche at the starting prices for each EDC. It should be noted that the bidder is free to structure its bids as it desires and to bid different for each EDC, up to the bidder's initial eligibility. Since the bidder is bidding a total of 15 tranches, the bidder's initial eligibility was greater than or equal to 15 tranches. In the second round, the bidder's eligibility will be limited to its first round bids, in other words, 15 tranches, regardless of the bidder's initial eligibility. Auction application software 410 stores the bidder's second round eligibility to auction database server 412.

There are several rules for bids submitted during the first round of bidding, for example: the bid must be for at least two tranches in total; the total number of tranches bid cannot be over the bidder's initial eligibility; and the number of tranches bid for any one EDC cannot be over that EDC's load cap.

The Auction manager evaluates the submitted bids based upon the auction rules using auction application software 410. In an alternate embodiment, the Auction Manager processes and evaluates the bids manually using, for example a computer program or a spreadsheet. Auction application software 410 determines whether the bid is for at least two tranches (step 802), whether the bid is within the bidder's initial eligibility (step 804), and whether the bid violates an EDC load cap (step 806). Auction application software 410 retrieves such information as the bidder's initial eligibility and the EDCs load caps from the auction database server 412. If any of these rules are violated, the bid is rejected and the bidder is invited to bid again. The auction application software may, for example, send a message to the bidder by way of application server 408 and web server 406 over the Internet 404 to the bidder's client terminal 402. A message notifying the bidder that the bid is rejected and why the bid is rejected may be displayed on the client browser 402.

If the bidder's bid does not violate any of the first round bidding rules, or once a satisfactory bid is submitted by a bidder who did violate one or more of the first round bidding rules, auction application software 410 determines whether the bid was submitted within a pre-determined time limit (step 808), as illustrated in FIG. 8B.

A bidder that has not submitted a bid in within the time limit, for example, 10 minutes, automatically triggers an extension to the bidding phase (step 810). The extension is of limited duration, for example, 15 minutes. Alternatively, a bidder may directly contact the Auction Manager to request an extension, for example, by phone. During this extension, all bidders have the opportunity to submit new bids if they so wish (step 812). Bidding extensions are used, for example, in cases of technical problems that prevent a bidder from submitting a bid within the time limit. Each bidder is allowed a limited number of extensions during the course of the auction, for example, 3 total extensions. The available number of round extensions for all bidders who request or are granted an extension during a bidding phase is decremented (step 814). Also, even if several bidders trigger or request an extension, the bidding phase is extended for a maximum of one extension duration, i.e., 15 minutes total.

Once all bids have been received and any extensions have elapsed, the first round moves into the reporting phase. As described above, the Auction Manager may call a time-out to revise the target auction volume at the beginning of the reporting phase or after the reporting has ended.

During the reporting phase, auction application software 410 calculates the prices for each EDC for the second round of bidding according to the auction rules (step 816). The price for an EDC's tranches for the second round is the same as the first round price when the number of tranches bid in the first round is insufficient to fill the number of tranches desired, or when the number of bid is only just equal to the number of tranches desired. The price for an EDC's tranche ticks down when the number of tranches bid for that EDC exceeds the tranche target. Using the EDCs of the previous example:

| EDC | EDC I | EDC II | EDC III | EDC IV |
|---|---|---|---|---|
| Starting Price (in ¢/kWh) | 7.000 | 7.222 | 6.739 | 7.325 |
| Tranche Target | 96 | 51 | 19 | 4 |
| Total Bid (in tranches) | 192 | 68 | 23 | 4 |

In this example, the total number of tranches bid exceeded the tranche targets for EDC I, EDC II, and EDC III therefore, the second round prices for those three EDCs will be lowered. The total number of tranches bid for EDC IV, however, just equal the tranche target for that EDC. Therefore, the second round price for EDC IV will be the same as the first round price for EDC IV, namely, 7.325 ¢/kWh.

An EDC's price is calculated so that it ticks down more quickly the larger the excess supply of tranches bid over the tranche target. Conversely, the price ticks down more slowly when the excess supply of tranches bid over the tranche target is small. The Auction Manager has the discretion to override any one EDC's price decrement calculation as determined by auction application software 410. In all cases, the decrease in price for an EDC from one round to the next is, for example, between 0.25% of the previous round price and 2.5% of the previous round price. Prices are rounded off to, for example, the nearest thousandth of a cent.

The tables below show details of the calculation of the decrease in price. There are three tables because the formulas used are slightly different depending on an EDC's tranche target. The measure of excess supply used in the calculation is the ratio of the number of tranches bid to the tranche target for the EDC (designated by "r" in the tables). When an EDC's tranche target is 9 or less, the calculation also takes into account a measure of excess supply in the entire auction ("R"). This auction-wide measure of excess supply is the ratio of the number of tranches bid in the entire auction to the number of tranches desired for all EDCs combined.

TABLE 1

Percentage Price Decrease for an EDC with a tranche target of 20 or more

| Excess supply (as percentage of tranches desired) | 0% or less | Less than 20% | Between 20% and 100% | Exceeds 100% |
|---|---|---|---|---|
| Measure of excess supply | $r \cdot 1$ | $1 < r < 1.2$ | $1.2 \cdot r \cdot 2$ | $R > 2$ |
| Percentage decrease in price | 0% | .25% | $(.028125r - .03125) \times 100\%$ | 2.5% |

Note that, when the excess supply is 0% or less, this indicates that the number of tranches bid for that EDC is less than or equal to the tranche target for that EDC. In that case, the price is not decremented, as discussed previously.

Applying these calculations to the two EDCs in the prior example that had tranche targets of 20 or more, EDC I and EDC II, we can determine the second round prices for these tranches. For EDC I, the tranche target is 96 and the total number of tranches bid in the first round was 192 tranches. Therefore, r=(192/96)=2. This means that the excess supply for EDC I in the first round was 100%. Using the appropriate calculation, the percentage decrease in price for EDC I is: ((0.028125*2-0.03125)×100%)=2.5%. Therefore, the second round price for EDC I will be: (7¢/kWh−(7¢/kWh*2.5%))=6.8250/kWh.

Likewise, for EDC II, the tranche target is 68 and the total number of tranches bid in the first round was 51 tranches. Therefore, r=(68/51)=1.33. This means that the excess supply for EDC II in the first round was 33%. Using the appropriate calculation, the percentage decrease in price for EDC I is: ((0.028125*1.33-0.03125)×100%)=0.616%. Therefore, the second round price for EDC I will be: (7.222¢/kWh−(7.222¢/kWh*0.62%))=7.178¢/kWh.

TABLE 2

Percentage Price Decrease for an EDC with a tranche target between 9 and 19 tranches

| Excess supply (as percentage of tranches desired) | 0% or less | Less than 75% | Between 75% and 250% | Exceeds 250% |
|---|---|---|---|---|
| Measure of excess supply | $r \cdot 1$ | $1 < r < 1.75$ | $1.75 \cdot r \cdot 2.5$ | $R > 2.5$ |
| Percentage decrease in price | 0% | .25% | $(.03r - .05) \times 100\%$ | 2.5% |

Applying these calculations to the EDC in the prior example that had a tranche target between 9 and 19 tranches, EDC III, we can determine the second round prices for this tranche. For EDC III, the tranche target is 19 and the total number of tranches bid in the first round was 23 tranches. Therefore, r=(23/19)=1.2. This means that the excess supply for EDC I in the first round was 20%. Using the appropriate calculation, the percentage decrease in price for EDC II is: 0.25%. Therefore, the second round price for EDC I will be: (6.739¢/kWh−(6.739¢/kWh*0.25%))=6.722¢/kWh.

TABLE 3

Percentage Price Decrease for an EDC with a tranche target of 9 or less

| Excess supply (as percentage of tranches desired) | 0% or less | Less than 75% for the EDC or below 0% in the auction | Between 75% and 250% for the EDC and between 0% and 50% in the auction | Exceeds 250% for the EDC and exceeds 50% in the auction |
|---|---|---|---|---|
| Measure of excess supply | $r \cdot 1$ | $1 < r < 1.75$ or $R < 1$ | $1.75 \cdot r \cdot 2.5$ or $1 \cdot R \cdot 1.5$ | $r > 2.5$ and $R > 2.5$ |
| Percentage decrease in price | 0% | .25% | The smaller of: $\{((.45R - .0425) * 100\%)$ and $((.03r - .05) * 100\%)\}$ | 2.5% |

Applying these calculations to the EDC in the prior example that had a tranche target of 9 or less tranches, EDC IV, we can determine the second round prices for this tranche. For EDC IV, the total tranches bid was equal to the tranche target. Therefore, there would be no price change for the second round of bidding. However, supposing that a total of 7 tranches were bid for EDC IV in the first round, since the tranche target is 4, $r=(7/4)=1.75$. This means that the excess supply for EDC IV in the first round was 75%. The excess supply for the entire auction is $R=(290/170)=1.6$. Using the appropriate calculation, the percentage decrease in price for EDC IV is: $\mathrm{MIN}\{((0.045R-0.0425)*100\%)$ and $((0.03r-0.05)*100\%)\}=\mathrm{MIN}\{((0.045*1.6-0.0425)*100\%)$ and $((0.03*1.75-0.05)*100\%)\}=\mathrm{MIN}\{2.95\%$ and $0.25\%\}$. Therefore, the second round price for EDC IV would be: (7.3250/kWh−(7.3250/kWh*0.25%)=7.3070/kWh.

It should be noted that the auction rules applied to the previous examples may be altered and other embodiments of the auction rules are anticipated by the present invention. Decrement rules for the auction, however, have several consistent features for all auctions, for example: the price decrement equals zero decrement if the number of bids is equal to, or less than, the tranche target; the price decrement is at some pre-determined minimum when the number of bids exceeds the tranche target by 1 or 2 tranches, or some other minimal amount; the price decrement is between a pre-determined minimum and maximum, as an increasing function of the excess supply; the price decrement is at some pre-determined maximum when the excess supply reaches a pre-determined large amount; and the size of the price decrements may be changed as the auction progresses and bidders are advised.

After all of the second round prices have been calculated, the Auction Manager then announces the calculated second round prices to all bidders and provides a range of the total number of tranches bid in the auction (step 818). Bidders, however, are not provided any information as to any individual bidder's bids. In another embodiment, the Auction manager announces the excess supply bid on the various products.

The method of reporting the range of the total number of tranches bids depends upon ratio of the total eligibility for a round to the total number of tranches bid in that round, called an eligibility ratio. When the eligibility ratio is above 1.2, the Auction Manager reports a range of five numbers that includes the actual total number of tranches bid. The top end of the range is, for example, a number that is divisible by five.

For example, suppose that the total number of tranches in the auction, the sum of all the EDCs' tranche targets, is 182 and that the total number of tranches bid in the first round, which is the total eligibility for the second round of bidding, is 252. Then, the eligibility ratio is 1.4 (252/182=1.4). Therefore, in the reporting phase of the first round, the Auction manager announces that the eligibility in the second round of bidding is the range of five integers between 251 and 255, namely: 251, 252, 253, 254, and 255. Note that the actual number of tranches bid in the first round, 252, falls within this range.

As the auction progresses, the total eligibility for a bidding round decreases. When the eligibility ratio falls below 1.2 but above 1, the Auction Manager reports a range of ten numbers that includes the actual total number of tranches bid. The top end of the range is, for example, a number that is divisible by five. For the preceding example, when the total eligibility is reported to be in the 216-220 range, the eligibility ratio has fallen for the first time to 1.2 or below when rounded up to the nearest tenth (216−182=1.19 and 221/182=1.21). Since part of the eligibility ratio for this round is still above 1.2, a range of five integers is reported. For the next round, however, the Auction Manager reports the total eligibility to be, for example, 206-215, which is a range of ten integers, the highest of which is divisible by 5.

In another embodiment of the present invention, rather than announce the number of tranches bid in the previous round of bidding, the Auction Manager employs another measure of bidding activity, for example, the excess supply offered during the previous round of bidding. A similar range method may still be used to report the excess supply.

When the total eligibility for a round falls below the total number of tranches available, that is to say, when the eligibility ratio falls below 1, the Auction Manager may simply announce that the total eligibility is below the total number of tranches available in the auction, for example, below 182 tranches.

C. Second Round of Bidding

Figure 9A:
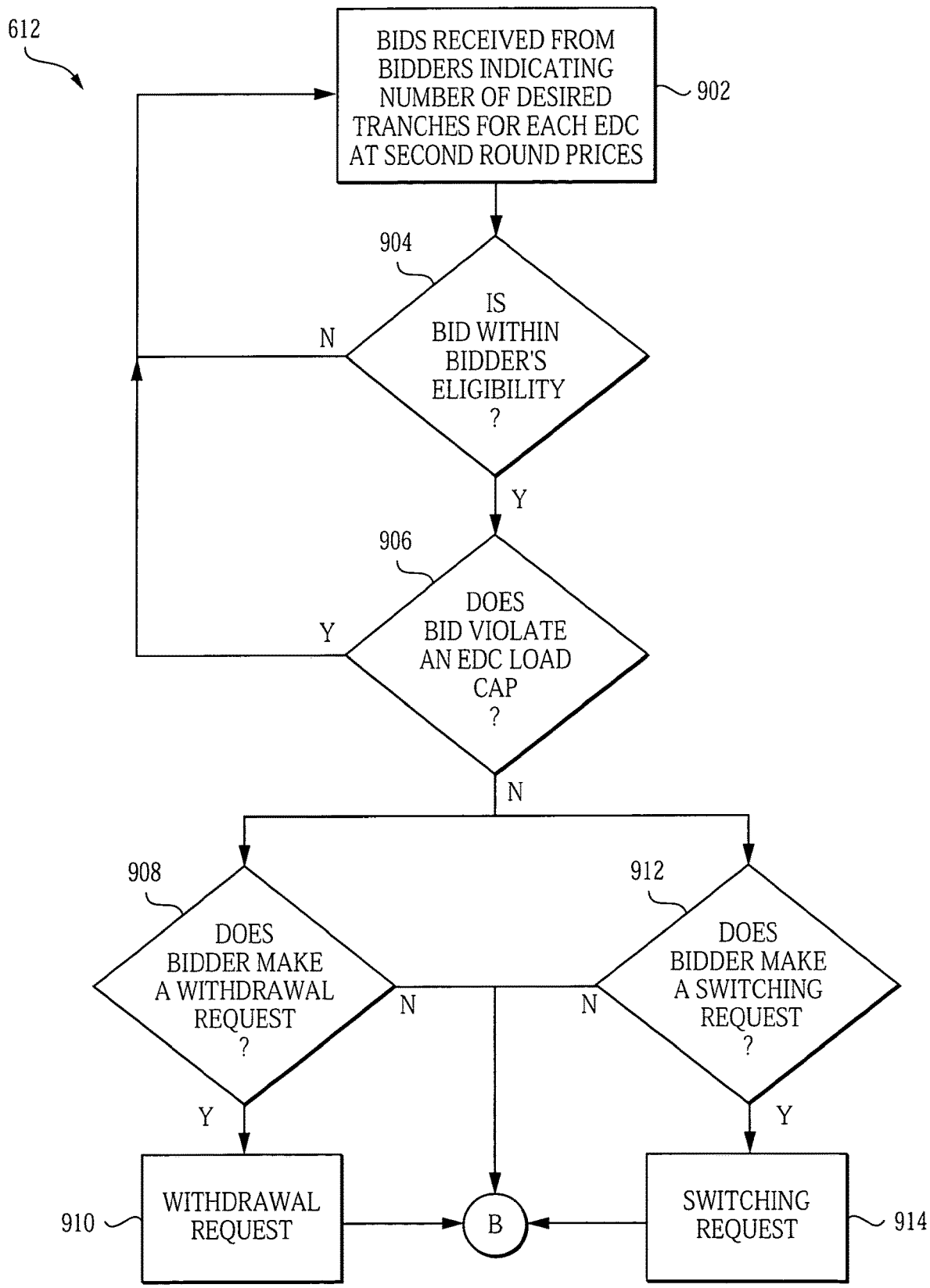
FIGS. 9A and 9B are flowcharts of a method of conducting a second round of bidding for basic generation services according to the present invention.
Figure 9B:
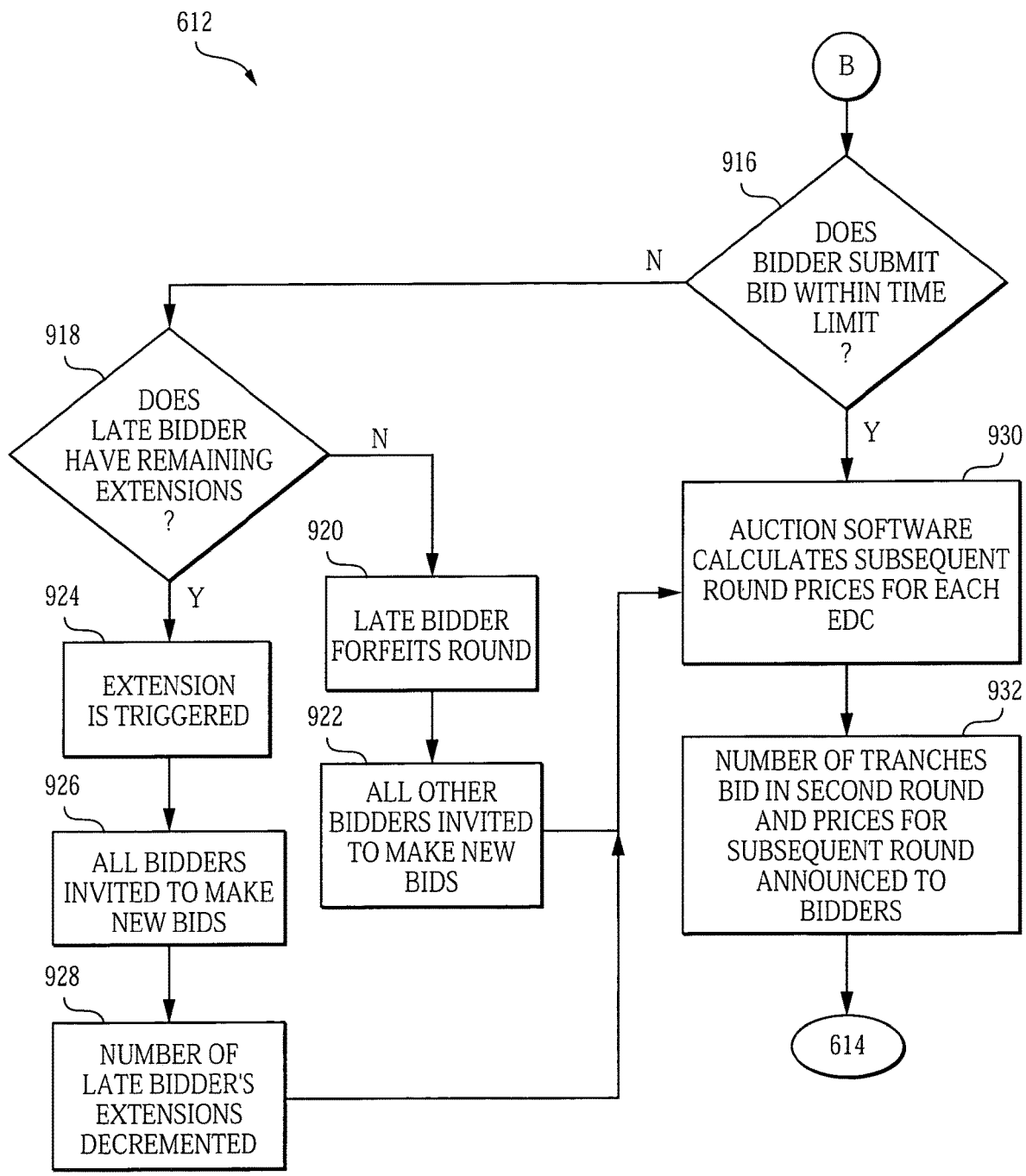

After the reporting phase of round one ends, and the Auction Manager has made any revisions to the target auction volume, the second round of bidding begins (step 612). FIGS. 9A and 9B illustrate a method of conducting a second round of bidding according to the present invention. The second of round of bidding begins similarly to the first round of bidding, with web server 406 and application server 408 receiving bids from qualified bidders using client browsers 402 (step 902). A bid may be designated as desired by the bidder, so long as the bid does not violate the auction rules.

There are two rules for bids submitted during the second round of bidding, for example: the number of tranches bid for any one EDC cannot be over that EDC's load cap (step 906); and the total number of tranches bid from a particular bidder cannot be over the number of tranches bid in the first round (step 904), which becomes the bidder's eligibility for the second round. In general, a bidder's eligibility for a round, after the first round, is the total number of tranches bid in the previous round at the previous round prices. Auction application software 410 retrieves this information, i.e., the EDCs load caps and the bidding eligibility for each bidder, from auction database server 412. If either of these rules are violated, the bid is rejected and the bidder is invited to bid again, as described for the first round of bidding.

Furthermore, a second round bid, as well as subsequent round bids, may specify several additional several additional pieces of information: from which EDC(s) tranches are to be withdrawn; exit price(s) for withdrawn tranches; from which and to which EDC(s) tranches are to be switched; and switching priority for switched tranches. Withdrawal requests and switching requests will be discussed below in greater detail (see FIGS. 10 and 11).

A bidder can submit the same bid as in the first round. A bidder can also perform two additional bidding actions: a bidder that wishes to change its bid can bid on fewer tranches for one or more EDCs, thus requesting to withdraw some tranches from the auction (step 908); or, a bidder can request to switch tranches from one EDC to another (or to several others) (step 912). A bidder can also do both simultaneously, bid on fewer tranches in total, and switch some of the tranches bid from one EDC to one or several others. But, as previously stated, a bidder cannot increase its total number of tranches bid in the second round from its bid in the first round, or between any two rounds, in general.

After completion of a withdrawal request (step 910) and/or switching request (step 914), or if the bidder does not make either request, auction application software 410 determines whether the bids have been submitted with in the time limit (step 916). As described with respect to round one, if one or more bidders is late, an extension is automatically triggered. Auction application software 410 first determines whether the late bidder(s) has any remaining extensions left (step 918). If none of the late bidders have any extensions left, the late bidder forfeits the round (step 920). All other bidders are invited to make new bids (step 922), as described previously.

If the late bidder does have remaining extensions, or another late bidder has remaining extension, an extension is triggered (step 924). All bidders are invited to make new bids (step 926) and the number of extensions outstanding for the late bidder(s) is decremented (step 928). If, however, one late bidder has no remaining extensions, but another bidder that has remaining extension is also late, the bidder having the remaining extension and all other non-late bidders may submit new bids. The late bidder that had no remaining extensions optionally forfeits the round.

Auction application software 410 then calculates the prices for the subsequent round of bidding (930), as described above. Again, those EDCs with bids greater than their tranche targets have their prices decremented for the subsequent round. Those EDCs with bids equal to or less than their tranche targets have their prices remain the same for the subsequent round. The number of tranches bid in the second round and the prices for the subsequent round are then announced to the bidders (step 932). As described previously, the manner in which the range of the number of tranches bid in the second round is reported depends on the eligibility ratio for that round.

In addition to what the Auction Manager reports to all bidders about the general progress of the auction, the Auction Manager reports privately to each bidder the outcome of its own bid but does not report the bid of one bidder to another bidder. The Auction Manager simply reports any bids the bidder made during the round and reports any retained withdrawals or retained switches for that round.

The second round of bidding ends and auction application software 410 determines whether the auction ending criteria are met (step 614). If not, bidding continues with a subsequent round (step 616).

D. Withdrawal Requests and Switching Requests

The Auction Manager typically accepts a bid that is unchanged. The Auction Manager generally accepts withdrawals and switches, but does not always do so. The Auction Manager may retain in whole and in part tranches that a bidder wants to withdraw. The Auction Manager will retain one or more withdrawn if, by accepting all withdrawals from and switches out of the EDC, the tranche target for the EDC would no longer be filled.

The Auction Manager may also keep on an EDC some or all of the tranches that a bidder wants to switch from that EDC. The Auction Manager will keep these tranches if, even by retaining all withdrawals, the tranche target for the EDC would no longer be filled. That is, to fill the tranche target, the Auction Manager takes first tranches bid at the current round price, then retains tranches that bidders want to withdraw, and, finally, retains tranches that bidders wanted to switch.

1. Withdrawing Tranches

Figure 10:
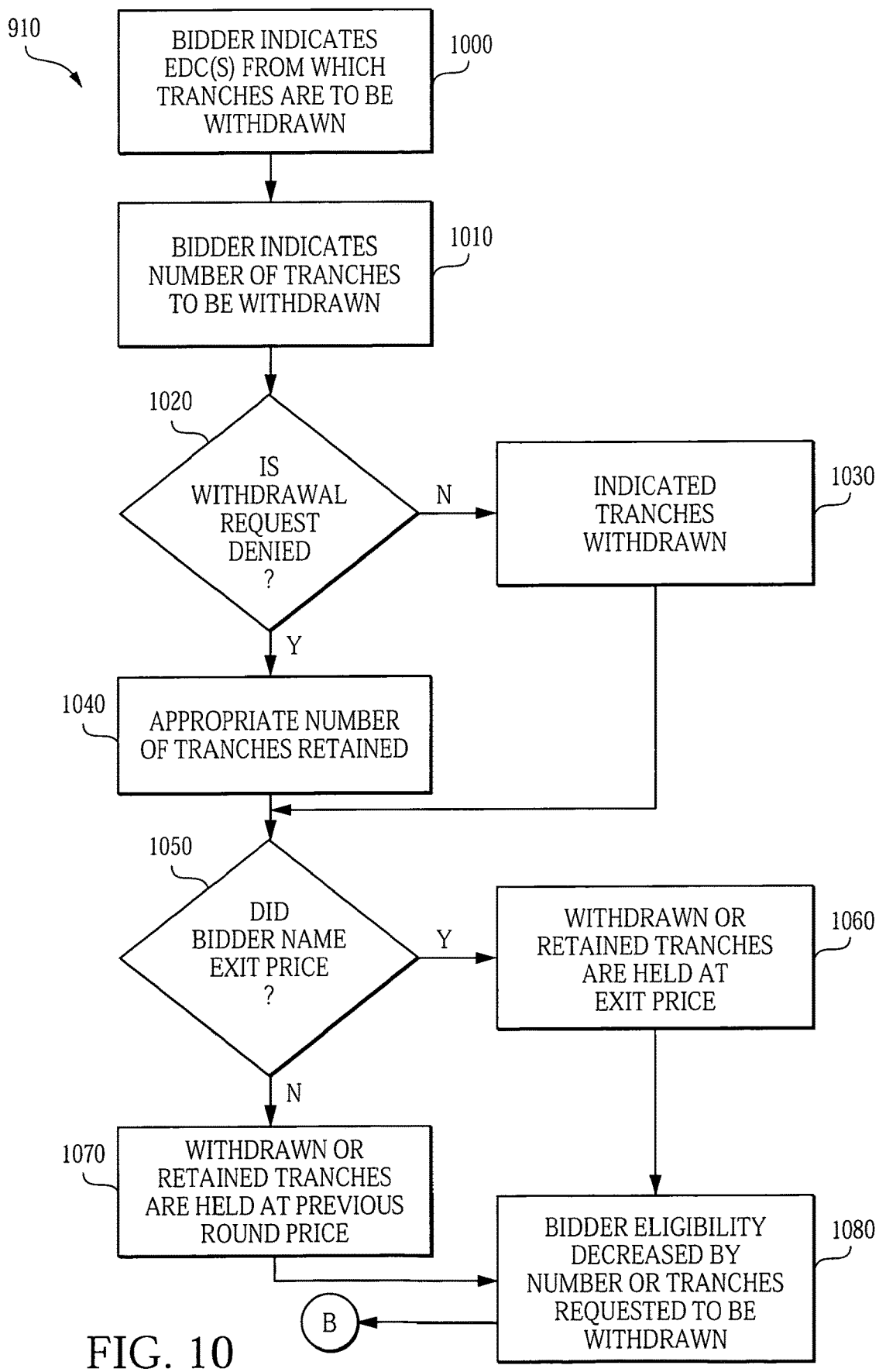
FIG. 10 is a flowchart of a method of making withdrawal requests in an auction for basic generation services according to the present invention.

As illustrated in FIG. 10, a withdrawal request begins when a bidder indicates that it wishes withdraw tranches from one or more EDC (step 1000). The bidder also indicates how many tranches from each specified EDC it wishes to withdraw (step 1010).

A bidder can bid on fewer tranches for an EDC only if the price for that EDC's tranches has decreased in from the previous round to the current round. If, instead, the price for an EDC's tranches has not changed from the previous round to the current round, indicating that the total bids for that EDC in the previous round were at or below that EDC's tranche target, then the bidder's offer made in the previous round at the previous round price is still standing, and the bidder cannot bid on fewer tranches for that EDC.

The Auction manager determines whether the withdrawal request is to be denied (step 1020) by determining whether the price for the indicated EDC(s) has decreased from the previous round. If the price for the indicated EDC(s) has decreased, then the tranche target for that EDC has been satisfied and auction application software 410 removes the indicated tranches from the auction (step 1030).

If, however, the price for the indicated EDC(s) has not decreased from the previous round or the Auction manager determines that fulfilling the withdrawal request in full would cause the total number of tranches bid for the indicated EDC(s) to fall below the tranche target, the Auction Manager denies the withdrawal request and retains a portion or all of the withdrawn tranches, as appropriate (step 1040).

A bidder that withdraws tranches has the option of naming an exit price (step 1050). A bidder names an exit price when it is willing to serve a tranche at the previous round's price and unwilling to serve the tranche at the current round's price. An exit price enables the Auction manager to determine which bidder would have remained ready to serve an EDC had the price ticked down continuously rather than in lumpy, discrete price decreases. The Auction manager relies on exit prices when, as a result of bidders withdrawing tranches and/or switching out of an EDC, the EDC has a number of tranches bid at the previous round price that equals or falls short of the tranche target for that EDC. The tranches of bidders that named lower exit prices are retained first, and they are retained at the exit price that the bidder has named (step 1060). Exit prices thus facilitate the process whereby the bidding process leads to the self-selection of winning bidders in the auction.

A bidder that withdraws several tranches for a given EDC specifies, for example, the same exit price for all tranches from that EDC. An exit price is, for example, greater than the EDC's current round price (a price at which the bidder is not willing to bid). An exit price is also, for example, no larger than the previous round price (at which the bidder was willing to bid). A bidder that withdraws tranches from several EDCs can specify a different exit price for each EDC. If a bidder does not specify an exit price, it is assumed that the bidder is withdrawing the tranche or tranches at the previous round price (step 1070). If two or more bidders name the same exit price for their tranches (or both bidders name no exit price), then the bidder with a bid confirmed earlier in the round has its tranches retained first. Otherwise, a decision on which tranches to retain may be made randomly, on a tranche by tranche basis.

For example, the first round prices and the round 1 bid for Bidder A are:

| EDC | EDC I | EDC II | EDC III | EDC IV |
|---|---|---|---|---|
| Starting Price (in ¢/kWh) | 7.000 | 7.222 | 6.739 | 7.325 |
| Total Bid (in tranches) | 10 | 0 | 4 | 1 |

The second round prices are:

| EDC | EDC I | EDC II | EDC III | EDC IV |
|---|---|---|---|---|
| Second Round Price (in ¢/kWh) | 7.000 | 7.041 | 6.604 | 7.325 |

Bidder A's second round bid must specify the same number of tranches bid for EDC I and EDC IV because the prices for these EDCs' tranches did not change from the first round. In its second round bid, Bidder A requests to withdraw two tranches from EDC III, bringing its bid from 4 to 2 tranches. Bidder A enters an exit price of 6.700¢/kWh, which is between the second round price of 6.604¢/kWh and the first round price of 6.739¢/kWh. The exit price named by Bidder A could have been equal to the first round price, 6.739¢/kWh but not equal to the second round price, 6.604¢/kWh.

Tranches that are indicated in a withdrawal request are considered withdrawn, and the bidder's eligibility for the next round is reduced by the number of withdrawn tranches (step 1080). The bidder forfeits the right to bid these tranches on that EDC or any other EDC for the remained of the auction. Eligibility is lost even if a bidder names an exit price and even if the tranches are subsequently retained.

During the reporting phase of the round, the Auction Manager reports privately to a bidder if the bidder intended to withdraw tranches and some or all of the tranches are retained. The Auction manager informs the bidder of the number of withdrawn tranches that are being retained for each EDC. The Auction Manager also reports the price at which these tranches are retained, either a named exit price or the price of the previous round at which the tranche(s) was last freely bid, depending on the bids needed to just fill the tranche target. The Auction manager continues to report the trances as being retained as long as they are still necessary to fill the tranche target of an EDC. Retained tranches are no longer necessary to fill the tranche target, and can then be released when new tranches are bid at the current round price. Withdrawn tranches with the higher exit prices (or at the previous current price, when an exit price was not named) are the first to be released. The release of the withdrawn tranches are reported to the bidder. Released withdrawals are removed from the auction and may no longer be bid.

2. Switching Tranches

Switching involves decreasing the number of tranches bid for one or more EDCs (the EDCs that the bidder is switching from) and increasing the number of tranches for one or more EDCs (the EDCs that the bidder is switching to). The rules for switching are similar to the rules for withdrawing tranches. In one embodiment, a bidder can switch tranches from an EDC only if the price for that EDC's tranches has decreased from the previous round to the current round. Again, if, instead, the price for an EDC's tranches has not changed from the previous round to the current round, then the bidder cannot switch bids from an EDC and bid fewer tranches for that EDC.

Figure 11:
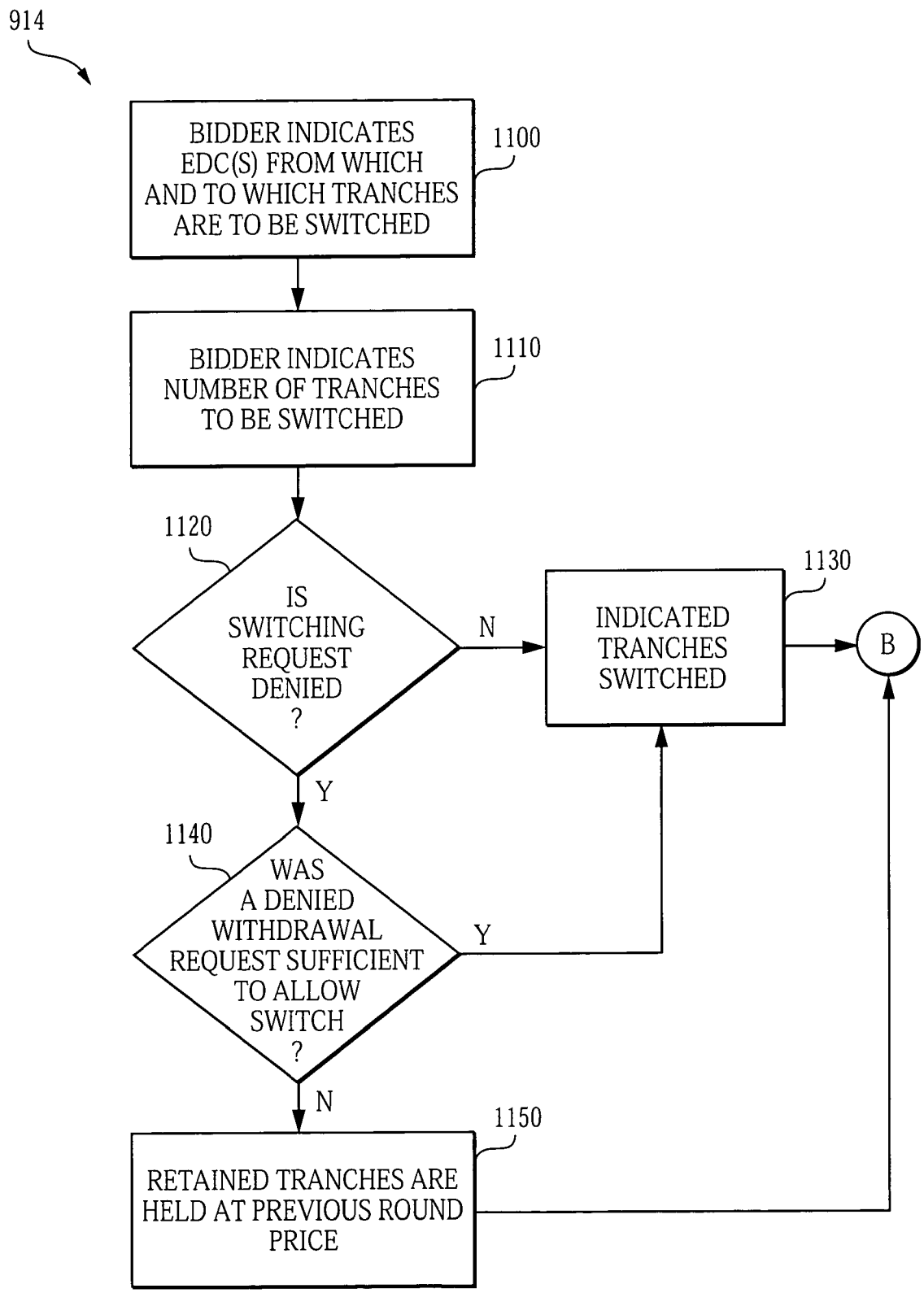
FIG. 11 is a flowchart of a method of making switching requests in an auction for basic generation services according to the present invention.

As illustrated in FIG. 11, when making a switching request, the bidder indicates from which EDC(s) and to which EDC(s) it was bids to be switched (step 1100). The bidder also indicates the number of tranches from and to each indicated EDC that are to be switched (step 1110). The Auction Manager determines whether or not to accept a switching request or to deny the request in part or in full (step 1120).

If the switch request does not violate the auction rules, the switch request is accepted and the indicated tranches are switched from and to the indicated EDCs (step 1130). However, when necessary to satisfy the tranche target(s) of the EDC(s) from which tranches are requested to be switched, the Auction Manager may deny the switch request. From among the bidders that intended to switch out of the EDC, the Auction Manager allows the bidder with a bid confirmed earlier in the round to switch first.

If the bidder or another bidder(s) has also requested that tranches be withdrawn from the problematic EDC, the Auction Manager determines whether or not denying the withdrawal request and retaining the withdrawn tranches will fully satisfy that EDC's tranche target (step 1140). If retaining the withdrawn tranches is sufficient to satisfy the EDC's tranche target, the indicated tranches are allowed to be switched (step 1130). Otherwise, some or all of the switched tranches are retained, as appropriate to satisfy the EDC's tranche requirement, at the previous round price at which the switched tranches were last freely bid for that EDC (step 1150).

When switching into more than one EDC, the bidder specifies a switching priority. A switching priority is a preference among those EDCs into which a bidder is switching. The Auction Manager uses the bidder's switching priority when accepting to switch some, but not all, tranches the bidder requested to switch out. The switching priority is used when, for example, to keep the tranche target of an EDC filled, the Auction Manager must retain all tranches that were withdrawn out of that EDC, and must retain some but not all of the bidder's switched bids on that EDC. The Auction Manager switches the switchable tranches into the EDC to which the bidder has assigned the highest priority. The bidder assigns, for example, the same priority to all tranches from a given EDC. The tranches that the Auction Manager retains to fill the tranche target are retained at the previous round price.

For example, Bidder B submits the following bid in the second round after this history in the first round:

| EDC | EDC I | EDC II | EDC III | EDC IV |
|---|---|---|---|---|
| Starting Price (in ¢/kWh) | 7.000 | 7.222 | 6.739 | 7.325 |
| Total First Round Bid (in tranches) | 15 | 7 | 4 | 4 |
| Second Round Price (in ¢/kWh) | 7.000 | 7.041 | 6.604 | 7.325 |

| EDC | EDC I | EDC II | EDC III | EDC IV |
|---|---|---|---|---|
| Total Second Round Bid (in tranches) | 15 | 4 | 5 | 6 |

Bidder B bids a total of 30 tranches in both the first round and the second round. In its second round bid, Bidder B switches out of EDC II and into EDCs III and IV. Bidder B gives the switching priority to EDC III. Therefore, tranches are first switched from EDC II to EDC III and then, if possible, into EDC IV. If the Auction Manager keeps two tranches from the switch out of EDC II, only one tranche is switched, and it is switched to EDC III, since EDC III has the highest switching priority. The two tranches kept for EDC II are retained at a price of 7.222¢/kWh, which is the last price at which the two tranches were freely bid.

During the reporting phase of the round, the Auction manager reports to the bidder how many tranches from a switch request out of an EDC are being retained. The report is made for all EDCs from which the bidder has tried to switch unsuccessfully. The price at which the tranches are retained are price of the previous round, which is the last price at which the tranche was freely bid. The Auction Manager continues to report these tranches as being retained as long as they are still necessary to fill the tranche target of an EDC.

With sufficient new tranches bid at the current round price for the EDC, retained switches can be released. Released switches are reported to the bidder. Released switches are considered to be "outbid" because the new tranche bid at the current round price replaces a switch retained at a higher price. Furthermore, new tranches bid at the current price first replaced retained switches in filling the tranche target for the EDC an then the new tranches replace retained withdrawals. The release of the retain switch is reported to the bidder. Once a retained switch is outbid, the bidder is free to bid this tranche on any EDC.

If the bidder, while retaining tranches on an EDC from a denied switch in a previous round, bids new tranches for the that EDC on which the released switches are being retained at the price for the current round, the bidder is deemed to have bid all of its eligible tranches at the current round price, including any tranches retained from a previously denied switch. That is, retained tranches become tranches that are bid at the going price.

For example, in rounds 6, 7, and 8, Bidder C bids as follows:

| EDC | EDC I | EDC II | EDC III | EDC IV |
|---|---|---|---|---|
| Price Round 6 (in ¢/kWh) | 6.500 | 7.000 | 6.739 | 6.987 |
| Total Sixth Round Bid (in tranches) | 0 | 0 | 7 | 0 |
| Price Round 7 (in ¢/kWh) | 6.338 | 6.983 | 6.722 | 6.812 |
| Total Seventh Round Bid (in tranches) | 0 | 7 | 0 | 0 |

In round 7, Bidder C requests a switch of 7 tranches from EDC III to EDC II. The Auction Manager denies part of the switch. Bidder C, in the reporting phase of round 7, is informed that its bid consists of 3 EDC II tranches at 6.983¢/kWh, the round 7 price, and 4 EDC III tranches at 6.739¢/kWh, the round 6 price at which the EDC III tranches were last freely bid.

| EDC | EDC I | EDC II | EDC III | EDC IV |
|---|---|---|---|---|
| Report to Bidder C | 0 | 3 @ 6.983 | 4 @ 6.739 | 0 |

In round 8, Bidder C switches back 2 tranches from EDC II to EDC III. At the new round 8 prices, Bidder C bids 1 bids 1 EDC II tranche and 2 EDC III tranches. The 4 retained tranches are kept on EDC II and cannot be freely bid.

| EDC | EDC I | EDC II | EDC III | EDC IV |
|---|---|---|---|---|
| Price Round 8 (in ¢/kWh) | 6.308 | 6.913 | 6.722 | 6.792 |
| Total Eighth Round Bid (in tranches) | 0 | 1 | 2 | 0 |
| Retained Tranches | | | 4 @ 6.739 | |

Bidder C has bid new tranches for EDC III at the round 8 price which having switches retained at a higher price. Bidder C is then deemed to have bid all 6 tranches for EDC III at the round 8 price of 6.722¢/kWh, as shown below:

| EDC | EDC I | EDC II | EDC III | EDC IV |
|---|---|---|---|---|
| Price Round 8 (in ¢/kWh) | 6.308 | 6.913 | 6.722 | 6.792 |
| Effective Eighth Round Bid (in tranches) | 0 | 1 | 6 | 0 |

When a bidder requests to both withdraw tranches and switch tranches in the same round, the rules given above for withdrawing and switch apply. Additionally, when a bidder is both withdrawing and switching, the bidder may be asked to specify which tranches are being withdrawn and which tranches are being switched. This occurs when the bidder reduces the number of tranches bid for more than on EDC. The tranche(s) that the bidder specifies have been withdrawn is the tranches(s) for which the bidder may name an exit price.

D. Subsequent Rounds of Bidding

Subsequent rounds of bidding after the second round proceed as necessary until the auction ending criteria are met, as described previously. Subsequent rounds of bidding proceed similarly to first and second rounds of bidding, however, the release of retained withdrawals or switches may also be considered.

Figure 12:
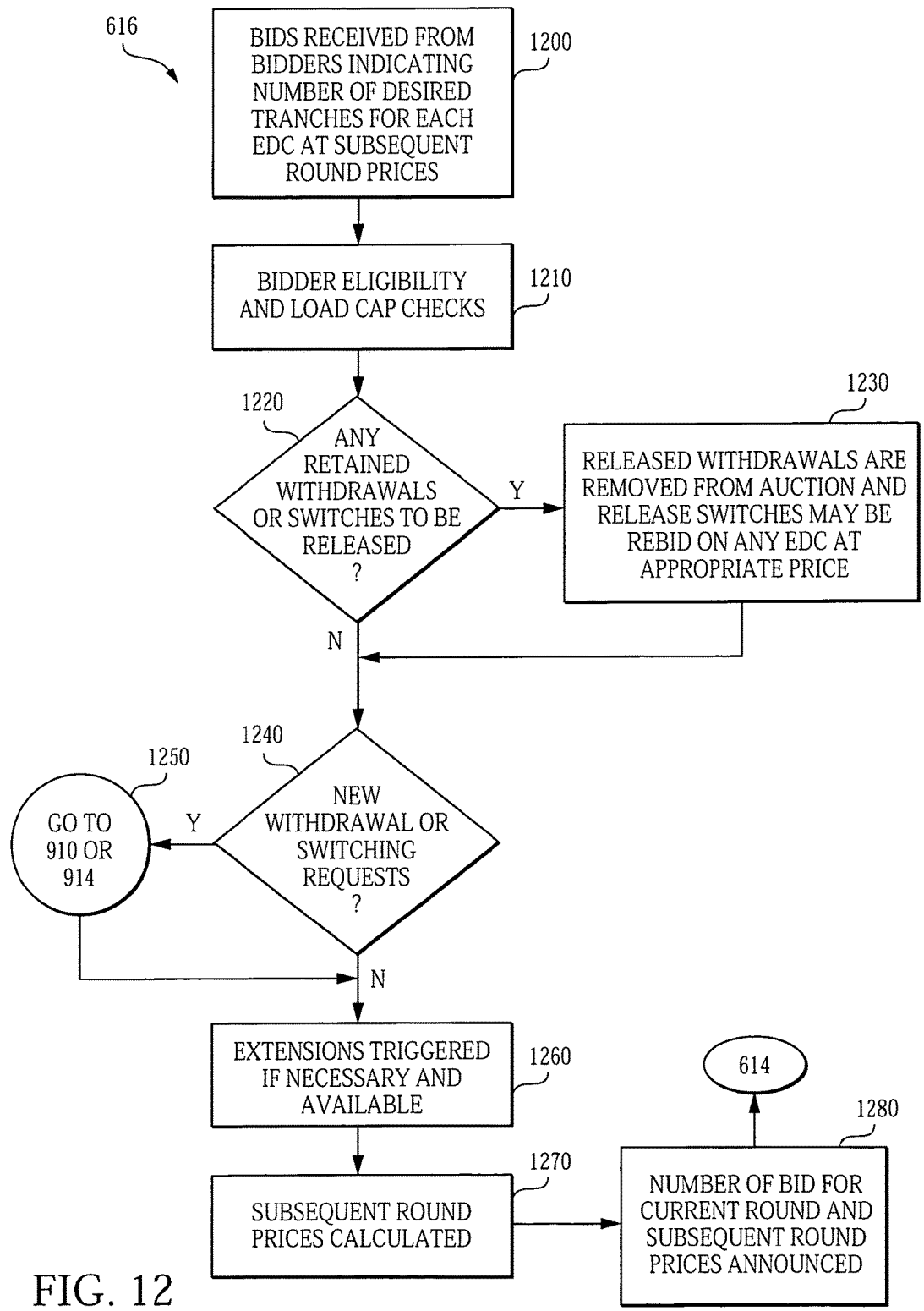
FIG. 12 is a flowchart of a method of conducting subsequent rounds of bidding basic generation services according to the present invention.

In FIG. 12, bids are received indicating tranche bids for specific EDCs and whether there are any withdrawal or switch requests (step 1200). Bidder eligibility, which depends on the total number of tranches bid placed by the bidder in the previous round of bidding, and EDC load cap checks are made for the bids (step 1210). The Auction Manager determines whether, based on the new bids, any retained withdrawals or switches are to be released (step 1220). If there are any retained withdrawals or switches to be released, the released withdrawals are removed from the auction and the released switches may be rebid on any EDC at the current round price (step 1230). Any new withdrawal or switching requests are decided by the Auction Manager (step 1240) and are fulfilled or denied as appropriate (1250).

Bidding extensions are triggered if necessary and if available (step 1260). After the bidding phase has ended, the prices for the subsequent round are calculated (step 1270). A range of the total number of tranches bid for the round, as appropriate for the given eligibility ratio, subsequent round prices, and any retained and/or released withdrawals and/or switches are reported to the bidders (step 1280). The auction continues with a subsequent round until the ending criteria for the auction are met.

During a reporting phase of any round, a bidder may request a suspension of the auction for a specified period, for example, one hour. A recess gives a bidder the opportunity to take additional time later in the auction to put in a bid. Bidders can first request a recess when the ratio of total eligibility to the total number of tranches in the auction falls below 1.2. The total eligibility measure used is the lower bound of the reported range. The Auction Manager informs bidders when they can request recesses.

Bidders may request a recess, for example, in the last half of the reporting phase of a round, or before the last, for example, five minutes of the reporting phase of a round, whichever is shorter. Each bidder is allowed to request at most, for example, one recess during the auction. All bidders making a request in a given reporting phase will see their number of recesses available fall from, for example, one to zero. If more than one bidder requests a recess, the auction is paused only for a specified recess period.

E. Calculating Ending Prices

Figure 13:
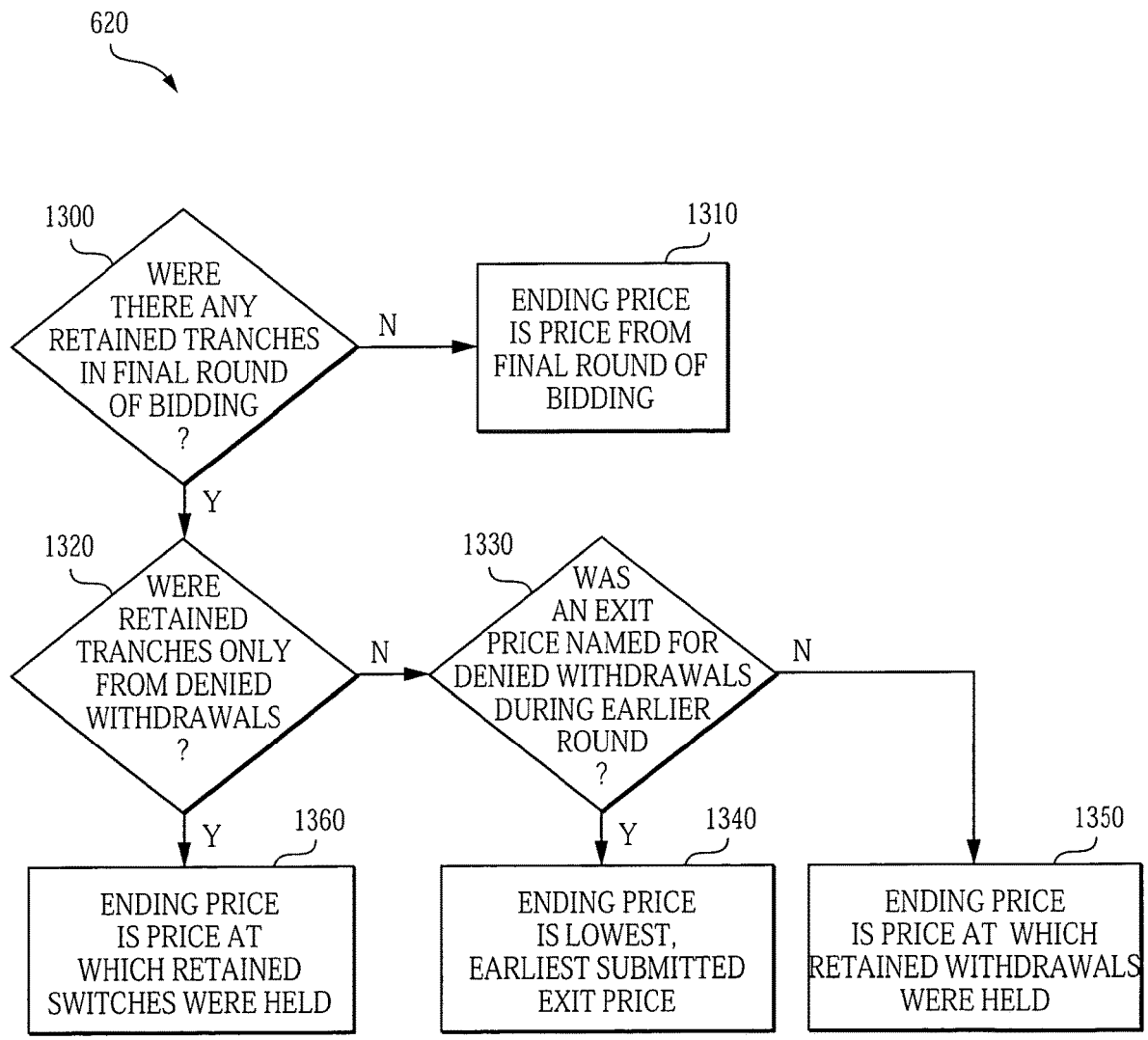
FIG. 13 is a flowchart of a method of determining ending prices for winning bidders in an auction for basic generation services according to the present invention.

FIG. 13 illustrates a method of calculating ending prices for the BGS auction according to the current invention. The auction ends for all EDCs at once. The auction ends when bidding has stopped on all EDCs and no further bidding is possible. No further bidding is possible when, at the prices for the round, the number of tranches bid for each EDC is equal to (or is smaller than) the tranche target for each EDC. Furthermore, for all EDCs, there are no retained switches that have been outbid and that could subsequently be bid on an EDC.

Bidders that win tranches for an EDC are those that bid at the last round price and, if necessary, those that had tranches retained (from a switch or from a withdrawal) to fill the tranche target of that EDC. All bidders that win tranches for an EDC are given the same price for their tranches. Once the ending criteria for the auction have been met, the Auction Manager, utilizing standard auction application software 410, determines the ending prices for each EDC (step 620) and winning bidders are notified (step 622).

For each EDC, the Auction Manager determines whether there were any retained tranches, from retained withdrawals or denied switches, left in the final round of bidding (step 1300). If, to fill the tranche target for the EDC in the final round only tranches bid at the price from the final round were used, meaning that there were no retained tranches for that EDC, the winners are those that submitted bids at the price from the final round. The ending price given to all winner of that EDC is the price from the final round of bidding (step 1310).

If there were retained tranches for the EDC in the final round of bidding, the Auction Manager then determines whether the retained tranches were only retained withdrawals (step 1320). If, to fill the tranche target for the EDC in the final round, withdrawn tranches were retained, then the winners are the bidders that submitted bids at the price from the final round and the bidders that submitted the lower exit prices for the retained withdrawn tranches.

The Auction Manager determines whether any exit prices were named for the withdrawn tranches (step 1330). If exit prices were named, the ending price for the tranches for all of the winners of that EDC is the lowest, earliest submitted exit price (step 1340). The exit prices named for any round of the auction are considered in determining the lowest named exit price. The lowest exit price, rather than the price of the final round, is the ending price for all tranches of that EDC.

If, during the round in which the lowest exit price was named, more than one bidder submitted the same exit price, the bidder that submitted a bid earlier in that round is the first to win the tranches. Therefore, the ending price of all tranches for that EDC is the highest accepted price, since an exit price submitted during a round prior to the final round would be higher than the price of the final round of bidding.

If no exit prices were named for any withdrawn tranches for the EDC, the exit price is taken to be the price of the previous round in which the withdrawal was made. Therefore, the ending price for all tranches of the EDC is the lowest exit price, or the price for the round prior to the last round in which a tranche withdrawal was made (step 1350). This is the price of the last round in which the latest withdrawn tranches were freely bid.

If, to fill the tranche target for the EDC, there were tranches retained from retained withdrawals and denied switches in the final round of bidding, then the winners for that EDC are the bidders that submitted bids at the final round price, the bidders that withdrew their tranches, and the bidders that had their switched out of the EDC denied. The ending price for all winners of that EDC is the highest price for the tranches used to fill the tranche target, namely the price at which the denied switches were last freely bid (step 1360).

For example, in round 45, 98 EDC I tranches are bid at a price of 5.600¢/kWh. In round 46, 93 EDC I tranches are bid at a price of 5.586¢/kWh. Five tranches total are withdrawn from EDC I in round 46. However, the tranche target for EDC I is 94 tranches, therefore one withdrawn tranche is retained.

Bidder A bids 8 EDC I tranches in round 45 and 5 tranches in round 46, withdrawing 3 tranches. Bidder A does not enter any exit prices. Bidder B, who bids after Bidder A, bids 5 EDC I tranches in round 45 and 3 tranches in round 46, withdrawing 2 tranches. Bidder B names an exit price of 5.590¢/kWh for the 2 withdrawn tranches. In order to fill the tranche target, Bidder A, who bid earliest, has one of its withdrawn tranches retained at the price for round 45, 5.6000/kWh.

In round 46, no other bidder changes its bid from round 45 and the auction ends in round 46. The 93 tranches bid in the final round for EDC I are won by the bidders that bid at 5.586¢/kWh, the final round price for EDC I. Bidder B additionally wins the two tranches that it withdrew in round 46, since it specified an exit price for those 2 tranches. The exit price named by Bidder B is lower than the effective exit price for Bidder A, the round 45 price, therefore, Bidder B wins its two withdrawn tranches. However, Bidder A also wins the 1 tranche that had been retained to fill the tranche target for EDC I. Since the highest accepted price for EDC I tranches is 5.6000/kWh, the effective exit price for Bidder A for its retained tranche, all winning bidders receive an ending price of 5.600¢/kWh for EDC I.

F. Round Reports

During the reporting phase of a round, the Auction Manager reports certain information to the bidders, such as, the number of tranches bid in the current bidding round, the prices for the next round, whether the bidder had any denied withdrawal and/or switching requests, and whether any retained withdrawals and/or switches are released for the next round.

FIG. 14 illustrates sample results for the first five rounds of a BGS auction. The two EDCs involved in the auction are ABC and XYZ. Each EDC has tranche targets of 10 tranches. In the first five rounds, both EDCs have continued to be oversubscribed; therefore, their prices have ticked down for each round.

FIG. 15 illustrates a sample round report with minimal information. Auction application software 410 can send this round report to all bidders, as the report gives no information regarding the activities of other bidders. The round report for, in this case, round 4, gives a range for the total number of tranches bid in round 4. Since 36 tranches were bid in round 4, the eligibility ratio for round 4 is 1.8. Since the eligibility ratio is greater than 1.2, the range reported is 35-40 tranches, a five integer range. The round report also specifies the price for the next round, round 5, for example, 5.950/kWh for ABC and 6.10¢/kWh for XYZ.

FIG. 16 illustrates a round report that auction application software 410 can generate for the Auction Manager. This report gives detailed information about the actual number of tranches bid in, for example, round 4. The report shows that 36 tranches were bid in round 4. The Auction Manager's round report also details the initial eligibility for the auction, for example, 40 tranches. This indicates that, between round 1 and round 4, a total of 4 tranches were withdrawn from the auction. As seen in the sample auction results (FIG. 14), the 4 tranches were withdrawn from ABC in round 4. Finally, the Auction Manager's round report details the bids made by each qualified bidder in the round for each EDC. This level of detailed information is generally not provided to bidders.

When the above auction method is conducted as a computer-based electronic auction using the system architectures of FIGS. 4 and 5, it is a possibility that a failure in communications between two or more elements in the system. For example, a communication failure between client browser(s) 402 and web server 406 could occur because of some disruption in Internet 404. Additionally, a communication failure could occur between web server 406 and application software server 406, such that bid data cannot be passed to auction application software 410, or round report data cannot be passed from auction application software 410 to web server 406 and, thus, to client browser(s) 402.

In such a case of a communication failure, one or more embodiments of the present invention includes procedures established in advance of commencement of the auction to provide bidders with confidential identification information and to accept, as binding, bids offered using this confidential identification information. Such bids may be submitted manually, for example, by telephone, facsimile, hand delivery, and/or mail.

Computer Implementation

Figure 17:
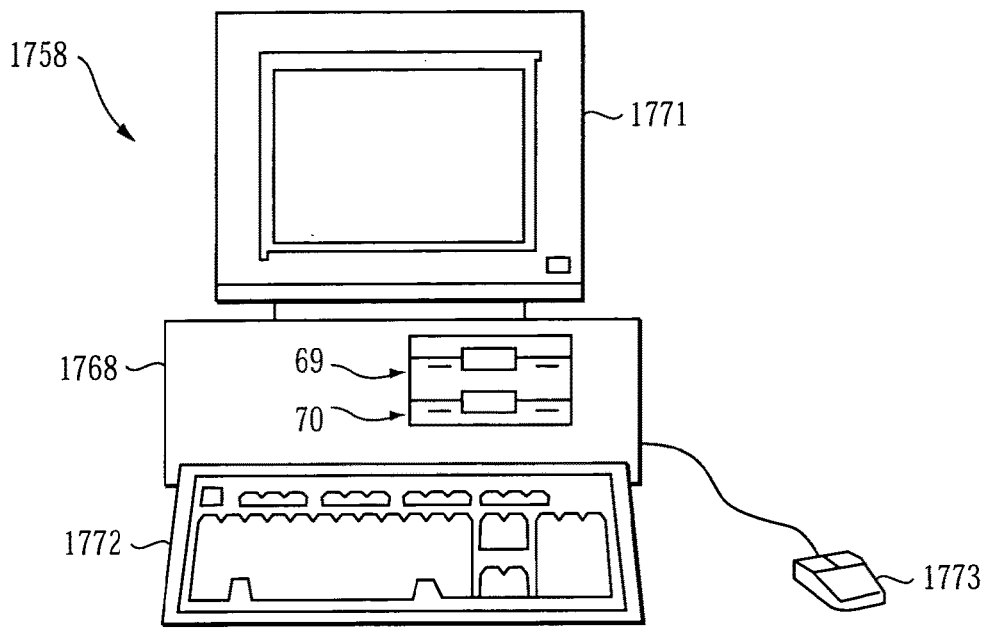
FIG. 17 is an illustration of a computer used for implementing the computer processing in accordance with a computer-implemented embodiment of the present invention.

FIG. 17 is an illustration of a computer 1758 used for implementing the computer processing in accordance with a computer-implemented embodiment of the present invention. The procedures described above may be presented in terms of program procedures executed on, for example, a computer or network of computers.

Viewed externally in FIG. 17, computer 1758 has a central processing unit (CPU) 1768 having disk drives 1769, 1770. Disk drives 1769, 1770 are merely symbolic of a number of disk drives that might be accommodated by computer 1758. Typically, these might be one or more of the following: a floppy disk drive 1769, a hard disk drive (not shown), and a CD ROM or digital video disk, as indicated by the slot at 1770. The number and type of drives varies, typically with different computer configurations. Disk drives 1769, 1770 are, in fact, options, and for space considerations, may be omitted from the computer system used in conjunction with the processes described herein.

Computer 1758 also has a display 1771 upon which information may be displayed. The display is optional for the computer used in conjunction with the system described herein. A keyboard 1772 and/or a pointing device 1773, such as a mouse 1773, may be provided as input devices to interface with central processing unit 1768. To increase input efficiency, keyboard 1772 may be supplemented or replaced with a scanner, card reader, or other data input device. The pointing device 1773 may be a mouse, touch pad control device, track ball device, or any other type of pointing device.

Figure 19:
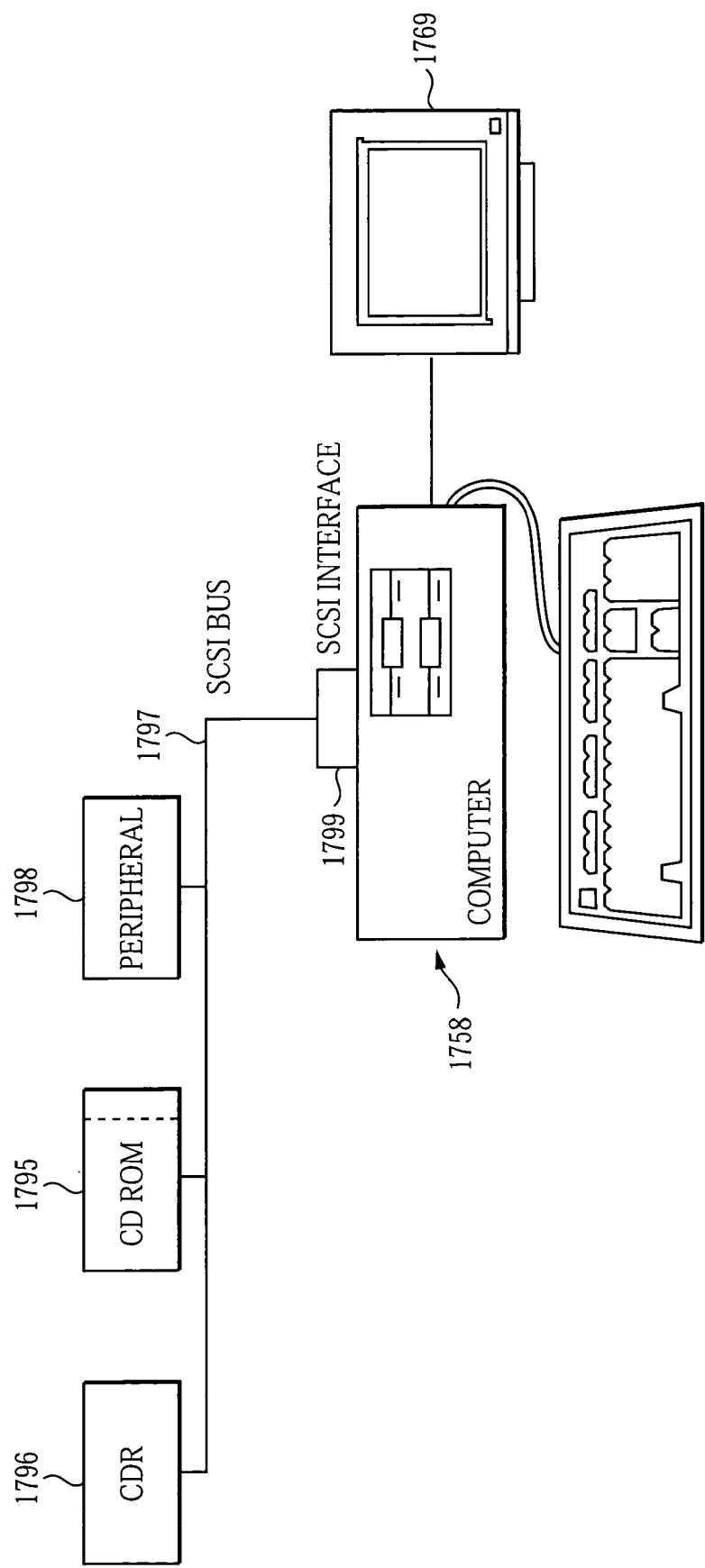
FIG. 19 illustrates a block diagram of an alternate embodiment of a computer used for implementing the computer processing in accordance with a computer-implemented embodiment of the present invention.

Alternatively, referring to FIG. 19, computer 1758 may also include a CD ROM reader 1795 and CD recorder 1796, which are interconnected by a bus 1797 along with other peripheral devices 1798 supported by the bus structure and protocol. Bus 1797 serves as the main information highway interconnecting other components of the computer. It is connected via an interface 1799 to the computer 1758.

Figure 18:
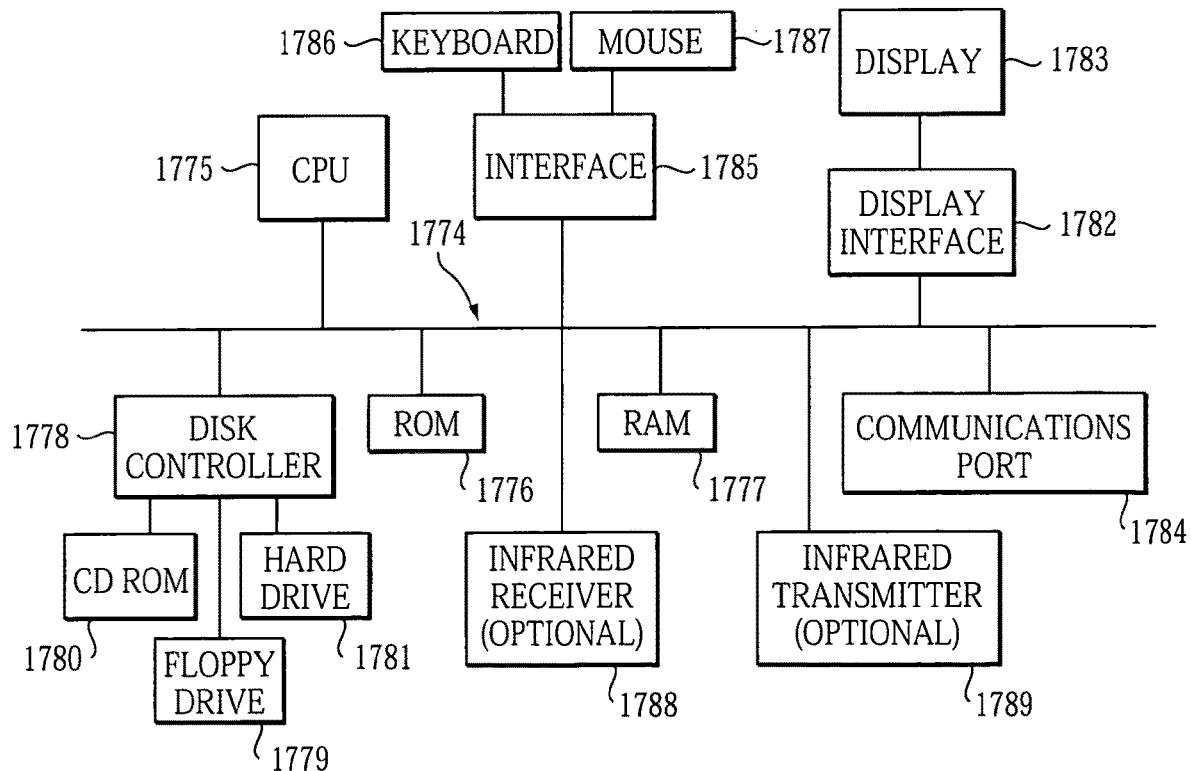
FIG. 18 illustrates a block diagram of the internal hardware of a computer.

FIG. 18 illustrates a block diagram of the internal hardware of computer 1758 of FIG. 17. CPU 1775 is the central processing unit of the system, performing calculations and logic operations required to execute a program. Read only memory (ROM) 1776 and random access memory (RAM) 1777 constitute the main memory of the computer. Disk controller 1778 interfaces one or more disk drives to the system bus 1774. These disk drives may be floppy disk drives such as 1779, or CD ROM or DVD (digital video/versatile disk) drives, as at 1780, or internal or external hard drives 1781. As previously indicated these various disk drives and disk controllers are optional devices.

A display interface 1782 permits information from bus 1774 to be displayed on the display 1783. Again, as indicated, the display 1783 is an optional accessory for a central or remote computer in the communication network, as are infrared receiver 1788 and transmitter 1789. Communication with external devices occurs using communications port 1784.

In addition to the standard components of the computer, the computer may also include an interface 1785, which allows for data input through the keyboard 1786 or pointing device, such as a mouse 1787.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

As one example, the system according to the invention may include a general-purpose computer, or a specially programmed special-purpose computer. The at least one user may interact with the system via e.g., a personal computer or over PDA, e.g., the Internet an Intranet, etc. Either of these may be implemented as a distributed computer system rather than a single computer. Similarly, the communications link may be a dedicated link, a modem over a POTS line, and/or any other method of communicating between computers and/or users. Moreover, the processing could be controlled by a software program on one or more computer systems or processors, or could even be partially or wholly implemented in hardware.

The at least one user interfaces may be developed in connection with an HTML display format. Although HTML is utilized in the illustrated examples, it is possible to utilize alternative technology for displaying information, obtaining user instructions and for providing user interfaces. The invention has been discussed in connection with particular examples. However, the principles apply equally to other examples and/or realizations. Naturally, the relevant data may differ, as appropriate.

The system used in connection with the invention may rely on the integration of various components including, as appropriate and/or if desired, hardware and software servers, database engines, and/or other content providers. The configuration may be, preferably, network-based and uses the Internet as a primary interface with the at least one user.

The system according to one or more embodiments of the invention may store collected information and/or indexes to information in one or more databases. An appropriate database may be on a standard server, for example, a small Sun™ Sparc™ or other remote location. The information may, for example, optionally be stored on a platform that may, for example, be UNIX-based. The various databases maybe in, for example, a UNIX format, but other standard data formats may be used.

Although the computer system in FIG. 17 is illustrated as having a single computer, the system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction illustrated and described, and accordingly, all suitable modifications and equivalence may be resorted to, falling within the scope of the invention.

What is claimed is:

1. A computer-implemented method of revising target auction volumes of a computer-based, simultaneous, multiple round, descending clock auction, the method including the sequential, non-sequential, and sequence-independent steps of:

(A) receiving, via secure technology and a web server, electronic bids from qualified bidders indicating at least one desired tranche of at least one of a plurality of products at a specified starting price for each of the at least one of the plurality of products during a first round;

(B) calculating, via an application server, a second round price for each of the at least one of the plurality of products for a second round based on the specified starting price and a number of tranches bid for each of the at least one of the plurality of products during the first round;

(C) sending, via application software, a first round result of the first round to the qualified bidders, the first round result including the second round price for each of the at least one of the plurality of products and a notice of the number of tranches bid during the first round for each of the at least one of the plurality of products and an amount of excess supply offered during the first round for each of the plurality of products, wherein the application server is in data communication with the web server and the application server and the web server are maintained separately from an auction database to maintain the physical security of the servers and database and provide server and network security for the application software being executed on the application server;

(D) receiving, via the web server, bids for at least one tranche of the at least one of the plurality of products from the qualified bidders during the second round;

(E) repeating steps (B)-(D) for at least one subsequent round following the second round, wherein a subsequent round price for each of the plurality of products for the at least one subsequent round is based on a previous round price of an immediately previous round and a number of tranches bid for each of the at least one of the plurality of products during the immediately previous round, wherein the subsequent round price is lower than the previous round price for any of the at least one of the plurality of products that received a number of tranches bid greater than a tranche target for that product during the immediately previous round, wherein the subsequent round price is equal to the previous round price for any of the at least one of the plurality of products that received a number of tranches bid equal to or less than the tranche target for that product during the immediately previous round, wherein a round result is sent during step (C), the round result including the subsequent round price for each of the plurality of products and at least one of a notice of the number of tranches bid during the immediately previous round for each of the plurality of products and an amount of excess supply offered during the immediately previous round for each of the plurality of products;

(F) receiving, via the web server, a revised tranche target and, responsive to receiving the revised tranche target, bounding the number of tranches bid for each of the at least one of the plurality of products to a predetermined range for at least one of the at least one subsequent round;

(G) determining, via the application software, when the number of tranches bid during a round are equal to or less than the tranche target for each of the at least one of the plurality of products; and (H) when the number of tranches bid for the round are equal to or less than a certain threshold for each of the at least one of the plurality of products such that no further bidding can take place under the auction rules, ending, via the application software, the auction after the round and awarding winning bidders an ending price for each of the at least one of the plurality of products won by the winning bidders, wherein the ending price comprising one of a final price from a final round of bidding and a named exit price for each of the at least one of the plurality of products won by the winning bidders, wherein the winning bidders are determined based on the named exit price, and where bidders submitted the same named exit price, the bidders that submitted their bids earlier, based on the time-stamps of the bids, are the first to be allocated tranches, and wherein a plurality of client browsers, the application server, the web server, the application software, and the auction database provide a multi-tier architecture and field-level database access control in combination with a constituent hierarchy, wherein the electronic bids are communicated over a plurality of tiers of the multi-tier architecture using secure technology.

2. The method of claim 1, wherein an Auction Manager pauses the computer-based auction to revise the tranche target during or after a bidding phase of a round.

3. The method of claim 1, wherein each of the at least one of the plurality of products comprises a basic generation service load of an electric distribution company for a given period of time or term, wherein the at least one desired tranche represents an equal portion of the electric distribution company's basic generation service load.

4. The method of claim 1, wherein the second round price is lower than the specified starting price for any of the at least one of the plurality of products that received a number of tranches bid greater than a tranche target for that product during the first round, wherein the second round price is equal to the specified starting price for any of the at least one of the plurality of products that received a number of tranches bid equal to or less than the tranche target for that product during the first round.

5. The method of claim 1, further comprising, if a communication failure occurs such that the electronic bids cannot be submitted or received, implementing at least one communication failure procedure that enables the qualified bidders to submit bids manually using confidential identification information.

6. The method of claim 1, wherein a maximum number of tranches bid by one of the qualified bidders is equal to or less than a bidding eligibility of the one of the qualified bidders.

7. The method of claim 1, further comprising, during the second round or the at least one subsequent round, receiving electronic bids further comprises receiving, from at least one of the qualified bidders, at least one of a withdrawal request or a switch request, wherein the withdrawal request indicates a desire of the at least one of the qualified bidders to remove a first indicated number of tranches from at least one particular product of the at least one of the plurality of products and to reduce a maximum number of bids that the at least one of the qualified bidders can make in future rounds of the auction, wherein the switch request indicates a desire of the at least one of the qualified bidders to switch a second indicated number of tranches from one of the at least one of the plurality of products to at least one different one of the at least one of the plurality of products.

8. The method of claim 1, wherein the ending price for each of the at least one of the plurality of products is a final price from a final round, a named exit price, a price at which retained withdrawn bids were last freely bid, or a price at which denied switched bids were last freely bid.

9. A computer-implemented method of revising target auction volumes of a computer-based auction, the method comprising:

receiving, via secure technology and a web server, electronic bids from qualified bidders indicating at least one desired tranche of at least one of a plurality of products at a specified starting price for each of the at least one of the plurality of products during a first round;

calculating, via an application server, a second round price for each of the at least one of the plurality of products for a second round based on the specified starting price and a number of tranches bid for each of the at least one of the plurality of products during the first round;

sending, via application software, a first round result of the first round to the qualified bidders, the first round result including the second round price for each of the at least one of the plurality of products and a notice of the number of tranches bid during the first round for each of the at least one of the plurality of products and an amount of excess supply offered during the first round for each of the plurality of products, wherein the application server is in data communication with the web server and the application server and the web server are maintained separately from an auction database to maintain the physical security of the servers and database and provide server and network security for the application software being executed on the application server;

receiving, via the web server, electronic bids for at least one tranche of the at least one of the plurality of products from the qualified bidders during the second round;

receiving, via the web server, a revised tranche target and, responsive to receiving the revised tranche target, bounding the number of tranches bid for each of the at least one of the plurality of products to a predetermined range for at least one of the first round or the second round;

determining, via the application software, when the number of tranches bid during the second round are equal to or less than a tranche target for each of the at least one of the plurality of products; and when the number of tranches bid for the second round are equal to or less than a certain threshold for each of the at least one of the plurality of products, ending, via the application software, the auction after the round and awarding winning bidders an ending price for each of the at least one of the plurality of products won by the winning bidders, wherein the ending price comprising one of a final price from a final round of bidding and a named exit price for each of the at least one of the plurality of products won by the winning bidders, wherein the winning bidders are determined based on the named exit price, and wherein a plurality of client browsers, the application server, the web server, the application software, and the auction database provide a multi-tier architecture and field-level database access control in combination with a constituent hierarchy, wherein the electronic bids are communicated over a plurality of tiers of the multi-tier architecture using secure technology.

10. The method of claim 9, wherein an Auction Manager pauses the auction to revise the tranche target during or after a bidding phase of a round.

11. The method of claim 9, wherein each of the at least one of the plurality of products comprises a basic generation service load of an electric distribution company for a given period of time or term, wherein the at least one desired tranche represents an equal portion of the electric distribution company's basic generation service load.

12. The method of claim 9, wherein a maximum number of tranches bid by one of the qualified bidders is equal to or less than a bidding eligibility of the one of the qualified bidders.

13. The method of claim 9, further comprising, during the second round, receiving the electronic bids further comprises receiving, from at least one of the qualified bidders, at least one of a withdrawal request or a switch request, wherein the withdrawal request indicates a desire of the at least one of the qualified bidders to remove a first indicated number of tranches from at least one particular product of the at least one of the plurality of products and to reduce a maximum number of bids that the at least one of the qualified bidders can make in the second round, wherein the switch request indicates a desire of the at least one of the qualified bidders to switch a second indicated number of tranches from one of the at least one of the plurality of products to at least one different one of the at least one of the plurality of products.

14. A system configured to revise a target auction volume, the system comprising:
   a web server configured to receive, via secure technology, electronic bids from qualified bidders indicating at least one desired tranche of at least one of a plurality of products at a specified starting price for each of the at least one of the plurality of products during a first round;
   an application server configured to calculate a second round price for each of the at least one of the plurality of products for a second round based on the specified starting price and a number of tranches bid for each of the at least one of the plurality of products during the first round;
   application software configured to send a first round result of the first round to the qualified bidders, the first round result including the second round price for each of the at least one of the plurality of products and a notice of the number of tranches bid during the first round for each of the at least one of the plurality of products and an amount of excess supply offered during the first round for each of the plurality of products, wherein the application server is configured to be in data communication with the web server and the application server and the web server are maintained separately from an auction database to maintain the physical security of the servers and database and provide server and network security for the application software being executed on the application server;
   the web server configured to:
      receive electronic bids for at least one tranche of the at least one of the plurality of products from the qualified bidders during the second round; and
      receive a revised tranche target and, responsive to receiving the revised tranche target, bounding the number of tranches bid for each of the at least one of the plurality of products to a predetermined range for at least one of the first round or the second round; and
   the application software configured to:
      determine when the number of tranches bid during the second round are equal to or less than a tranche target for each of the at least one of the plurality of products; and
      when the number of tranches bid for the second round are equal to or less than a certain threshold for each of the at least one of the plurality of products, end the auction after the round and awarding winning bidders an ending price for each of the at least one of the plurality of products won by the winning bidders, wherein the ending price comprising one of a final price from a final round of bidding and a named exit price for each of the at least one of the plurality of products won by the winning bidders, wherein the winning bidders are determined based on the named exit price, wherein the electronic bids are communicated using secure technology, and wherein a plurality of client browsers, the application server, the web server, the application software, and the auction database provide a multi-tier architecture and field-level database access control in combination with a constituent hierarchy, wherein the electronic bids are communicated over a plurality of tiers of the multi-tier architecture using secure technology.

15. The system of claim 14, wherein each of the at least one of the plurality of products comprises a basic generation service load of an electric distribution company for a given period of time or term, wherein the at least one desired tranche represents an equal portion of the electric distribution company's basic generation service load.

16. The system of claim 14, wherein a maximum number of tranches bid by one of the qualified bidders is equal to or less than a bidding eligibility of the one of the qualified bidders.

17. The system of claim 14, wherein the web server is further configured to, during the second round, receive, from at least one of the qualified bidders, at least one of a withdrawal request or a switch request, wherein the withdrawal request indicates a desire of the at least one of the qualified bidders to remove a first indicated number of tranches from at least one particular product of the at least one of the plurality of products and to reduce a maximum number of bids that the at least one of the qualified bidders can make in the second round, wherein the switch request indicates a desire of the at least one of the qualified bidders to switch a second indicated number of tranches from one of the at least one of the plurality of products to at least one different one of the at least one of the plurality of products.

* * * * *